(12) United States Patent
Doherty et al.

(10) Patent No.: US 12,533,485 B2
(45) Date of Patent: Jan. 27, 2026

(54) PACKAGING FOR HYDRATED ARTICLES AND RELATED METHODS

(71) Applicant: Access Vascular, Inc., Bedford, MA (US)

(72) Inventors: Mark Thomas Doherty, Lynnfield, MA (US); Daniel T. Donahue, Cambridge, MA (US); Brian M. Hanley, Reading, MA (US); Matthew M. Mannarino, Burlington, MA (US); Michael J. McGrath, Waltham, MA (US)

(73) Assignee: Access Vascular, Inc., Billerica, MA (US)

( * ) Notice: Subject to any disclaimer, the term of this patent is extended or adjusted under 35 U.S.C. 154(b) by 1273 days.

(21) Appl. No.: 17/193,258

(22) Filed: Mar. 5, 2021

(65) Prior Publication Data

US 2021/0275774 A1 Sep. 9, 2021

Related U.S. Application Data

(60) Provisional application No. 62/986,571, filed on Mar. 6, 2020.

(51) Int. Cl.
*A61M 25/00* (2006.01)
*A61L 29/04* (2006.01)
(Continued)

(52) U.S. Cl.
CPC ......... *A61M 25/002* (2013.01); *A61L 29/041* (2013.01); *A61L 29/06* (2013.01); *A61L 29/14* (2013.01); *A61L 29/146* (2013.01)

(58) Field of Classification Search
CPC .... A61M 25/002; A61L 29/041; A61L 29/06; A61L 29/14; A61L 29/146
See application file for complete search history.

(56) References Cited

U.S. PATENT DOCUMENTS 3,220,960 A 11/1965 Vaclavkova
3,566,874 A 3/1971 Shepherd et al.
(Continued)

FOREIGN PATENT DOCUMENTS

CN 1579601 A 2/2005
CN 102580145 A 7/2012
(Continued)

OTHER PUBLICATIONS

U.S. Appl. No. 16/586,787, filed Sep. 27, 2019, Biggins et al.
(Continued)

*Primary Examiner* — Michael C Miggins
(74) *Attorney, Agent, or Firm* — Wolf, Greenfield & Sacks, P.C.

(57) ABSTRACT

Packaging for hydrated articles are generally provided. In some embodiments, packaged articles are provided. For example, in some embodiments, a container contains an article such as a catheter and/or polymeric material. The disclosed packaged articles may be useful for, for example, providing controlled humidity conditions for contained components, maintaining consistent hydration levels of the packaged articles, and/or improved sterilization conditions. Advantageously, the packaged articles described herein may, in some embodiments, create an environment with minimum relative humidity for long-term storage of a catheter or polymeric material, increase shelf life of the catheter or polymeric material, and/or facilitate hydration of a catheter such that e.g., the catheter hydrates to intended dimensions within a specified amount of time. Methods for preparing such packaged article are also provided.

26 Claims, 20 Drawing Sheets

(51) Int. Cl.
*A61L 29/06* (2006.01)
*A61L 29/14* (2006.01)

(56) References Cited

U.S. PATENT DOCUMENTS

| | | |
|---|---|---|
| 3,995,623 A | 12/1976 | Blake et al. |
| 4,024,873 A | 5/1977 | Antoshkiw et al. |
| 4,026,296 A | 5/1977 | Stoy et al. |
| 4,073,733 A | 2/1978 | Yamauchi et al. |
| 4,379,874 A | 4/1983 | Stoy |
| 4,543,102 A | 9/1985 | Defago et al. |
| 4,663,358 A | 5/1987 | Hyon et al. |
| 4,943,618 A | 7/1990 | Stoy et al. |
| 5,061,254 A | 10/1991 | Karakelle et al. |
| 5,225,120 A | 7/1993 | Gravier et al. |
| 5,336,205 A | 8/1994 | Zenzen et al. |
| 5,443,727 A | 8/1995 | Gagnon |
| 5,449,382 A | 9/1995 | Dayton |
| 5,485,667 A | 1/1996 | Kleshinski |
| 5,508,036 A | 4/1996 | Bakker et al. |
| 5,523,335 A | 6/1996 | Whyzmuzis et al. |
| 5,578,075 A | 11/1996 | Dayton |
| 5,601,538 A | 2/1997 | Deem |
| 5,679,400 A | 10/1997 | Tuch |
| 5,688,459 A | 11/1997 | Mao et al. |
| 5,820,918 A | 10/1998 | Ronan et al. |
| 5,928,279 A | 7/1999 | Shannon et al. |
| 6,099,562 A | 8/2000 | Ding et al. |
| 6,231,605 B1 | 5/2001 | Ku |
| 6,271,278 B1 | 8/2001 | Park et al. |
| 6,656,206 B2 | 12/2003 | Corcoran et al. |
| 6,706,024 B2 | 3/2004 | Modak et al. |
| 7,112,298 B2 | 9/2006 | Kampa et al. |
| 7,329,695 B2 | 2/2008 | Tucker et al. |
| 7,455,674 B2 | 11/2008 | Rose |
| 7,485,670 B2 | 2/2009 | Ruberti et al. |
| 7,553,325 B2 | 6/2009 | Stinson |
| 7,619,009 B2 | 11/2009 | Ruberti et al. |
| 7,631,760 B2 | 12/2009 | Guelzow et al. |
| 7,745,532 B2 | 6/2010 | Ruberti et al. |
| 7,845,670 B2 | 12/2010 | Oberg |
| 8,017,139 B2 | 9/2011 | Thomas et al. |
| 8,313,760 B2 | 11/2012 | Hunter et al. |
| 8,470,035 B2 | 6/2013 | Cruise et al. |
| 8,541,484 B2 | 9/2013 | Choi et al. |
| 8,637,063 B2 | 1/2014 | Kopesky et al. |
| 8,784,893 B2 | 7/2014 | Daniloff et al. |
| 8,821,583 B2 | 9/2014 | Myung et al. |
| 9,216,268 B2 | 12/2015 | Liu et al. |
| 9,700,443 B2 | 7/2017 | Lumauig et al. |
| 10,182,985 B2 | 1/2019 | Bellinger et al. |
| 10,471,183 B2 | 11/2019 | Biggins et al. |
| 10,485,898 B2 | 11/2019 | Biggins et al. |
| 11,389,570 B2 | 7/2022 | Biggins et al. |
| 11,577,008 B2 | 2/2023 | Bassett et al. |
| 11,992,627 B2 | 5/2024 | Bassett et al. |
| 12,194,198 B2 | 1/2025 | Mannarino et al. |
| 2001/0002411 A1 | 5/2001 | Ronan et al. |
| 2002/0055710 A1 | 5/2002 | Tuch |
| 2002/0138154 A1 | 9/2002 | Li et al. |
| 2004/0092653 A1 | 5/2004 | Ruberti et al. |
| 2004/0247867 A1 | 12/2004 | Chaouk et al. |
| 2005/0268573 A1 | 12/2005 | Yan |
| 2006/0205862 A1 | 9/2006 | Muller et al. |
| 2006/0240059 A1 | 10/2006 | Bavaro et al. |
| 2006/0287650 A1 | 12/2006 | Cao et al. |
| 2007/0129690 A1 | 6/2007 | Rosenblatt et al. |
| 2008/0065010 A1 | 3/2008 | Bavaro et al. |
| 2008/0075628 A1 | 3/2008 | Judd et al. |
| 2008/0160062 A1 | 7/2008 | Richard et al. |
| 2008/0208347 A1 | 8/2008 | Muratoglu et al. |
| 2009/0010983 A1 | 1/2009 | Melvik et al. |
| 2009/0075267 A1 | 3/2009 | Siena et al. |
| 2009/0076495 A2 | 3/2009 | Dando et al. |
| 2010/0087788 A1 | 4/2010 | Rosenblatt et al. |
| 2010/0105801 A1 | 4/2010 | Choi |
| 2010/0106103 A1 | 4/2010 | Ziebol et al. |
| 2010/0145286 A1 | 6/2010 | Zhang et al. |
| 2010/0152708 A1 | 6/2010 | Li et al. |
| 2010/0204800 A1 | 8/2010 | Thomas et al. |
| 2010/0210752 A1 | 8/2010 | Muratoglu et al. |
| 2010/0234815 A1 | 9/2010 | Do et al. |
| 2011/0000846 A1 | 1/2011 | Ishizuka et al. |
| 2011/0027181 A1 | 2/2011 | Amodei et al. |
| 2011/0091515 A1 | 4/2011 | Zilberman et al. |
| 2011/0190683 A1 | 8/2011 | Gellman et al. |
| 2011/0244010 A1 | 10/2011 | Doshi |
| 2013/0046346 A1 | 2/2013 | Thorwarth et al. |
| 2013/0338431 A1 | 12/2013 | Shalon et al. |
| 2014/0045398 A1 | 2/2014 | Zhang et al. |
| 2014/0058251 A1 | 2/2014 | Stigall et al. |
| 2014/0178446 A1 | 6/2014 | Zhu et al. |
| 2014/0287179 A1 | 9/2014 | Kamioka et al. |
| 2016/0015863 A1 | 1/2016 | Gupta et al. |
| 2016/0136389 A1 | 5/2016 | Christian et al. |
| 2016/0175483 A1 | 6/2016 | Zeitels et al. |
| 2017/0143952 A1 | 5/2017 | Siess et al. |
| 2017/0173219 A1 | 6/2017 | Biggins et al. |
| 2017/0182223 A1 | 6/2017 | Biggins et al. |
| 2017/0340867 A1 | 11/2017 | Acisano, III |
| 2018/0200185 A1 | 7/2018 | Labib et al. |
| 2018/0250116 A1 | 9/2018 | Mourhatch et al. |
| 2018/0369454 A1 | 12/2018 | Mannarino et al. |
| 2019/0167942 A1 | 6/2019 | Schonfeldt |
| 2020/0093965 A1 | 3/2020 | Biggins et al. |
| 2020/0205959 A1* | 7/2020 | Mourhatch ............ A61F 2/0095 |
| 2020/0230295 A1* | 7/2020 | Mannarino .......... A61K 31/445 |
| 2021/0069468 A1 | 3/2021 | Keating et al. |
| 2022/0088348 A1 | 3/2022 | Bassett et al. |
| 2022/0378984 A1 | 12/2022 | Biggins et al. |
| 2023/0256141 A1 | 8/2023 | Bassett et al. |
| 2024/0399110 A1 | 12/2024 | Bassett et al. |

FOREIGN PATENT DOCUMENTS

| | | | |
|---|---|---|---|
| CN | 102634865 A | 8/2012 | |
| EP | 0 532 037 A1 | 3/1993 | |
| EP | 2075014 B1 | 7/2011 | |
| GB | 2203158 A * | 10/1988 | ............ A61L 29/06 |
| JP | S52-21420 A | 2/1977 | |
| JP | S55-106162 A | 8/1980 | |
| JP | S58-014906 A | 1/1983 | |
| JP | S61-226061 A | 10/1986 | |
| JP | S62-11460 A | 1/1987 | |
| JP | H01-299564 A | 12/1989 | |
| JP | H10-306191 A | 11/1998 | |
| JP | H11-130929 A | 5/1999 | |
| JP | 2001-500414 A | 1/2001 | |
| JP | 2002-360685 A | 12/2002 | |
| JP | 2003-507096 A | 2/2003 | |
| JP | 2007-500764 A | 1/2007 | |
| JP | 2007-501656 A | 2/2007 | |
| JP | 2011-072438 A | 4/2011 | |
| JP | 2012-251057 A | 12/2012 | |
| JP | 2012-532677 A | 12/2012 | |
| JP | 5820918 B1 | 11/2015 | |
| JP | 2016-210992 A | 12/2016 | |
| JP | 2014-065681 A | 4/2017 | |
| JP | 2017-141477 A | 8/2017 | |
| JP | 2020-500068 A | 1/2020 | |
| KR | 2018-0110695 A | 10/2018 | |
| WO | WO 92/07899 A2 | 5/1992 | |
| WO | WO 97/41180 A1 | 11/1997 | |
| WO | WO 99/44665 A2 | 9/1999 | |
| WO | WO 01/68746 A1 | 9/2001 | |
| WO | WO 2007/002004 A2 | 1/2007 | |
| WO | WO 2012/032881 A1 | 3/2012 | |
| WO | WO 2012/122023 A2 | 9/2012 | |
| WO | WO 2014/063711 A1 | 5/2014 | |
| WO | WO 2014/077886 A1 | 5/2014 | |
| WO | WO 2017/112878 A1 | 6/2017 | |
| WO | WO 2018/237166 A1 | 12/2018 | |
| WO | WO 2021/168284 A1 | 8/2021 | |

(56) References Cited

FOREIGN PATENT DOCUMENTS

OTHER PUBLICATIONS

U.S. Appl. No. 16/014,886, filed Jun. 21, 2018, Mannarino et al.
U.S. Appl. No. 16/719,753, filed Dec. 18, 2019, Mannarino et al.
PCT/US2021/021064, May 7, 2021, International Search Report and Written Opinion.
U.S. Appl. No. 17/841,813, filed Jun. 16, 2022, Biggins et al.
U.S. Appl. No. 17/944,966, filed Sep. 14, 2022, Bassett et al.
U.S. Appl. No. 17/361,025, filed Jun. 28, 2021, Bassett et al.
U.S. Appl. No. 18/640,689, filed Apr. 19, 2024, Bassett et al.
Hamada et al., Melting point of polyvinyl alcohol. Polym Chem. 1966;23(254):395-9.
International Search Report and Written Opinion for PCT/US2021/021064 mailed May 7, 2021.
[No Author Listed], Dimethyl Sulfoxide Physical Properties. Gaylord Chemical Company, L.L.C., Bulletin 101. Jun. 2014. 14 pages.
Chirila et al., Poly(2-hydroxyethyl methacrylate) sponges as implant materials: in vivo and in vitro evaluation of cellular invasion. Biomaterials. 1993;14(1):26-38.
Fukumori et al., Significant Improvement of Mechanical Properties for Polyvinyl Alcohol Film Prepared from Freeze/Thaw Cycled Gel. Open J Org Polym Mater. Oct. 2013;3(4):110-6.
Kang, The synthesis of nanoporous hydrogels using sacrificial block copolymers. Dissertation. Massachusetts Institute of Technology. Jul. 21, 2006. 106 pages.
Peppas et al., Semicrystalline poly(vinyl alcohol) films and their blends with poly(acrylic acid) and poly(ethylene glycol) for drug delivery applications. Journal of Drug Delivery Science and Technology. 2004; 14(4):291-297.
Sandeman et al., Adsorption of anionic and cationic dyes by activated carbons, PVA hydrogels, and PVA/AC composite. J Colloid Interface Sci. Jun. 15, 2011;358(2):582-92. doi:10.1016/j.jcis.2011.02.031. Epub Feb. 17, 2011.
Speybrouck et al., Successful superior thyroid artery embolisation using microporous beads. European Society for Vascular Surgery. 2012;24:e5-e6.

* cited by examiner

PACKAGING FOR HYDRATED ARTICLES AND RELATED METHODS

RELATED APPLICATIONS

This application claims priority under 35 U.S.C. § 119(e) to U.S. provisional application, U.S. Ser. No. Application No. 62/986,571, filed Mar. 6, 2020, which is hereby incorporated by reference in its entirety for all purposes.

TECHNICAL FIELD

The technical field generally relates to packaged articles e.g., comprising catheters and/or polymeric materials.

BACKGROUND

Biomaterials with high strength, low thrombogenicity, lubricious surface properties and containing a biologically active agent are useful in the medical arts. The porosity of the biomaterials allows for both high strength bulk materials for medical devices and channels for the controlled dissolution of biologically active agents. These biologically active properties may prevent or reduce biofilm, microbial colonization, infection, fibrin sheath formation, inflammation, pain, and/or tumor growth, and/or may treat physiological conditions such as tumor reduction, fungal and bacterial infections, inflammation, and pain. Complications seen with such devices lengthen hospital stays and increase patient morbidity and mortality.

Accordingly, improved devices and methods are needed.

SUMMARY

Packaging for hydrated articles are generally disclosed herein.

In one aspect, packaged articles are provided.

In some embodiments, the packaged article comprises a container comprising a foil material and a catheter comprising a polymeric material, the polymeric material having a water content of greater than or equal to 2 w/w % and less than or equal to 40 w/w %, wherein the water content is less than an equilibrium water content of the polymeric material, and wherein the polymeric material is configured to swell in an amount greater than or equal to 5 w/w % to the equilibrium water content state.

In some embodiments, the package article comprises a container comprising a foil material and a polymeric material comprising poly(vinyl) alcohol, the polymeric material having a water content of greater than or equal to 2 w/w % and less than or equal to 40 w/w %, wherein the water content is less than an equilibrium water content of the polymeric material, and wherein the polymeric material is configured to swell in an amount greater than or equal to 5 w/w % to the equilibrium water content state.

In another aspect, methods are provided.

In some embodiments, the method comprises sealing a catheter in a first container containing a humidity control component, removing the humidity control component from the first container, and sealing the catheter in a second container, the second container comprising a foil material.

In some embodiments, the method comprises sealing a catheter in a first container containing a humidity control component, removing the humidity control component from the first container, and resealing the first container, the first container comprising a first portion comprising the foil material and a second portion comprising a vapor permeable polymer.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
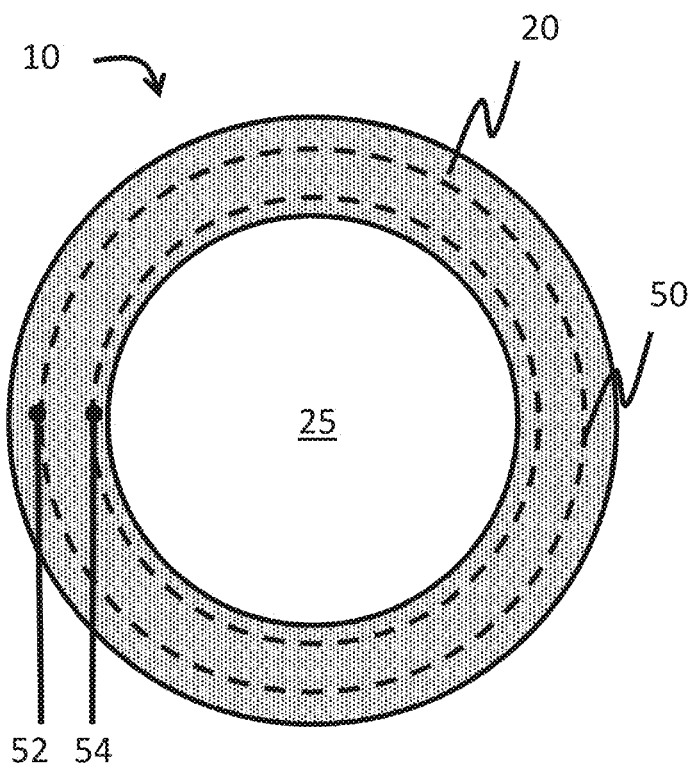
FIG. 1A is a cross-sectional schematic diagram of an exemplary device, according to one set of embodiments.

Packaging for hydrated articles are generally provided. In some embodiments, packaged articles are provided. For example, in some embodiments, a container contains an article such as a catheter and/or polymeric material. The disclosed packaged articles may be useful for, for example, providing controlled humidity conditions for contained components, maintaining consistent hydration levels of the packaged articles, and/or improved sterilization conditions. Advantageously, the packaged articles described herein may, in some embodiments, create an environment with minimum relative humidity for long-term storage of a catheter or polymeric material, increase shelf life of the catheter or polymeric material, and/or facilitate hydration of a catheter such that e.g., the catheter hydrates to intended dimensions within a specified amount of time. Methods for preparing such packaged article are also provided. The packaged articles may be useful for, for example, containing devices such as catheters and/or polymeric materials (including other types of medical devices formed all or in part from the polymeric material). The devices, catheters, and/or polymeric materials may be designed and configured for administration to a subject (e.g., a patient). Such devices and/or polymeric materials may be substantially non-thrombogenic, lubricious, and/or biocompatible.

The devices described herein may be useful for a wide variety of applications including, for example, administration of biologically active agents. In some embodiments, therapeutic, antimicrobial, or antiseptic active agents may be incorporated into a bulk material (e.g., a polymeric material) of the device such that the agent is released from the bulk material. In some such embodiments, the biologically active agent may advantageously prevent or reduce biofilm, microbial colonization, infection, fibrin sheath formation, inflammation, pain, and/or tumor growth, and/or may treat physiological conditions such as tumor reduction, fungal and bacterial infections, inflammation, and pain. The devices described herein may be used, in some cases, to make blood-contacting devices or devices that contact bodily fluids, including ex vivo and/or in vivo devices, such as blood contacting implants. Examples of drug delivery devices in which the devices described herein may embody or be incorporated into include but are not limited to medical tubing, wound dressing, contraceptive devices, feminine hygiene, endoscopes, grafts (e.g., including small diameter of less than or equal to 6 mm), pacemakers, implantable cardioverter-defibrillators, cardiac resynchronization devices, cardiovascular device leads, ventricular assist devices, catheters (e.g., including cochlear implants, endotracheal tubes, tracheostomy tubes, ports, shunts), implantable sensors (e.g., intravascular, transdermal, intracranial), ventilator pumps, and ophthalmic devices including drug delivery systems.

In some embodiments, the devices described herein comprise a body portion. For example, as shown illustratively in FIG. 1A, device 10 comprises a body portion 20. In some embodiments, body portion 20 is formed of and/or comprises a polymeric material. The polymeric material may comprise a first water soluble polymer. In some embodiments a biologically active agent 50 is associated with the polymeric material.

In some embodiments, one or more biologically active agents is present throughout the bulk of the polymeric material (e.g., distributed throughout the polymeric material matrix). For example, in some embodiments, a first arbitrary section 52 within a cross-section of body portion 20 comprises a non-zero concentration of a biologically active agent. In some embodiments, a second arbitrary section 54, different than first arbitrary section 52, within a cross-section of body portion 20 comprises a non-zero concentration of the biologically active agent. Those of ordinary skill in the art would understand, based upon the teachings of this specification, that the presence of a biologically active agent within the bulk of a polymeric material (e.g., embedded in the polymer matrix of the polymeric material) is not intended to refer to a coating of a biologically active agent on a polymeric material but, by contrast, is intended to refer to a biologically active agent distributed throughout the bulk of the polymeric material. However, in some embodiments, a coating comprises the biologically active agent may optionally be present. Examples of sections are described in more detail below.

While body portion 20, section 52 and section 54 in FIG. 1A are depicted as circular, those of ordinary skill in the art would understand, based upon the teachings of this specification, that the body portion and other sections in embodiments disclosed herein need not be circular, and other cross-sectional shapes (e.g., planar, rectangular, square, oval, oblong, S-shaped, etc.) are also possible. For example, in some embodiments, the body portion is S-shaped, which can, in some cases, provide ease of implantation in a subject, achieve lower infiltration rates, and reduce the likelihood of dislodgement within the subject.

In some embodiments, as described in more detail below, the body portion (e.g., the polymeric material) may comprise a plurality of pores. The polymeric material of the body portion may comprise a first water soluble polymer as described herein. In some embodiments, the biologically active agent is distributed within the polymeric material (e.g., the first water soluble polymer) homogeneously or non-homogeneously to within one of the above-noted ranges, but not within the plurality of pores. That is to say, in some embodiments, the plurality of pores may be substantially devoid of the biologically active agent. In some embodiments, the plurality of pores may comprise a second biologically active agent, the same or different than a (first) biologically active agent present within the polymeric material forming the bulk of the device (e.g., the polymeric material comprising a first water soluble polymer). In yet other embodiments, the biologically active agent is present only in the plurality of pores.

In an exemplary set of embodiments, the device is a catheter. In some embodiments, the catheter is configured for administration to a subject. For example, in some embodiments, a catheter is formed of a polymeric material and is configured for administration to a subject, wherein the catheter comprises a biologically active agent distributed within the polymeric material (e.g., distributed homogeneously). In some embodiments, the catheter comprises a body portion, wherein the body portion is formed of a polymeric material comprising a first water soluble polymer, as described herein.

In some aspects, kits are described. The kit may comprise any suitable articles described herein. In some embodiments, the kit comprises a device (e.g., any embodiment of a device described herein or combinations thereof).

Figure 5A:
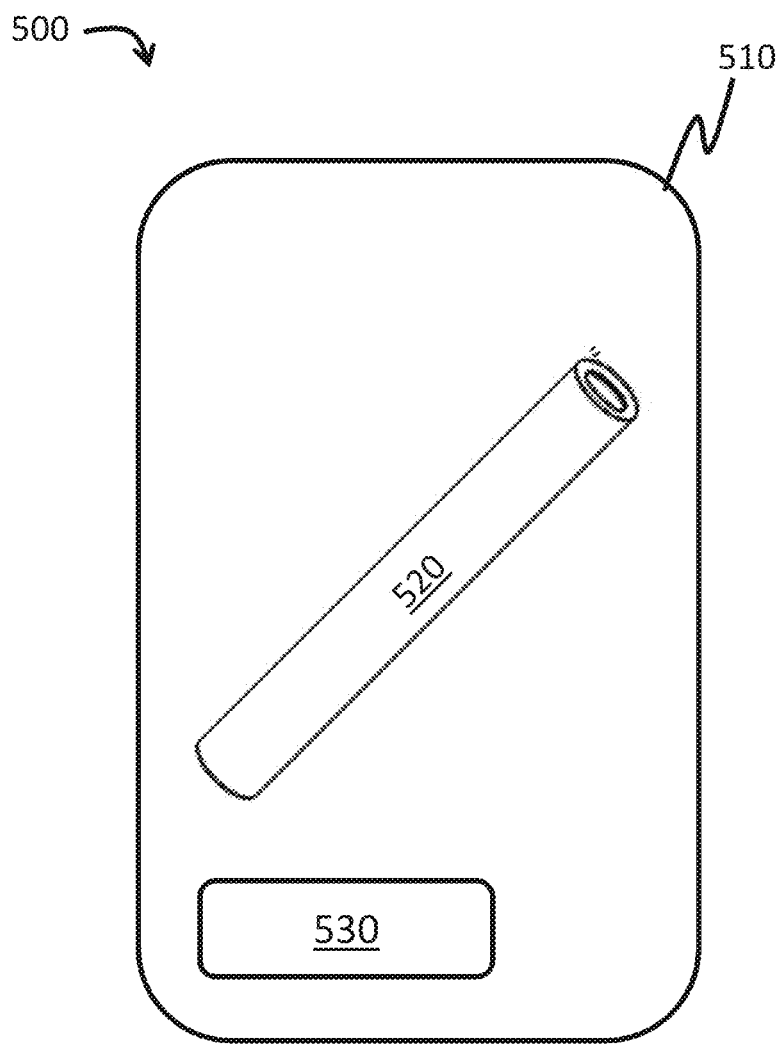
FIG. 5A is a cross-sectional schematic diagram of an exemplary packaged article containing a device, according to one set of embodiments.

In some aspects, packaged articles are provided. The packaged article may comprise a plurality of components. For example, the packaged article may comprise a container and a device (e.g., catheter) and/or polymeric material contained within the container. For example, as illustrated in FIG. 5A, packaged article 500 comprises container 510 (e.g., a pouch) and a device 520 (e.g., a catheter, a polymeric material) contained therein. While a catheter is generally depicted in FIG. 5, those of ordinary skill in the art would understand based upon the teachings of this specification that the container may contain other articles. For example, in some embodiments, the container contains a polymeric material (or article/device comprising the polymeric material), as described herein.

In some embodiments, the packaged article further comprises a humidity control component such as a humidity control sponge. For example, as illustrated in FIG. 5A, packaged article 500 further comprises humidity control component 530. The humidity control sponge may comprise a woven, non-woven, porous, and/or solid material comprising water and/or hydration media. In some embodiments, the humidity control sponge is a porous cellulose non-woven fabric swollen with water. In some embodiments, the humidity control sponge further comprises an antiseptic or anti-infective agent (e.g., bleach, sodium hypochlorite, peroxides, and/or peracetic acid).

In some embodiments, the humidity control component is a reservoir associated with the container. In some embodiments, the reservoir comprises hydration media. In some embodiments, the reservoir is in fluidic communication with a humidity control component and/or the device (e.g., the catheter), e.g., while the components are packaged in the container.

In some embodiments, the kit and/or packaged article further comprises hydration media. Non-limiting examples of suitable hydration media include water, lactated Ringer's solution (LRS), dextrose (D5W), phosphate buffered saline (PBS), Hanks' Balanced Salt Solution (HBSS), and/or isotonic salt solutions. In some embodiments, a sufficient volume of hydration media required to fully hydrate the device and/or polymeric material to EWC is included in the kit and/or packaged article. In some embodiments, the hydration media is stored in a vessel, fluid reservoir, tube, syringe, bag, fluid pump, and/or packet. In some embodiments, the hydration media is sterilized. In some embodiments, the hydration media is buffered at or near physiological pH (e.g., 6.8-7.8).

In some embodiments, the kit and/or packaged article is sterile. In some embodiments, the kit is sealed. In some embodiments, the container is sealed.

In some embodiments, the kit and/or packaged article includes instructions for use. In some embodiments, the instructions for use describe a method of treatment described herein.

In some embodiments, the kit comprises a packaged article.

In some embodiments, the packaged article comprises a flexible container. In some embodiments, the flexible container comprises fibers, such as flashspun high-density polyethylene fibers.

In some embodiments, the packaged article comprises a tray into which the device can be positioned for shipment.

In an exemplary set of embodiments, the packaged article comprises a container comprising a foil material and a catheter comprising a polymeric material. In another exemplary set of embodiments, the packaged article comprises a container comprising a foil material and a polymeric material (e.g., comprising poly(vinyl) alcohol). The polymeric material may be used to form all or a part of device as described herein. In some embodiments, the foil material is substantially impermeable to water. Any suitable material may be used for the foil material such that the foil material is substantially impermeable to water. In some embodiments, the foil material comprises aluminum, polyethylene terephthalate, or a combination thereof.

In some embodiments, the container comprises a vapor permeable polymer. In some embodiments, the vapor permeable polymer comprises high-density polyethylene. A non-limiting example of a suitable vapor permeable polymer includes Tyvex®.

Figure 5B:
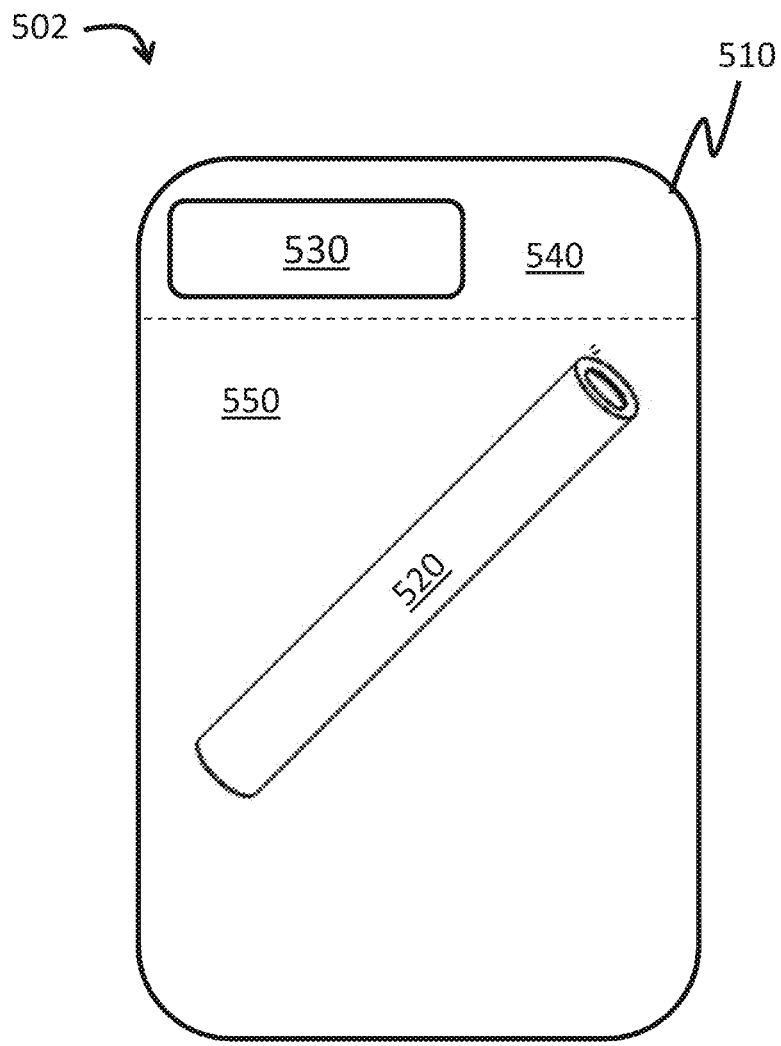
FIG. 5B is a cross-sectional schematic diagram of an exemplary packaged article containing a device, according to one set of embodiments.

In some embodiments, the container comprises a foil material and a vapor permeable polymer. In some embodiments, the container comprises a header portion. For example, as illustrated in FIG. 5B, packaged article 502 comprises container 510 comprising header portion 540 and second portion 550. Header portion 540 may comprise a vapor permeable polymer and the remaining portion of the container comprises a foil material. The header portion may be useful, in some embodiments, for sterilization of the contained article (e.g., via ethylene oxide sterilization). For example, the header portion may comprise a vapor permeable material such that the contents of the container may be sterilized.

Referring again to FIG. 5B, in some embodiments, humidity control component 530 is disposed within header portion 540. In some embodiments, the humidity control component is disposed within the second portion.

In some embodiments, the header portion may be removed (e.g., after sterilization of the packaged article and/or the device contained in the container). For example, upon completing the sterilization, in some embodiments, the header portion may be removed and/or sealed (e.g., such that the container substantially comprises a non-permeable material and/or is substantially non-permeable to vapor). In some embodiments, the humidity control component is removed upon completing sterilization. For example, the header portion and the humidity control component (e.g., disposed within the header portion) are removed (e.g., simultaneously) after sterilization of the container and/or the device contained within the container).

In some embodiments, the surface area of the inner surface of the container comprises a substantial amount of foil material. For example, in some embodiments, at least 80%, at least 85%, at least 90%, at least 95%, at least 98%, or at least 99% of the surface area of the inner surface of the container is the foil material. In some embodiments, less than or equal to 100%, less than or equal to 99%, less than or equal to 98%, less than or equal to 95%, less than or equal to 90%, or less than or equal to 85% of the surface area of the inner surface of the container is the foil material. Combinations of the above-referenced ranges are also possible (e.g., at least 80% and less than or equal to 100%). Other ranges are also possible.

In some embodiments, the polymeric material, catheter, or other device is contained in the container in an at least partially hydrated state. For example, in some embodiments, the polymeric material, catheter, or other device contained in the container has a water content of greater than or equal to 2 w/w % and less than or equal to 40 w/w % (e.g., greater than or equal to 2 w/w % and less than or equal to 12 w/w %, greater than or equal to 6 w/w % and less than or equal to 12 w/w %). In some embodiments, the water content of the polymeric material, catheter, or other device is less than an equilibrium water content of the polymeric material, catheter, or other device. In some embodiments, the polymeric material, catheter, or other device is configured to swell in an amount greater than or equal to 5 w/w % to the equilibrium water content state. Other polymeric materials and water contents are also possible, and are described herein.

In some embodiments, the polymeric material, catheter, or other device is contained in the container in a fully hydrated state (e.g., is at an equilibrium water content state).

The container may have any suitable size and/or shape. In some embodiments, the container is a pouch, a bag, and/or a vessel (e.g., a thermal oven, a chamber, a bottle).

In some embodiments, the catheter, device and/or polymeric material may be removed from the packaged article. In some embodiments, upon removal of the packaged article, the catheter, device and/or polymeric material may be (re) hydrated as described herein (e.g., to equilibrium water content).

In some embodiments, the packaged article may be formed by sealing a catheter, device and/or polymeric material in a first container containing a humidity control component. In some embodiments, the humidity control component may be removed from the first container (e.g., during assembly or formation of the packaged article and/or before the packaged article is used by a user).

In some embodiments, a second container (e.g., comprising a foil material) may be used to seal the catheter, device and/or polymeric material. For example, upon removal of the humidity control component, the catheter, device and/or polymeric material may be sealed in a second container comprising the foil material. In some embodiments, upon removal of the humidity control component, the catheter, device and/or polymeric material may be resealed in the first container. In some such embodiments, the first container may comprise a first portion comprising the foil material and a second portion comprising a vapor permeable polymer. For example, in some embodiments, the first container may comprise a header portion comprising the vapor permeable polymer and a second portion comprising the foil material.

The humidity control component may be removed from the container (e.g., the first container) after any suitable amount of time. For example, in some embodiments, the humidity control component may be removed after greater than or equal to 0 hours, greater than or equal to 1 hour, greater than or equal to 2 hours, greater than or equal to 5 hours, greater than or equal to 10 hours, greater than or equal to 24 hours, greater than or equal to 30 hours, greater than or equal to 48 hours, greater than or equal to 70 hours, greater than or equal to 90 hours, or greater than or equal to 110 hours (e.g., after sealing of the container (e.g., the first container)). In some embodiments, the humidity control component is removed after less than or equal to 120 hours, less than or equal to 110 hours, less than or equal to 90 hours, less than or equal to 70 hours, less than or equal to 48 hours, less than or equal to 30 hours, less than or equal to 24 hours, less than or equal to 10 hours, less than or equal to 5 hours, or less than or equal 2 hours after sealing the container (e.g., the first container). Combinations of the above-referenced ranges are also possible (e.g., greater than or equal to 0 hours and less than or equal to 120 hours, greater than or equal to 10 hours and less than or equal to 120 hours greater than or equal to 24 hours and less than or equal to 48 hours). Other ranges are also possible.

In some embodiments, the catheter may be sterilized (e.g., in the first container). As described herein, in some embodiments, the container comprises a vapor permeable material (e.g., polymer) to facilitate sterilization in the container. For example, the vapor permeable material may be permeable to ethylene oxide such that the contents of the container (e.g., the catheter, polymeric material, or other article) is sterilized upon exposure of the container to ethylene oxide. The vapor permeable material may be removed and/or the container may be resealed.

In some embodiments, the humidity control component is removed substantially immediately after sterilization. In some embodiments, the container is resealed substantially immediately after sterilization.

As described above, in some embodiments, the device comprises a body portion. In some embodiments, the body portion comprises a plurality of pores. In some embodiments, the plurality of pores (e.g., device 12 of FIG. 1B, device 14 of FIG. 1C) or of a first water soluble material, optionally having a second water soluble polymer positioned within at least a portion of said pores) have a particular mean pore size. In some embodiments, the mean pore size of the plurality of pores is less than or equal to 500 nm, less than or equal to 450 nm, less than or equal to 400 nm, less than or equal to 350 nm, less than or equal to 300 nm, less than or equal to 250 nm, less than or equal to 200 nm, less than or equal to 150 nm, less than or equal to 100 nm, less than or equal to 75 nm, less than or equal to 50 nm, less than or equal to 25 nm, less than or equal to 20 nm, or less than or equal to 15 nm. In some embodiments, the plurality of pores have a mean pore size of greater than or equal to 10 nm, greater than or equal to 15 nm, greater than or equal to 20 nm, greater than or equal to 25 nm, greater than or equal to 50 nm, greater than or equal to 75 nm, greater than or equal to 100 nm, greater than or equal to 150 nm, greater than or equal to 200 nm, greater than or equal to 250 nm, greater than or equal to 300 nm, greater than or equal to 350 nm, greater than or equal to 400 nm, or greater than or equal to 450 nm. Combinations of the above referenced ranges are also possible (e.g., less than or equal to 500 nm and greater than or equal to 10 nm). Other ranges are also possible. Mean pore size, as described herein, may be determined by mercury intrusion porosimetry of the material in a first configuration (e.g., a water content less than the equilibrium water content state, such as the dehydrated state).

In some embodiments, at least a portion of the plurality of pores may be characterized as nanopores, e.g., pores having an average cross-sectional dimension of less than 1 micron. In some embodiments, at least a portion of the plurality of pores may be characterized as micropores, e.g., pores having an average cross-sectional dimension of less than 1 mm and greater than or equal to 1 micron. In some embodiments, at least 50% (e.g., at least 60%, at least 70%, at least 80%, at least 90%, at least 95%, at least 98%, at least 99%, at least 99.9%) of the plurality of pores have a diameter that is less than or equal to 1 micron, less than or equal to 800 nm, less than or equal to 600 nm, less than or equal to 500 nm, less than or equal to 450 nm, less than or equal to 400 nm, less than or equal to 350 nm, less than or equal to 300 nm, less than or equal to 250 nm, less than or equal to 200 nm, less than or equal to 150 nm, less than or equal to 100 nm, less than or equal to 75 nm, less than or equal to 50 nm, less than or equal to 25 nm, less than or equal to 20 nm, or less than or equal to 15 nm. In some cases, at least 50% of the plurality of pores have a diameter that is greater than or equal to 10 nm, greater than or equal to 15 nm, greater than or equal to 20 nm, greater than or equal to 25 nm, greater than or equal to 50 nm, greater than or equal to 75 nm, greater than or equal to 100 nm, greater than or equal to 150 nm, greater than or equal to 200 nm, greater than or equal to 250 nm, greater than or equal to 300 nm, greater than or equal to 350 nm, greater than or equal to 400 nm, greater than or equal to 450 nm, greater than or equal to 500 nm, greater than or equal to 600 nm, or greater than or equal to 800 nm. Combinations of the above referenced ranges are also possible (e.g., less than or equal to 1000 nm and greater than or equal to 10 nm). Other ranges are also possible.

The compositions and devices (e.g., device 10 of FIG. 1A, device 12 of FIG. 1B, device 14 of FIG. 1C) described herein may have a particular porosity e.g., in a first configuration (e.g., a water content less than the equilibrium water content state, such as the dehydrated state). In some embodiments, the device (or polymeric material) has a porosity of greater than or equal to 5%, greater than or equal to 10%, greater than or equal to 15%, greater than or equal to 20%, greater than or equal to 25%, greater than or equal to 30%, greater than or equal to 35%, greater than or equal to 40%, or greater than or equal to 45% in a first configuration (e.g., a water content less than the equilibrium water content state, such as the dehydrated state). In some embodiments, the device (or polymeric material) has a porosity of less than or equal to 50%, less than or equal to 45%, less than or equal to 40%, less than or equal to 35%, less than or equal to 30%, less than or equal to 25%, less than or equal to 20%, less than or equal to 15%, or less than or equal to 10% in a first configuration (e.g., a water content less than the equilibrium water content state, such as the dehydrated state). Combinations of the above-referenced ranges are also possible (e.g., greater than or equal to 5% and less than or equal to 50% in a first configuration (e.g., a water content less than the equilibrium water content state, such as the dehydrated state)). Other ranges are also possible.

As described herein, in some embodiments, the device, method, catheter, or kit (or polymeric material) described herein is substantially non-thrombogenic.

In some embodiments, the device (e.g., device 10 of FIG. 1A, device 12 of FIG. 1B, device 14 of FIG. 1C) (or body portion (e.g., body portion 20 of FIGS. 1A-1B)) is hydrophilic. The term "hydrophilic" as used herein is given its ordinary meaning in the art and refers to a material surface having a water contact angle as determined by goniometry of less than 90 degrees. In some embodiments, the polymeric material (or a surface thereof) (e.g., of the device) has a water contact angle of less than or equal to 45 degrees, less than or equal to 40 degrees, less than or equal to 35 degrees, less than or equal to 30 degrees, less than or equal to 25 degrees, less than or equal to 20 degrees, less than or equal to 15 degrees, less than or equal to 10 degrees, less than or equal to 5 degrees, or less than or equal to 2 degrees at an equilibrium water content state. In some embodiments, the polymeric material (or a surface thereof) has a water contact angle of greater than or equal to 1 degree, greater than or equal to 2 degrees, greater than or equal to 5 degrees, greater than or equal to 10 degrees, greater than or equal to 15 degrees, greater than or equal to 20 degrees, greater than or equal to 25 degrees, greater than or equal to 30 degrees, greater than or equal to 35 degrees, or greater than or equal to 40 degrees at an equilibrium water content state. Combinations of the above-referenced ranges are also possible (e.g., greater than or equal to 1 degree and less than or equal to 45 degrees). Other ranges are also possible.

Equilibrium water content state, as used herein, refers the steady state of a device (or material) which does not gain (e.g., absorb) or lose bulk water content as determined when submerged in water at 25° C. without externally applied mechanical stresses. Those skilled in the art would understand that steady state (or equilibrium water content state) shall be understood to not require absolute conformance to a strict thermodynamic definition of such term, but, rather, shall be understood to indicate conformance to the thermodynamic definition of such term to the extent possible for the subject matter so characterized as would be understood by one skilled in the art most closely related to such subject matter (e.g., accounting for factors such as passive diffusion and/or Brownian motion).

In some embodiments, the equilibrium water content state of the device (or polymeric material) is greater than or equal to 10 w/w %, greater than or equal to 20 w/w %, greater than or equal to 25 w/w %, greater than or equal to 30 w/w %, greater than or equal to 35 w/w %, greater than or equal to 40 w/w %, greater than or equal to 45 w/w %, greater than or equal to 50 w/w %, greater than or equal to 55 w/w %, greater than or equal to 60 w/w %, greater than or equal to 65 w/w %, or greater than or equal to 70 w/w %. In some embodiments, the equilibrium water content state of the device (or polymeric material) is less than or equal to 80 w/w %, less than or equal to 75 w/w %, less than or equal to 70 w/w %, less than or equal to 65 w/w %, less than or equal to 60 w/w %, less than or equal to 55 w/w %, less than or equal to 50 w/w %, less than or equal to 45 w/w %, less than or equal to 40 w/w %, less than or equal to 35 w/w %, less than or equal to 30 w/w %, less than or equal to 25 w/w %, or less than or equal to 20 w/w %. Combinations of these ranges are also possible (e.g., greater than or equal to 10 w/w % and less than or equal to 80 w/w %). Other ranges are also possible.

In some embodiments, the device (e.g., device 10 of FIG. 1A, device 12 of FIG. 1B, device 14 of FIG. 1C) is substantially lubricious at an equilibrium water content state. For example, in some embodiments, the device (or polymeric material of the device) has a surface roughness of less than or equal to 1000 nm (Ra) at an equilibrium water content state. In some embodiments, the device (or polymeric material of the device) has a surface roughness (Ra) of less than or equal to 500 nm, less than or equal to 400 nm, less than or equal to 300 nm, less than or equal to 250 nm, less than or equal to 200 nm, less than or equal to 150 nm, less than or equal to 100 nm, less than or equal to 50 nm, less than or equal to 25 nm, less than or equal to 10 nm, or less than or equal to 5 nm at an equilibrium water content state. In some embodiments, the device (or polymeric material of the device) has a surface roughness (Ra) of greater than or equal to 5 nm at an equilibrium water content state, greater than or equal to 10 nm, greater than or equal to 25 nm, greater than or equal to 50 nm, greater than or equal to 100 nm, greater than or equal to 150 nm, greater than or equal to 200 nm, greater than or equal to 250 nm, greater than or equal to 300 nm, greater than or equal to 400 nm, or greater than or equal to 500 nm at an equilibrium water content state. Combinations of the above-referenced ranges are also possible (e.g., greater than or equal to 5 nm and less than or equal to 1000 nm). Other ranges are also possible.

In some embodiments, the device (e.g., device 10 of FIG. 1A, device 12 of FIG. 1B, device 14 of FIG. 1C) has a surface having a coefficient of friction of less than or equal to 0.10 at an equilibrium water content state. For example, the coefficient of friction of a surface of the device (or polymeric material of the device) is less than or equal to 0.1, less than or equal to 0.09, less than or equal to 0.08, less than or equal to 0.07, less than or equal to 0.06, less than or equal to 0.05, less than or equal to 0.04, less than or equal to 0.03, or less than or equal to 0.02. In some embodiments, the coefficient of friction of the surface of the device (or polymeric material of the device) is greater than or equal to 0.01, greater than or equal to 0.02, greater than or equal to 0.03, greater than or equal to 0.04, greater than or equal to 0.05, greater than or equal to 0.06, greater than or equal to 0.07, greater than or equal to 0.08, or greater than or equal to 0.09. Combinations of the above-referenced ranges are also possible (e.g., less than or equal to 0.1 and greater than or equal to 0.01). Other ranges are also possible.

Advantageously, the compositions and devices described herein may have low sorption of substances such as therapeutic agents (and/or e.g., proteins) in the presence of a dynamic fluid comprising such substances. Such devices and compositions may be useful for use in subjects where, for example, the presence of the device should not substantially decrease the availability and/or concentration of therapeutic agents delivered to the subject (e.g., via the device). In some embodiments, administration of therapeutic agents via a fluid flowed within the devices described herein do not substantially reduce the concentration of the therapeutic agent within the fluid. In some cases, the device may not absorb and/or adsorb the therapeutic agent, e.g., during flow or use.

In some embodiments, less than or equal to 0.5 w/w % sorption of a therapeutic agent to the surface and/or bulk of the first water-soluble polymer occurs as determined at equilibrium water content after exposing the polymer to the therapeutic agent and flushing with 5 times the volume of the device with an aqueous solution, such as water or normal saline. In some embodiments, less than or equal to 0.5 w/w %, less than or equal to 0.4 w/w %, less than or equal to 0.3 w/w %, less than or equal to 0.2 w/w %, or less than or equal to 0.1 w/w % sorption of the therapeutic agent to the surface and/or bulk of the first water-soluble polymer occurs. In some embodiments, greater than or equal to 0.05 w/w %, greater than or equal to 0.1 w/w %, greater than or equal to 0.2 w/w %, greater than or equal to 0.3 w/w %, or greater than or equal to 0.4 w/w % sorption of the therapeutic agent to the surface and/or bulk of the first water-soluble polymer occurs. Combinations of the above-referenced ranges are also possible (e.g., less than or equal to 0.5 w/w % and greater than or equal to 0.05 w/w %). Other ranges are also possible.

Advantageously, the devices and compositions described herein may have desirable swelling characteristics (e.g., in water, in saline, in a fluidic environment of a subject).

In some embodiments, the devices (or polymeric materials) described herein have a first configuration (e.g., a water content less than the equilibrium water content state, such as the dehydrated state) with a water content of less than or equal to 40 w/w %, less than or equal to 30 w/w %, less than or equal to 20 w/w %, less than or equal to 10 w/w %, less than or equal to 5 w/w %, less than or equal to 4 w/w %, less than or equal to 3 w/w %, less than or equal to 2 w/w %, less than or equal to 1 w/w %, less than or equal to 0.8 w/w %, less than or equal to 0.6 w/w %, less than or equal to 0.4 w/w %, or less than or equal to 0.2 w/w %. In some embodiments, the devices (or polymeric materials) described herein have a first configuration (e.g., a water content less than the equilibrium water content state, such as the dehydrated state) with a water content of greater than or equal to 0.1 w/w %, greater than or equal to 0.2 w/w %, greater than or equal to 0.4 w/w %, greater than or equal to 0.6 w/w %, greater than or equal to 0.8 w/w %, greater than or equal to 1 w/w %, greater than or equal to 2 w/w %, greater than or equal to 3 w/w %, greater than or equal to 4 w/w %, greater than or equal to 5 w/w %, greater than or equal to 6 w/w %, greater than or equal to 7 w/w %, greater than or equal to 8 w/w %, greater than or equal to 9 w/w %, greater than or equal to 10 w/w %, greater than or equal to 15 w/w, greater than or equal to 20 w/w %, greater than or equal to 25 w/w %, greater than or equal to 30 w/w %, or greater than or equal to 35 w/w %. Combinations of the above-referenced ranges are also possible (e.g., greater than or equal to 0.1 w/w % and less than 5 w/w %, greater than or equal to 2 w/w % and less than or equal to 10 w/w %, greater than or equal to 2 w/w % and less than or equal to 40 w/w %, or greater than or equal to 6 w/w % and less than or equal to 40 w/w %). Other ranges are also possible.

In some embodiments, the devices (or polymeric materials) described herein have a first configuration (e.g., a water content less than the equilibrium water content state, such as the dehydrated state). In some embodiments, the devices (or polymeric materials) described herein swell from a first configuration (e.g., a water content less than the equilibrium water content state, such as the dehydrated state) to a second configuration (e.g., the equilibrium water content state) in less than or equal to 60 minutes (e.g., less than or equal to 10 minutes, less than or equal to 5 minutes, less than or equal to 1 minute, or less than or equal to 10 seconds). In some embodiments, the devices (or polymeric materials) described herein swell from a first configuration (e.g., a water content less than the equilibrium water content state, such as the dehydrated state) to a second configuration (e.g., the equilibrium water content state) at 25° C. under ambient conditions.

In some embodiments, the devices (or polymeric materials) described herein swell in an amount greater than or equal to 2 w/w %, greater than or equal to 3 w/w %, greater than or equal to 4 w/w %, greater than or equal to 5 w/w %, greater than or equal to 10 w/w %, greater than or equal to 15 w/w %, greater than or equal to 20 w/w %, greater than or equal to 25 w/w %, greater than or equal to 30 w/w %, greater than or equal to 35 w/w %, greater than or equal to 40 w/w %, or greater than or equal to 45 w/w %, for example, from a first configuration (e.g., a water content less than the equilibrium water content state, such as the dehydrated state) to a second configuration (e.g., the equilibrium water content state). In some embodiments, the devices (or polymeric materials) described herein swell in an amount less than or equal to 50 w/w %, less than or equal to 45 w/w %, less than or equal to 40 w/w %, less than or equal to 35 w/w %, less than or equal to 30 w/w %, less than or equal to 25 w/w %, less than or equal to 20 w/w %, less than or equal to 15 w/w %, less than or equal to 10 w/w %, less than or equal to 5 w/w %, less than or equal to 4 w/w %, or less than or equal to 3 w/w %, for example, from a first configuration (e.g., a water content less than the equilibrium water content state, such as the dehydrated state) to a second configuration (e.g., the equilibrium water content state). Combinations of these ranges are also possible (e.g., greater than or equal to 5 w/w % and less than or equal to 40 w/w %).

In some embodiments, the devices (e.g., device 10 of FIG. 1A, device 12 of FIG. 1B, device 14 of FIG. 1C) described herein are in a first configuration (e.g., a water content less than the equilibrium water content state, such as the dehydrated state). For example, in some embodiments, the devices (or polymeric materials) described herein have a water content of less than or equal to 40 w/w %, less than or equal to 30 w/w %, less than or equal to 20 w/w %, less than or equal to 10 w/w %, less than or equal to 5 w/w %, less than or equal to 4 w/w %, less than or equal to 3 w/w %, less than or equal to 2 w/w %, less than or equal to 1 w/w %, less than or equal to 0.8 w/w %, less than or equal to 0.6 w/w %, less than or equal to 0.4 w/w %, or less than or equal to 0.2 w/w % in a first configuration (e.g., a water content less than the equilibrium water content state, such as the dehydrated state). In some embodiments, the devices (or polymeric materials) described herein have a water content of greater than or equal to 0.1 w/w %, greater than or equal to 0.2 w/w %, greater than or equal to 0.4 w/w %, greater than or equal to 0.6 w/w %, greater than or equal to 0.8 w/w %, greater than or equal to 1 w/w %, greater than or equal to 2 w/w %, greater than or equal to 3 w/w %, or greater than or equal to 4 w/w %. Combinations of the above-referenced ranges are also possible (e.g., greater than or equal to 0.1 w/w % and less than 5 w/w % or greater than or equal to 2 w/w % and less than or equal to 40 w/w %). Other ranges are also possible. The dehydrated state, as described herein, generally refers to the steady state determined under ambient conditions in which the device (or polymeric material) has no appreciable decrease in water content of less than 5 w/w % over 24 hours. In some embodiments, the devices described herein may comprise a coating or unbound porogen, such as a humectant coating, as described in more detail below.

Advantageously, the devices and compositions described herein may be configured for rapid swelling in the presence of an aqueous solution, such as water and/or saline. In some embodiments, the device (e.g., device 10 of FIG. 1A, device 12 of FIG. 1B, device 14 of FIG. 1C) (or body portion (e.g., body portion 20 of FIGS. 1A-1C) or polymeric material) is configured to swell in an amount greater than or equal to 2 w/w %, greater than or equal to 5 w/w %, greater than or equal to 10 w/w %, greater than or equal to 15 w/w %, greater than or equal to 20 w/w %, greater than or equal to 25 w/w %, greater than or equal to 30 w/w %, greater than or equal to 35 w/w %, greater than or equal to 40 w/w %, or greater than or equal to 45 w/w %, for example, from a first configuration (e.g., a water content less than the equilibrium water content state, such as the dehydrated state) to a second configuration (e.g., equilibrium water content state), e.g., at 25° C., e.g., in a particular amount of time (e.g., less than or equal to 60 minutes, less than or equal to 10 minutes, less than or equal to 5 minutes, less than or equal to 1 minute, or less than or equal to 10 seconds), as described in more detail below. In some embodiments, the device or device (or body portion) is configured to swell in an amount less than or equal to 50 w/w %, less than or equal to 45 w/w %, less than or equal to 40 w/w %, less than or equal to 35 w/w %, less than or equal to 30 w/w %, less than or equal to 25 w/w %, less than or equal to 20 w/w %, less than or equal to 15 w/w %, or less than or equal to 10 w/w %, for example, from a first configuration (e.g., a water content less than the equilibrium water content state, such as the dehydrated state) to a second configuration (e.g., an equilibrium water content state), e.g., at 25° C., e.g., in a particular amount of time (e.g., less than or equal to 60 minutes, less than or equal to 10 minutes, less than or equal to 5 minutes, less than or equal to 1 minute, or less than or equal to 10 seconds) as described in more detail below. Combinations of the above-referenced ranges are also possible (e.g., greater than or equal to 5 w/w % and less than or equal to 50 w/w %). Other ranges are also possible.

In some embodiments, the device (e.g., device 10 of FIG. 1A, device 12 of FIG. 1B, device 14 of FIG. 1C) (or body portion (e.g., body portion 20 of FIGS. 1A-1B)) is configured to swell in an amount greater than or equal to 2 w/w %, greater than or equal to 5 w/w %, for example, from a first configuration (e.g., a water content less than the equilibrium water content state, such as the dehydrated state) to a second configuration (e.g., an equilibrium water content state), in less than or equal to 60 minutes, less than or equal to 50 minutes, less than or equal to 40 minutes, less than or equal to 30 minutes, less than or equal to 20 minutes, less than or equal to 10 minutes, less than or equal to 5 minutes, less than or equal to 2 minutes, less than or equal to 1 minute, less than or equal to 30 seconds, or less than or equal to 10 seconds at 25° C. under ambient conditions. In some embodiments, the device (or polymeric material) is configured to swell in an amount greater than or equal to 5 w/w %, for example, from a first configuration (e.g., a water content less than the equilibrium water content state, such as the dehydrated state) to a second configuration (e.g., an equilibrium water content state), in greater than or equal to 5 seconds, greater than or equal to 15 seconds, greater than or equal to 1 minute, greater than or equal to 2 minutes, greater than or equal to 5 minutes, greater than or equal to 10 minutes, greater than or equal to 20 minutes, greater than or equal to 30 minutes, greater than or equal to 40 minutes, or greater than or equal to 50 minutes at 25° C. under ambient conditions. Combinations of the above-referenced ranges are also possible (e.g., less than or equal to 60 minutes and greater than or equal to 1 minute). Other ranges are also possible.

In an exemplary embodiment, the device (e.g., device 10 of FIG. 1A, device 12 of FIG. 1B, device 14 of FIG. 1C) (or body portion (e.g., body portion 20 of FIGS. 1A-1B)) is configured to swell to an equilibrium water content state (e.g., greater than or equal to 5 w/w % or greater than or equal to 20 w/w % and less than or equal to 80 w/w %) in less than or equal to 60 minutes (e.g., less than or equal to 10 minutes, less than or equal to 5 minutes, less than or equal to 1 minute, or less than or equal to 10 seconds) from a first configuration (e.g., a water content less than the equilibrium water content state, such as the dehydrated state) (e.g., less than 5 w/w % or greater than or equal to 2 w/w % and less than or equal to 40 w/w %) in water. In some embodiments, the device (or polymeric material) is configured to swell to an equilibrium water content (e.g., greater than or equal to 5 w/w % or greater than or equal to 20 w/w % and less than or equal to 80 w/w %) in less than or equal to 60 minutes (e.g., less than or equal to 10 minutes, less than or equal to 5 minutes, less than or equal to 1 minute, or less than or equal to 10 seconds) from, for example, a first configuration (e.g., a water content less than the equilibrium water content state, such as the dehydrated state) (e.g., less than 5 w/w %) in standard normal saline. In another exemplary embodiment, the device (or polymeric material) is configured to swell to an equilibrium water content (e.g., greater than or equal to 5 w/w % or greater than or equal to 20 w/w % and less than or equal to 80 w/w %) in less than or equal to 60 minutes (e.g., less than or equal to 10 minutes, less than or equal to 5 minutes, less than or equal to 1 minute, or less than or equal to 10 seconds) from, for example, a first configuration (e.g., a water content less than the equilibrium water content state, such as the dehydrated state) (e.g., less than 5 w/w %) in normal saline.

In some embodiments, the device (e.g., device 10 of FIG. 1A, device 12 of FIG. 1B, device 14 of FIG. 1C) (or body portion (e.g., body portion 20 of FIGS. 1A-1B)) has a particular length in the first configuration (e.g., a water content less than the equilibrium water content state, such as the dehydrated state). In some embodiments, the device (or polymeric material) has an increase in overall length in the equilibrium water content state of greater than or equal to 0.1%, greater than or equal to 0.5%, greater than or equal to 1%, greater than or equal to 2%, greater than or equal to 4%, greater than or equal to 6%, greater than or equal to 8%, greater than or equal to 10%, greater than or equal to 12%, greater than or equal to 14%, greater than or equal to 16%, or greater than or equal to 18% as compared to its length in a first configuration (e.g., a water content less than the equilibrium water content state, such as the dehydrated state). In some cases, the device (or polymeric material) has an increase in overall length in the equilibrium water content state of less than or equal to 20%, less than or equal to 18%, less than or equal to 16%, less than or equal to 14%, less than or equal to 12%, less than or equal to 10%, less than or equal to 8%, less than or equal to 6%, less than or equal to 4%, less than or equal to 2%, less than or equal to 1%, or less than or equal to 0.5% as compared to its length in the first configuration (e.g., a water content less than the equilibrium water content state, such as the dehydrated state). Combinations of the above-referenced ranges are also possible (e.g., greater than or equal to 0.1% and less than or equal to 20%). Other ranges are also possible.

In some embodiments, the device (e.g., device 10 of FIG. 1A, device 12 of FIG. 1B, device 14 of FIG. 1C) (or body portion (e.g., body portion 20 of FIGS. 1A-1B)) has a particular outer maximum cross-sectional dimension, such as an outer diameter of a cylindrical tube, an oval tube, an oblong tube, or square tube. In embodiments where the device comprises multiple lumens, the outer diameter refers to the outer maximum cross-sectional dimension of one or more of the lumens. For example, in some embodiments only one lumen may have the recited outer diameter. In other embodiments, each and every lumen may independently have the recited outer diameter. In some embodiments, the device (or polymeric material) has an increase in an outer maximum cross-sectional dimension (e.g., outer diameter) in the equilibrium water content state of greater than or equal to 0.1%, greater than or equal to 0.5%, greater than or equal to 1%, greater than or equal to 2%, greater than or equal to 4%, greater than or equal to 6%, greater than or equal to 8%, greater than or equal to 10%, greater than or equal to 12%, greater than or equal to 14%, greater than or equal to 16%, or greater than or equal to 18% as compared to the maximum cross-sectional dimension (e.g., outer diameter) in a first configuration (e.g., a water content less than the equilibrium water content state, such as the dehydrated state). In some cases, the device (or polymeric material) has an increase in the maximum cross-sectional dimension (e.g., outer diameter) in the equilibrium water content state of less than or equal to 20%, less than or equal to 18%, less than or equal to 16%, less than or equal to 14%, less than or equal to 12%, less than or equal to 10%, less than or equal to 8%, less than or equal to 6%, less than or equal to 4%, less than or equal to 2%, less than or equal to 1%, or less than or equal to 0.5% as compared to the maximum cross-sectional dimension (e.g., outer diameter) in a first configuration (e.g., a water content less than the equilibrium water content state, such as the dehydrated state). Combinations of the above-referenced ranges are also possible (e.g., greater than or equal to 0.1% and less than or equal to 20%, greater than or equal to 0.1% and less than or equal to 10%). Other ranges are also possible.

In some embodiments, the device (or body portion) has a particular inner diameter (e.g., in an embodiment in which the device comprises a hollow core), which is the maximum inner cross-sectional dimension, such as the inner diameter of a cylindrical tube or square tube (or other non-circular device or body portion). In embodiments where the device (or body portion) comprises multiple lumens, the inner diameter refers to the maximum inner cross-sectional dimension (i.e., the maximum inner cross-sectional dimension of the largest lumen). In some embodiments, the device (or body portion) has an increase in the inner diameter in the equilibrium water content state of greater than or equal to 0.1%, greater than or equal to 0.5%, greater than or equal to 1%, greater than or equal to 2%, greater than or equal to 4%, greater than or equal to 6%, greater than or equal to 8%, greater than or equal to 10%, greater than or equal to 12%, greater than or equal to 14%, greater than or equal to 16%, or greater than or equal to 18% as compared to the inner diameter in a first configuration (e.g., a water content less than the equilibrium water content state, such as the dehydrated state). In some cases, the device (or body portion) has an increase in the inner diameter in the equilibrium water content state of less than or equal to 20%, less than or equal to 18%, less than or equal to 16%, less than or equal to 14%, less than or equal to 12%, less than or equal to 10%, less than or equal to 8%, less than or equal to 6%, less than or equal to 4%, less than or equal to 2%, less than or equal to 1%, or less than or equal to 0.5% as compared to the inner diameter in a first configuration (e.g., a water content less than the equilibrium water content state, such as the dehydrated state). Combinations of the above-referenced ranges are also possible (e.g., greater than or equal to 0.1% and less than or equal to 20%). Other ranges are also possible.

In some embodiments, the device (or body portion) has a larger percentage increase in the overall length than an increase in inner diameter and/or outer diameter when the device (or polymeric material) swells from a first configuration (e.g., a water content less than the equilibrium water content state, such as the dehydrated state) to a second configuration (e.g., the equilibrium water content state). For example, in some embodiments, the overall length may increase by 1-20% (e.g., 5-15%) while the inner diameter and/or outer diameter increases by 0.1-19% (e.g., 1-10%).

In some embodiments, the ratio of the percentage increase in the overall length to the percentage increase in the inner diameter and/or outer diameter when the device (or polymeric material) swells from a first configuration (e.g., a water content less than the equilibrium water content state, such as the dehydrated state) to a second configuration (e.g., the equilibrium water content state) is greater than or equal to 1.1, greater than or equal to 1.5, greater than or equal to 2, greater than or equal to 5, greater than or equal to 7, or greater than or equal to 10. In some embodiments, the ratio of the percentage increase in the overall length to the percentage increase in the inner diameter and/or outer diameter when the device (or polymeric material) swells from a first configuration (e.g., a water content less than the equilibrium water content state, such as the dehydrated state) to a second configuration (e.g., the equilibrium water content state) is less than or equal to 20, less than or equal to 15, less than or equal to 10, less than or equal to 5, or less than or equal to 2. Combinations of these ranges are also possible (e.g., 1.1-20).

Figure 2:
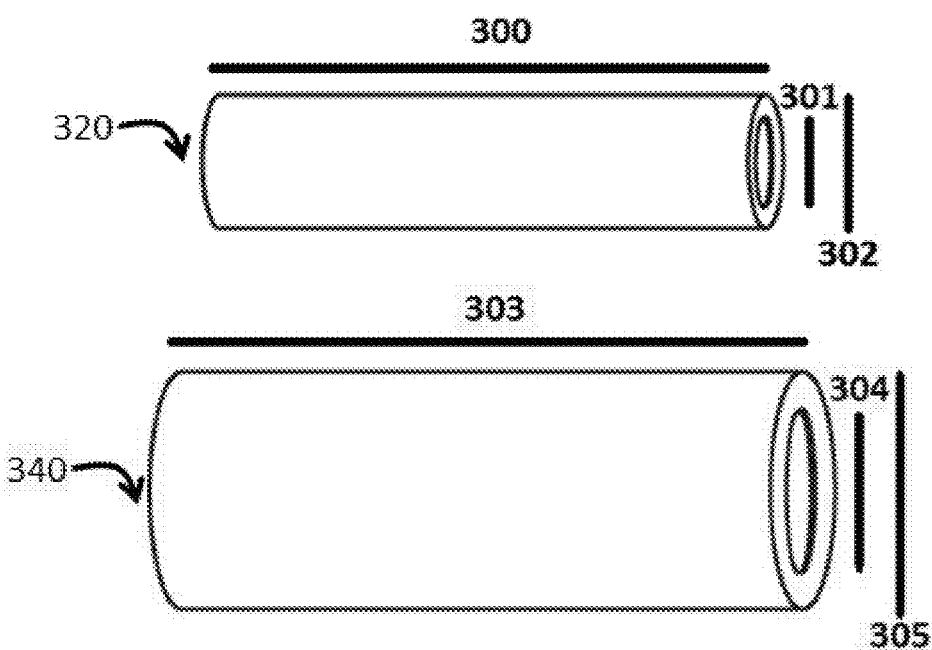
FIG. 2 is a side view of a catheter depicting the change in dimensions before and after swelling, according to one set of embodiments.

In some embodiments, the device (or body portion) has a larger percentage increase in the inner diameter and/or outer diameter than in overall length when the device (or polymeric material) swells from a first configuration (e.g., a water content less than the equilibrium water content state, such as the dehydrated state). As a non-limiting example, in FIG. 2, device 320 swelled from a first configuration (e.g., a water content less than the equilibrium water content state, such as the dehydrated state) to a second configuration (e.g., the equilibrium water content state)—device 340. In accordance with some embodiments, in FIG. 2, outer diameter 302 and inner diameter 301 of device 320 increased to outer diameter 305 and inner diameter 304 in device 340, respectively, while overall length 300 increased to overall length 303. In accordance with some embodiments, in FIG. 2, inner diameter 301 and outer diameter 302 increased by a larger percentage than the increase in overall length 300 when device 320 swelled to the equilibrium water content state-device 340. In some embodiments, the inner diameter and/or outer diameter may increase by 1-20% (e.g., 5-15%) while the overall length increases by 0.1-19% (e.g., 1-10%).

In some embodiments, the ratio of the percentage increase in the inner diameter and/or outer diameter to the percentage increase in the overall length when the device (or polymeric material) swells from a first configuration (e.g., a water content less than the equilibrium water content state, such as the dehydrated state) to a second configuration (e.g., the equilibrium water content state) is greater than or equal to 1.1, greater than or equal to 1.5, greater than or equal to 2, greater than or equal to 5, greater than or equal to 7, or greater than or equal to 10. In some embodiments, the ratio of the percentage increase in the inner diameter and/or outer diameter to the percentage increase in the overall length when the device (or polymeric material) swells from a first configuration (e.g., a water content less than the equilibrium water content state, such as the dehydrated state) to a second configuration (e.g., the equilibrium water content state) is less than or equal to 20, less than or equal to 10, less than or equal to 5, or less than or equal to 2. Combinations of these ranges are also possible (e.g., 1.1-20).

In some embodiments, the device (e.g., device 10 of FIG. 1A, device 12 of FIG. 1B, device 14 of FIG. 1C) (or body portion (e.g., body portion 20 of FIGS. 1A-1B)) comprises a polymeric material having desirable mechanical properties. For example, in some embodiments, the polymeric material has a Young's elastic modulus in the first configuration (e.g., a water content less than the equilibrium water content state, such as the dehydrated state) (e.g., less than 5 w/w % water content) of greater than or equal to 100 MPa, greater than or equal to 250 MPa, greater than or equal to 500 MPa, greater than or equal to 600 MPa, greater than or equal to 750 MPa, greater than or equal to 800 MPa, greater than or equal to 900 MPa, greater than or equal to 1000 MPa, greater than or equal to 1250 MPa, greater than or equal to 1500 MPa, greater than or equal to 1750 MPa, greater than or equal to 2000 MPa, greater than or equal to 2500 MPa, greater than or equal to 3000 MPa, greater than or equal to 3500 MPa, or greater than or equal to 4000 MPa. In some embodiments, the polymeric material has a Young's elastic modulus in the first configuration (e.g., a water content less than the equilibrium water content state, such as the dehydrated state) (e.g., less than 5 w/w % water content) of less than or equal to 5000 MPa, less than or equal to 4000 MPa, less than or equal to 3500 MPa, less than or equal to 3000 MPa, less than or equal to 2500 MPa, less than or equal to 2000 MPa, less than or equal to 1750 MPa, less than or equal to 1500 MPa, less than or equal to 1250 MPa, less than or equal to 1000 MPa, less than or equal to 900 MPa, less than or equal to 800 MPa, less than or equal to 750 MPa, less than or equal to 600 MPa, less than or equal to 500 MPa, or less than or equal to 250 MPa. Combinations of the above-referenced ranges are also possible (e.g., greater than or equal to 100 MPa and less than or equal to 5000 MPa). Other ranges are also possible.

In some embodiments, the polymeric material has a Young's elastic modulus at an equilibrium water content state of less than or equal to 300 MPa, less than or equal to 250 MPa, less than or equal to 200 MPa, less than or equal to 150 MPa, less than or equal to 100 MPa, less than or equal to 75 MPa, less than or equal to 50 MPa, less than or equal to 25 MPa, less than or equal to 20 MPa, or less than or equal to 10 MPa. In some embodiments, the polymeric material has a Young's elastic modulus at an equilibrium water content state of greater than or equal to 5 MPa, greater than or equal to 10 MPa, greater than or equal to 20 MPa, greater than or equal to 25 MPa, greater than or equal to 50 MPa, greater than or equal to 75 MPa, greater than or equal to 100 MPa, greater than or equal to 150 MPa, greater than or equal to 200 MPa, or greater than or equal to 250 MPa. Combinations of the above-referenced ranges are also possible (e.g., less than or equal to 300 MPa and greater than or equal to 5 MPa). Other ranges are also possible.

In some embodiments, the device (e.g., device 10 of FIG. 1A, device 12 of FIG. 1B, device 14 of FIG. 1C) (or body portion (e.g., body portion 20 of FIGS. 1A-1B)) comprises an osmotic agent. For example, in some embodiments, an osmotic agent may be added (e.g., to the pre-polymer) during formation of the device. In some embodiments, the osmotic agent is present in the polymeric material (e.g., after formation of the polymeric material) in an amount greater than or equal to 0.05 w/w %, greater than or equal to 0.1 w/w %, greater than or equal to 0.2 w/w %, greater than or equal to 0.4 w/w %, greater than or equal to 0.6 w/w %, greater than or equal to 0.8 w/w %, greater than or equal to 1 w/w %, greater than or equal to 1.2 w/w %, greater than or equal to 1.4 w/w %, greater than or equal to 1.6 w/w %, or greater than or equal to 1.8 w/w % versus the total device weight in a first configuration (e.g., dehydrated state) and/or second configuration (e.g., equilibrium water content state). In some cases, the osmotic agent may be present in the polymeric material (e.g., after formation of the polymeric material) in an amount of less than or equal to 2 w/w %, less than or equal to 1.8 w/w %, less than or equal to 1.6 w/w %, less than or equal to 1.4 w/w %, less than or equal to 1.2 w/w %, less than or equal to 1 w/w %, less than or equal to 0.8 w/w %, less than or equal to 0.6 w/w %, less than or equal to 0.4 w/w %, less than or equal to 0.2 w/w %, or less than or equal to 0.01 w/w % versus the total device weight in a first configuration (e.g., dehydrated state) and/or second configuration (e.g., equilibrium water content state). Combinations of the above-referenced ranges are also possible (e.g., greater than or equal to 0.05 w/w % and less than or equal to 2 w/w %). Other ranges are also possible.

Non-limiting examples of suitable osmotic agents include phosphates, borates, sodium chloride, citrates, ethylenediaminetetraacetates, sulfites, sulfates, hyposulfites, metal oxides, selenium dioxide, selenium trioxide, selenous acid, selenic acid, nitrates, silicates, and botanic acid.

In some embodiments, the composition (e.g., comprising or formed of a polymeric material) and/or the first water soluble polymer does not comprise covalent crosslinking, as described in more detail below. In other embodiments, however, the composition and/or the first water soluble polymer comprises physical crosslinking (e.g., interpenetrating network, chain entanglement, and/or one or more bonds such as covalent, ionic, and/or hydrogen bonding). In a particular set of embodiments, no covalent crosslinking agents are used to form the polymeric material, the first water soluble polymer of the polymeric material, and/or the second water soluble polymer.

The first water soluble polymer may be present in the device (e.g., device 10 of FIG. 1A, device 12 of FIG. 1B, device 14 of FIG. 1C) (or body portion (e.g., body portion 20 of FIGS. 1A-1B)) in any suitable amount. For example, in some embodiments, the first water soluble polymer is present in the device and/or body portion in an amount of greater than or equal to 20 w/w %, greater than or equal to 25 w/w %, greater than or equal to 30 w/w %, greater than or equal to 35 w/w %, greater than or equal to 40 w/w %, greater than or equal to 45 w/w %, greater than or equal to 50 w/w %, greater than or equal to 55 w/w %, greater than or equal to 60 w/w %, greater than or equal to 65 w/w %, greater than or equal to 70 w/w %, greater than or equal to 75 w/w %, greater than or equal to 80 w/w %, greater than or equal to 85 w/w %, or greater than or equal to 90 w/w % at an equilibrium water content state. In some embodiments, the first water soluble polymer is present in the device and/or body portion in an amount of less than or equal to 95 w/w %, less than or equal to 90 w/w %, less than or equal to 85 w/w %, less than or equal to 80 w/w %, less than or equal to 75 w/w %, less than or equal to 70 w/w %, less than or equal to 65 w/w %, less than or equal to 60 w/w %, less than or equal to 55 w/w %, less than or equal to 50 w/w %, less than or equal to 45 w/w %, less than or equal to 40 w/w %, less than or equal to 35 w/w %, less than or equal to 30 w/w %, or less than or equal to 25 w/w % at an equilibrium water content state. Combinations of the above-referenced ranges are also possible (e.g., greater than or equal to 20 w/w % and less than or equal to 95 w/w %). Other ranges are also possible.

In some embodiments, the first water soluble polymer comprises or is selected from the group consisting of poly(vinyl alcohol), poly(acrylic acid), polyethylene glycol, poly(vinyl pyrrolidone), poly(methacrylic sulfobetaine), poly(acrylic sulfobetaine), poly(methacrylic carboxybetaine), poly(acrylic carboxybetaine), povidone, polyacrylamide, poly(N-(2-hydroxypropyl)methacrylamide), polyoxazolines, polyphosphates, polyphosphazenes, polyvinyl acetate, polypropylene glycol, poly(N-isopropylacrylamide), poly(2-hydroxymethylmethacrylate), and combinations thereof. In an exemplary set of embodiments, the first water soluble polymer is poly(vinyl alcohol).

In some embodiments, the polymeric material comprises a mixture comprising the first water-soluble polymer and another (e.g., a third) water soluble polymer. In some embodiments, the third water soluble polymer comprises or is selected from the group consisting of poly(vinyl alcohol), poly(acrylic acid), polyethylene glycol, poly(vinyl pyrrolidone), poly(methacrylic sulfobetaine), poly(acrylic sulfobetaine), poly(methacrylic carboxybetaine), poly(acrylic carboxybetaine), povidone, polyacrylamide, poly(N-(2-hydroxypropyl)methacrylamide), polyoxazolines, polyphosphates, polyphosphazenes, polyvinyl acetate, polypropylene glycol, poly(N-isopropylacrylamide), poly(2-hydroxymethylmethacrylate), and combinations thereof. The first and other (e.g., third) water soluble polymers may have different chemical compositions.

In some embodiments, the total weight of the first water soluble polymer and another (e.g., a third) water soluble polymer in the device is greater than or equal to 20 w/w %, greater than or equal to 25 w/w %, greater than or equal to 30 w/w %, greater than or equal to 35 w/w %, greater than or equal to 40 w/w %, greater than or equal to 45 w/w %, greater than or equal to 50 w/w %, greater than or equal to 55 w/w %, greater than or equal to 60 w/w %, greater than or equal to 65 w/w %, greater than or equal to 70 w/w %, greater than or equal to 75 w/w %, greater than or equal to 80 w/w %, greater than or equal to 85 w/w %, greater than or equal to 90 w/w %, greater than or equal to 95 w/w %, greater than or equal to 98 w/w %, or greater than or equal to 99 w/w % at an equilibrium water content state. In some embodiments, the total weight of the first water soluble polymer and another (e.g., a third) water soluble polymer in the device in an amount of less than or equal to 100 w/w %, less than or equal to 90 w/w %, less than or equal to 98 w/w %, less than or equal to 95 w/w %, less than or equal to 90 w/w %, less than or equal to 85 w/w %, less than or equal to 80 w/w %, less than or equal to 75 w/w %, less than or equal to 70 w/w %, less than or equal to 65 w/w %, less than or equal to 60 w/w %, less than or equal to 55 w/w %, less than or equal to 50 w/w %, less than or equal to 45 w/w %, less than or equal to 40 w/w %, less than or equal to 35 w/w %, less than or equal to 30 w/w %, or less than or equal to 25 w/w % at an equilibrium water content state. Combinations of the above-referenced ranges are also possible (e.g., greater than or equal to 20 w/w % and less than or equal to 100 w/w %). Other ranges are also possible.

In some embodiments, the ratio of the first water soluble polymer to the third water soluble polymer present in the device is less than or equal to 100:0, less than or equal to 99:1, less than or equal to 95:5, less than or equal to 90:10, less than or equal to 80:20, less than or equal to 70:30, less than or equal to 60:40, or less than or equal to 55:45. In some embodiments, the ratio of the first water soluble polymer to the third water soluble polymer present in the device is greater than or equal to 50:50, greater than or equal to 60:40, greater than or equal to 70:30, greater than or equal to 80:20, greater than or equal to 90:10, greater than or equal to 95:5, or greater than or equal to 99:1. Combinations of the above-referenced ranges are also possible (e.g., less than or equal to 100:0 and greater than or equal to 50:50). Other ranges are also possible.

As described above and herein, in some embodiments, the device (e.g., device 12 of FIG. 1B, device 14 of FIG. 1C) comprises a second water soluble polymer (e.g., second water soluble polymer 40) disposed within at least a portion of the plurality of pores (e.g., plurality of pores 30) of the body portion (e.g., body portion 20 comprising or formed of a polymeric material). In some embodiments, the second water soluble polymer comprises or is selected from the group consisting of poly(vinyl alcohol), poly(acrylic acid), polyethylene glycol, poly(vinyl pyrrolidone), poly(methacrylic sulfobetaine), poly(acrylic sulfobetaine), poly(methacrylic carboxybetaine), poly(acrylic carboxybetaine), povidone polyacrylamide, poly(N-(2-hydroxypropyl) methacrylamide), polyoxazolines, polyphosphates, polyphosphazenes, polyvinyl acetate, polypropylene glycol, poly(N-isopropylacrylamide), poly(2-hydroxymethylmethacrylate), and combinations thereof. In some embodiments, the second water soluble polymer is poly(acrylic acid). The second water soluble polymer may have a different chemical composition from that of the first (e.g., and optionally third) water soluble polymers.

The second water soluble polymer (e.g., second water soluble polymer 40) may be present in the device in any suitable amount. For example, in some embodiments, the second water soluble polymer is present in the device in an amount of greater than or equal to 0.05 w/w %, greater than or equal to 0.1 w/w %, greater or than or equal to 0.2 w/w %, greater than or equal to 0.5 w/w %, greater than or equal to 1.0 w/w %, greater than or equal to 2.0 w/w %, greater than or equal to 3.0 w/w %, greater than or equal to 4.0 w/w %, greater than or equal to 5.0 w/w %, greater than or equal to 10 w/w %, greater than or equal to 20 w/w %, greater than or equal to 30 w/w %, greater than or equal to 40 w/w %, greater than or equal to 50 w/w %, greater than or equal to 60 w/w %, greater than or equal to 70 w/w %, greater than or equal to 80 w/w %, or greater than or equal to 90 w/w % at an equilibrium water content state. In some embodiments, the second water soluble polymer 40 is present in the device in an amount of less than or equal to 95 w/w %, less than or equal to 90 w/w %, less than or equal to 80 w/w %, less than or equal to 70 w/w %, less than or equal to 60 w/w %, less than or equal to 50 w/w %, less than or equal to 40 w/w %, less than or equal to 30 w/w %, less than or equal to 20 w/w %, less than or equal to 10 w/w %, less than or equal to 5.0 w/w %, less than or equal to 4.0 w/w %, less than or equal to 3.0 w/w %, less than or equal to 2.0 w/w %, less than or equal to 1.0 w/w %, less than 0.5 w/w %, less than 0.2 w/w %, or less than 0.1 w/w % at an equilibrium water content state. In some embodiments, 0 w/w % of the second water soluble polymer is present. Combinations of the above-referenced ranges are also possible (e.g., greater than or equal to 0.05 w/w % and less than or equal to 95 w/w %). Other ranges are also possible.

In some embodiments, the water-soluble polymer (e.g., the first water soluble polymer, the second water soluble polymer, the third water soluble polymer) has a particular molecular weight. In some embodiments, the molecular weight of the water soluble polymer (e.g., each, independently, the first water soluble polymer, the second water soluble polymer, or the third water soluble polymer) may be greater than or equal to 40 kDa, greater than or equal to 50 kDa, greater than or equal to 75 kDa, greater than or equal to 100 kDa, greater than or equal to 125 kDa, greater than or equal to 150 kDa, greater than or equal to 175 kDa, greater than or equal to 200 kDa, greater than or equal to 250 kDa, greater than or equal to 300 kDa, greater than or equal to 350 kDa, greater than or equal to 400 kDa, greater than or equal to 450 kDa, greater than or equal to 500 kDa, greater than or equal to 600 kDa, greater than or equal to 700 kDa, greater than or equal to 800 kDa, greater than or equal to 900 kDa, greater than or equal to 1000 kDa, greater than or equal to 1500 kDa, greater than or equal to 2000 kDa, greater than or equal to 3000 kDa, or greater than or equal to 4000 kDa. In some embodiments, the molecular weight of the water soluble polymer (e.g., each, independently, the first water soluble polymer, the second water soluble polymer, or the third water soluble polymer) may be less than or equal to 5000 kDa, less than or equal to 4000 kDa, less than or equal to 3000 kDa, less than or equal to 2000 kDa, less than or equal to 1500 kDa, less than or equal to 1000 kDa, less than or equal to 900 kDa, less than or equal to 800 kDa, less than or equal to 700 kDa, less than or equal to 600 kDa, less than or equal to 500 kDa, less than or equal to 450 kDa, less than or equal to 400 kDa, less than or equal to 350 kDa, less than or equal to 300 kDa, less than or equal to 250 kDa, less than or equal to 200 kDa, less than or equal to 175 kDa, less than or equal to 150 kDa, less than or equal to 125 kDa, less than or equal to 100 kDa, less than or equal to 75 kDa, or less than or equal to 50 kDa. Combinations of the above-referenced ranges are also possible (e.g., a molecular weight of greater than or equal to 40 kDa and less than or equal to 5000 kDa). Other ranges are also possible.

In some embodiments, the devices (e.g., device 10 of FIG. 1A, device 12 of FIG. 1B, device 14 of FIG. 1C) described herein are, or are configured for use with, a medical device such as a catheter, a balloon, a shunt, a wound drain, an infusion port, a drug delivery device, a tube, a contraceptive device, a feminine hygiene device, an endoscope, a graft, a pacemaker, an implantable cardioverter-defibrillator, a cardiac resynchronization device, a cardiovascular device lead, a ventricular assist device, an endotracheal tube, a tracheostomy tube, an implantable sensor, a ventilator pump, and an ophthalmic device. In some embodiments, the catheter is selected from the group consisting of central venous catheters, peripheral central catheters, midline catheters, peripheral catheters, tunneled catheters, dialysis access catheters, urinary catheters, neurological catheters, percutaneous transluminal angioplasty catheters and/or peritoneal catheters. Other suitable uses are described in more detail, below.

These materials can be made as tough, high strength materials having lubricious and biocompatible surfaces. Nanoporous and microporous solids are described herein that have a particularly high Young's modulus and tensile strength. A nanoporous material is a solid that contains interconnected pores of up to 100 nm in diameter. Processes for making hydrogels are also described. Hydrophilic polymers may be used to make these various porous solids so that a hydrophilic solid is obtained. The water content of a nanoporous or a microporous solid can be high, e.g., 50% w/w at EWC. The water content of a hydrogel may be higher, for example, up to 90% w/w in principle. The porous solid materials can be used to make various devices, including medical catheters and implants with significant reductions in adsorption and/or adhesion of biological components to their surfaces.

These or other porous materials may be processed to include polymers that are bulk-incorporated into pores of the solid. An embodiment of the material is a porous material comprising water soluble polymers entrapped in pores of the material. Polymers entrapped by this method have been observed to be present in the pores and to remain in the pores after repeated hydration and dehydration. The entrapped polymers provide a surface that is scratch-resistant and effectively permanent, with the incorporated polymer providing desirable properties beyond the outer surface of the material. In aqueous medium, hydrophilic polymers entrapped by this method are hydrated to extend beyond the surface to enhance biocompatibility and lubricity.

Processes for making the material are described in International Patent Application Publication Nos. WO2018/237166 and WO2017/112878, which are hereby incorporated by reference in their entirety. Processes for making the material can include extrusion so that devices with a high aspect ratio may be created. An embodiment of a process for making the materials involves heating a mixture that comprises at least one water soluble polymer and a solvent to a temperature above the melting point of the polymer solution forming the mixture in a solvent-removing environment resulting in a crosslinked matrix and continuing to remove the solvent until the crosslinked matrix is a microporous or a nanoporous solid material. The crosslinking can take place while cooling the mixture and/or in the solvent-removing environment. Further polymers may be incorporated into pores of the material.

Disclosed herein are forming processes, including extrusion, to make a high strength porous solid. Guidance as to processes and parameters to make porous solids are disclosed, as well as the porous solids. Guidance for bulk incorporation of polymers into porous solids is disclosed. Porous solids are disclosed with good properties and the further inclusion of bulk incorporated polymers provides further improvements.

Herein is disclosed a new process that provides for extrusion of high strength materials. Some embodiments of the process provide one or more of: removal of a solvent from a hydrophilic polymer-solvent mixture as the material is extruded, extruding at a cold temperature, extruding into a solvent-removing environment, and further removal of solvent for a period of time after extrusion. Further, an annealing phase and/or a bulk incorporation for further polymers phase may also be included.

Figure 1B:
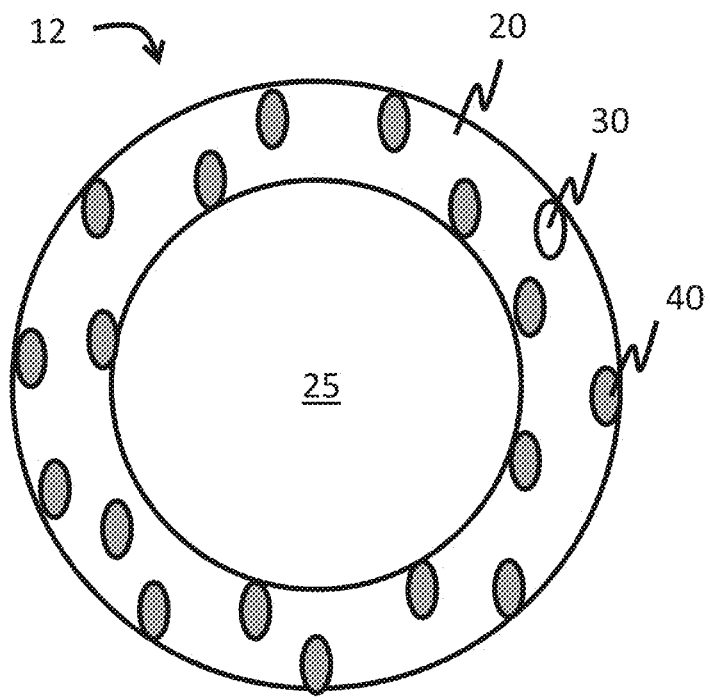
FIG. 1B is a cross-sectional schematic diagram of an exemplary device comprising a plurality of pores, according to one set of embodiments.
Figure 1C:
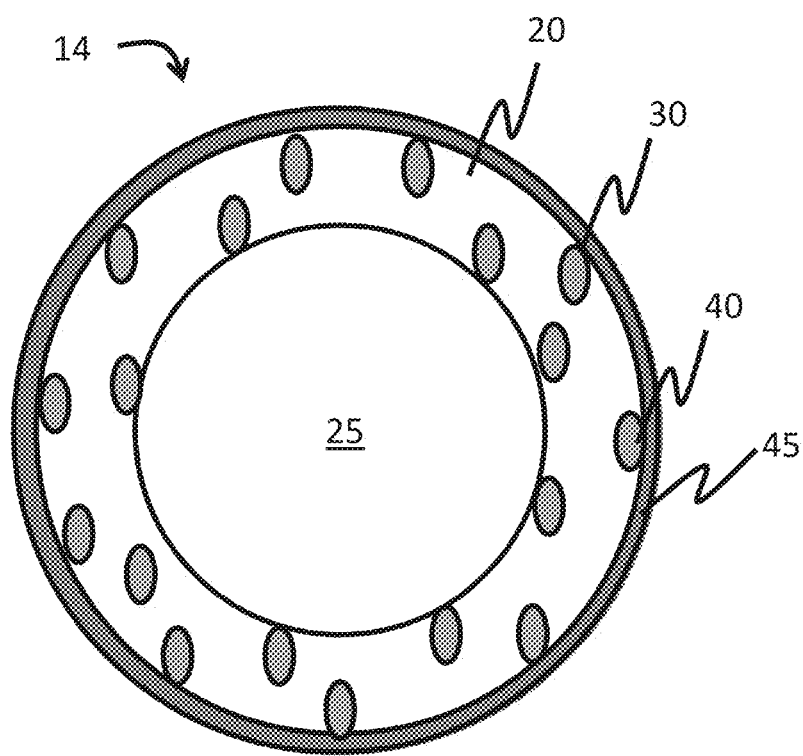
FIG. 1C is a cross-sectional schematic diagram of an exemplary device comprising a plurality of pores, according to one set of embodiments.
Figure 1D:
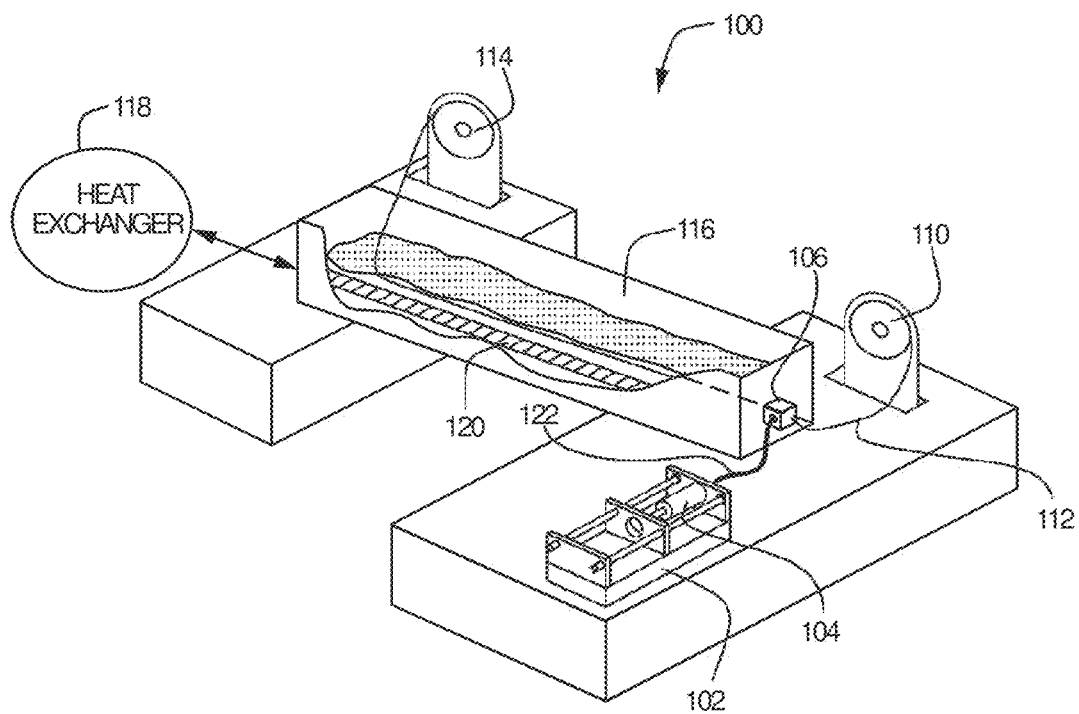
FIG. 1D is a schematic of an exemplary extrusion apparatus to form a continuous form with a cut-away view of a side of the bath, according to one set of embodiments.
Figure 1E:
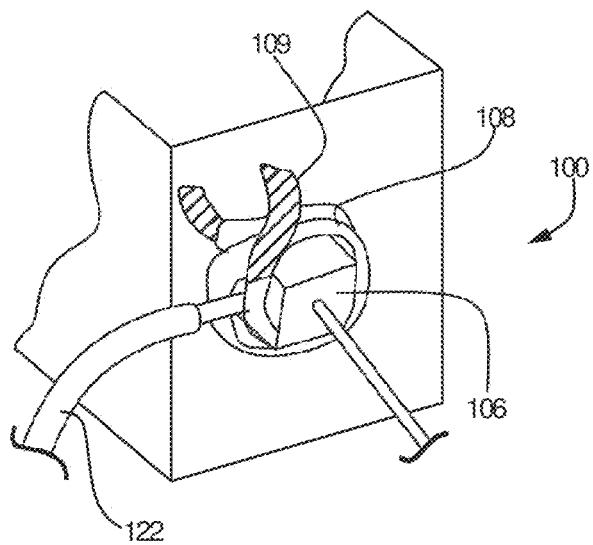
FIG. 1E is an enlarged view of a portion of the apparatus of FIG. 1D depicting the die head in perspective as viewed from the outside of the bath, according to one set of embodiments.
Figure 1F:
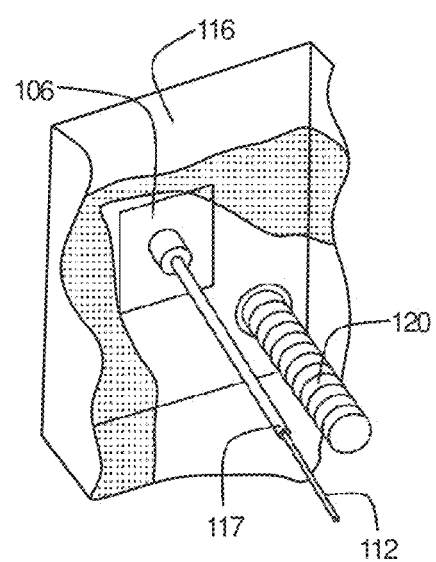
FIG. 1F is an enlarged view of a portion of the apparatus of FIG. 1D depicting the die head as disposed in the bath, according to one set of embodiments.

FIGS. 1D-1F depict an embodiment of an apparatus to make the porous solid materials. A device 100 as depicted includes a syringe pump 102 to accept at least one syringe 104, an optional heating jacket (not shown) to heat the syringes, die head 106, heating element 108 and power cables 109 for the same, providing heating as needed for die head 106 (detail not shown in FIG. 1D), dispensing spool 110 for core tubing 112, uptake spool 114 and motor (not shown) for core tubing, bath 116 for the extruded material 117, with the bath having temperature control for cooling or heating, depicted as heat exchanger 118 that comprises heat exchanging pipe 120 in bath 116. Die head 106 accepts the core tubing 110 which passes therethrough. Feed line 122 from the syringes to die head 106 provides a feed to device 100. A system for this embodiment may further include a weigh station, a jacketed vessel for heating and mixing solutions for loading into the syringes, and a solvent-removal environment for further drying of tubing removed from bath 116. The system may also have a heating station for annealing the tubing or other extrusion product with heat when desired. Core tubing made of PTFE as well as wires, air, gas, non-solvent liquid or other materials may be used for a core.

In use, by way of example, a polymer is heated in a suitable solvent in a jacketed vessel and placed into syringe 104. One or more polymers may be present and a radiopaque agent or other additive may be added. One or more syringes may be used with the same or different mixtures. The syringe(s) of the polymer are heated to a predetermined temperature, e.g., of no more than 80-95° C., and degassed before extrusion. Syringe 104 is mounted on syringe pump 102 with a wrap heater to maintain temperature during extrusion. Core 112 is looped through die head 106, e.g., a heated out-dwelling die head, which feeds into extrusion bath 116, and then attached to an uptake spool 114 that is driven by a motor. The temperature of the bath is controlled using heat exchanger 118, such as a chiller; extruded materials may be extruded at temperatures ranging from −30° C. to 75° C.; other temperatures may be used, and 0° C. is a generally useful temperature setting for extrusion. Artisans will immediately appreciate that all ranges and values between the explicitly stated bounds are contemplated, with, e.g., any of the following being available as an upper or lower limit: −30, −25, −20, −15, −10, −5, 0, 5, 10, 15, 20, 25, 30, 35, 40, 45, 50, 55, 60, 65, 70, 75° C. Uptake (e.g., puller) spool 114 motor speed can be controlled to adjust outer diameter gauge size around core 112. Adjusting die size, material feed rate, tubing core diameter, and puller speed play roles in adjusting final tubing gauge, e.g., in embodiments wherein a catheter is made. Polymer feed rates are adjustable, e.g., by control of syringe pump 102 in this embodiment. Connectors 122 join the one or more syringes to die head 106. Many pumps and other tools for controllably feeding a polymer solution are known. The apparatus and method can be adapted for a drawing process although alternative feed processes are available.

In some embodiments, a composition (e.g., a pre-polymer composition) may be provided (e.g., for extrusion) prior to formation of the polymeric material. In some embodiments, the composition comprises an aqueous solution. The aqueous solution can comprise an osmotic agent at a concentration of greater than or equal to 0.01 M and less than or equal to 8 M. The aqueous solution can comprise a radiopaque agent in an amount of greater than or equal to 0 w/w % and less than or equal to 50 w/w % (e.g., less than or equal to 40 w/w %). The composition can further comprise a water-soluble polymer having a molecular weight of greater than or equal to 40 kDa and less than or equal to 5000 kDa, and present in the solution in an amount greater than or equal to 10 w/w % and less than or equal to 50 w/w %.

In some embodiments, the composition forms a swellable polymeric material upon extrusion.

In some embodiments, the osmotic agent is present in the solution at a concentration of greater than or equal to 0.01 M, greater than or equal to 0.1 M, greater than or equal to 0.5 M, greater than or equal to 1 M, greater than or equal to 2 M, greater than or equal to 3 M, greater than or equal to 4 M, greater than or equal to 5 M, or greater than or equal to 6 M. In some embodiments, the osmotic agent is present in the solution at a concentration of less than or equal to 8 M, less than or equal to 6 M, less than or equal to 4 M, less than or equal to 2 M, less than or equal to 1 M, less than or equal to 0.5 M, or less than or equal to 0.1 M. Combinations of the above-referenced ranges are also possible (e.g., greater than or equal to 0.01 M and less than or equal to 8 M). Osmotic agents are described in more detail herein.

In some embodiments, the radiopaque agent is present in the solution in an amount of greater than or equal to 0 w/w %, greater than or equal to 5 w/w %, greater than or equal to 10 w/w %, greater than or equal to 15 w/w %, greater than or equal to 20 w/w %, greater than or equal to 25 w/w %, greater than or equal to 30 w/w %, greater than or equal to 35 w/w %, greater than or equal to 40 w/w %, or greater than or equal to 45 w/w %. In some embodiments, the radiopaque agent is present in the solution in an amount less than or equal to 50 w/w %, less than or equal to 45 w/w %, less than or equal to 40 w/w %, less than or equal to 35 w/w %, less than or equal to 30 w/w %, less than or equal to 25 w/w %, less than or equal to 20 w/w %, less than or equal to 15 w/w %, less than or equal to 10 w/w %, or less than or equal to 5 w/w %. Combinations of the above-referenced ranges are also possible (e.g., greater than or equal to 0 w/w % and less than or equal to 50 w/w %). Other ranges are also possible. Radiopaque agents are described in more detail, below.

In some embodiments, the water-soluble polymer is present in the solution in an amount greater than or equal to 10 w/w %, greater than or equal to 13 w/w %, greater than or equal to 15 w/w %, greater than or equal to 20 w/w %, greater than or equal to 25 w/w %, greater than or equal to 30 w/w %, greater than or equal to 35 w/w %, greater than or equal to 40 w/w %, or greater than or equal to 45 w/w %. In some embodiments, the water-soluble polymer is present in the solution in an amount less than or equal to 50 w/w %, less than or equal to 45 w/w %, less than or equal to 40 w/w %, less than or equal to 35 w/w %, less than or equal to 30 w/w %, less than or equal to 25 w/w %, less than or equal to 20 w/w %, less than or equal to 15 w/w %, or less than or equal to 13 w/w %. Combinations of the above-referenced ranges are also possible (e.g., greater than or equal to 10 w/w % and less than or equal to 50 w/w %). In some embodiments, the water-soluble polymer is present in the solution in an amount greater than or equal to 13 w/w %.

In some embodiments, as described above, a biologically active agent is present in the bulk polymeric material formed as a layer in the device. For example, in some embodiments, the polymeric material comprises a first surface and a second surface wherein the first surface and/or the second surface may be coated. In some embodiments, the first surface and/or the second surface is coated with a polymer, a second biologically active agent (the same or different from the biologically active agent present in the polymeric material), or combinations thereof. In some embodiments, the device comprises two or more layers of polymeric material in the body portion. In some embodiments, each layer of polymeric material may comprise the same, comprising different, or comprise no biologically active agent. In an illustrative embodiment, the body portion of a device comprises a first polymeric material layer comprising a first biologically active agent and a second polymeric material layer disposed on the first polymeric material layer, comprising a second biologically active agent. Other combinations of layers are also possible.

In some embodiments, the biologically active agent is distributed within the polymeric material (of the body portion) and/or the first water soluble polymer substantially homogeneously. For example, in some embodiments, the amount of the biologically active agent does not vary by more than 50% at a given arbitrary section (e.g., section 52, section 54 in FIG. 1A) across a cross-sectional area of the body portion and/or first water soluble polymer as compared to an average amount of the biologically active agent in the body portion and/or first water soluble polymer.

In some embodiments, the biologically active agent is distributed within the polymeric material non-homogeneously (i.e., on one or more surfaces of the polymeric material). For example, in some embodiments, the amount of the biologically active agent varies by more than 50% at a given arbitrary section (e.g., section 52, section 54 in FIG. 1A) across a cross-sectional area of the body portion and/or first water soluble polymer as compared to an average amount of the biologically active agent in the body portion and/or first water soluble polymer.

In some embodiments, the biologically active agent is distributed within the body portion (or polymeric material of the body portion) and/or first water soluble polymer to within greater than or equal to 0.1%, greater than or equal to 1%, greater than or equal to 2%, greater than or equal to 5%, greater than or equal to 10%, greater than or equal to 15%, greater than or equal to 20%, greater than or equal to 25%, greater than or equal to 30%, greater than or equal to 35%, greater than or equal to 40%, greater than or equal to 45%, greater than or equal to 50%, greater than or equal to 60%, greater than or equal to 70%, greater than or equal to 80%, greater than or equal to 90%, greater than or equal to 95%, or greater than or equal to 98% of an average loading of the biologically active agent in the body portion (or polymeric material) and/or first water soluble polymer. In some embodiments, the biologically active agent is distributed within the body portion (or polymeric material of the body portion) and/or first water soluble polymer to within less than or equal to 99%, less than or equal to 98%, less than or equal to 95%, less than or equal to 90%, less than or equal to 80%, less than or equal to 70%, less than or equal to 60%, less than or equal to 50%, less than or equal to 45%, less than or equal to 40%, less than or equal to 35%, less than or equal to 30%, less than or equal to 25%, less than or equal to 20%, less than or equal to 15%, less than or equal to 10%, less than or equal to 5%, or less than or equal to 2% of an average loading of the biologically active agent in the body portion (or polymeric material) and/or first water soluble polymer. Combinations of the above-referenced ranges are possible (e.g., less than or equal to 99% and greater than or equal to 0.1%, less than or equal to 50% and greater than or equal to 1%). Other ranges are also possible.

The loading of the biologically active agent may be determined at a position within the body portion (or polymeric material) by sectioning the body portion followed by extraction and liquid chromatography. By way of example, an article formed of the body portion (e.g., article 10 of FIG. 1A) may be cut along a cross-sectional dimension through its central axis and flattened. Three or more sections of the flattened body portion (e.g., a top section, a central section, and a bottom section) may be sliced across the length and/or width of the body portion and the biologically active agent is extracted from each section. The amount of biologically active agent present in each section may be determined by liquid chromatography. The highest amount of variance among the sections measured (compared to an average loading) constitutes the variance of the article or device. For example, if the biologically active agent is distributed within the body portion at variance levels of 5% of an average loading from a top section, 15% of an average loading at a middle section, and 10% of an average loading at a bottom section, the article/device comprising the body portion will have a variance of 15% of an average loading. Such an article/device would be said to have a biologically active agent that is distributed within the body portion (or polymeric material of the body portion) to within less than or equal to 15% of an average loading of the biologically active agent in the body portion (or polymeric material), and the biologically active agent would be considered substantially homogenously dispersed within the body portion. By contrast, and by way of example only, an article which comprises a coating of biologically active agent deposited on an external surface of the body portion (e.g., a coated catheter), in which no biologically active agent is present in the bulk polymeric material of the body portion, would not be considered to have a biologically active agent distributed within the body portion within less than or equal to 15% of an average loading, as loading in a first section (e.g., a top section comprising the coating) of the body portion would vary by more than 15% from the average loading of the biologically active agent in the body portion (or polymeric material). As such, one of ordinary skill in the art would understand, based upon the teachings of this specification, that articles or devices comprising a coating of biologically active agent, in which no biologically active agent is present in the bulk polymeric material of the body portion, do not have the biologically active agent distributed within the polymeric material (of the body portion) substantially homogeneously (e.g., within 50% of an average loading).

In embodiments in which more than one layer of polymeric material is present in the device, each layer of polymeric material may comprise a biologically active agent distributed homogeneously or non-homogeneously throughout each polymeric material in one or more of the ranges described above.

In some embodiments, the amount of the biologically active agent does not vary by more than 50% (or any combinations of the percentages noted above) at least 2, 4, 6, 8, 10, 20, or 30 arbitrary sections of the body portion. In some embodiments, the arbitrary section is randomly chosen across a length and/or width of the polymeric material forming the body portion.

It should be appreciated that where more than one biologically active agent is present (e.g., a first and a second biologically active agent present in the polymeric material forming the bulk of the body portion), each biologically active agent may independently be distributed within the polymeric material in one or more of the ranges described above.

Suitable biologically active agents are described in more detail below and include, for example, pharmaceutical agents (e.g., drugs), calcium salt (e.g., calcium chloride), iron salt (e.g. ferrous sulfate), starch, modified silica, cellulose, amongst others. The term "biologically active agent" as used herein generally refers to an agent which, when administered to a subject, has a physiologically significant effect on at least a portion of the body of the subject. In some embodiments, the compositions and devices (e.g., device 10 of FIG. 1A, device 12 of FIG. 1B, device 14 of FIG. 1C) described herein comprise a body portion having a plurality of pores. The body portion may be formed of a polymeric material comprising a first water soluble polymer. In some embodiments, the body portion further comprises a second water soluble polymer, same or different than the first water soluble polymer. For example, in some embodiments, a second water soluble polymer, same or different than the first water soluble polymer, may be positioned within at least a portion of the plurality of pores. In some embodiments, the second water soluble polymer is positioned within the bulk of the first water soluble polymer. In some embodiments, the second water soluble polymer is substantially homogeneously dispersed within the bulk of the first water soluble polymer. In some embodiments, the second water soluble polymer is substantially non-homogeneously dispersed within the bulk of the first water soluble polymer. While the following embodiments generally refer to devices comprising a second water soluble polymer positioned within the plurality of pores, those of ordinary skill in the art would understand, based upon the teachings of this specification, that a second water soluble polymer need not always be present. Without wishing to be bound by theory, in some embodiments, the presence of a second water soluble polymer positioned within at least a portion of the plurality of the pores of the body portion or first water soluble polymer may decrease the thrombogenicity and/or increase the lubriciousness of the device (e.g., device 12 of FIG. 1B, device 14 of FIB. 1C) as compared to devices without the second water soluble polymer positioned within the pores (all other factors being equal). In an exemplary set of embodiments, the first water soluble polymer is polyvinyl alcohol. In another exemplary set of embodiments, the second water soluble polymer is polyacrylic acid. Other water soluble polymers are also possible, as described herein.

In some embodiments, the second water soluble polymer may be considered the same as the first water soluble polymer when they are both polymers of the same monomer (s) but have other characteristics, such as the number of monomer(s) and/or molecular weight, that differ.

In some embodiments, the devices (e.g., device 10 of FIG. 1A, device 12 of FIG. 1B, device 14 of FIG. 1C) and compositions described herein are administered to a subject. In some embodiments, the device may be administered orally, rectally, vaginally, nasally, intravenously, subcutaneously, or uretherally. In some cases, the device may be administered into a cavity, epidural space, vein, artery, orifice, external orifice, and/or abscess of a subject. A non-limiting example of an orifice includes a wound. A non-limiting example of a wound includes a wound orifice that is created for venous access (e.g., created as an insertion site) through the skin.

As described herein, in some embodiments, the compositions, devices and devices described herein comprise or are formed of a polymeric material comprising a first water soluble polymer having a plurality of pores. For example, as illustrated in FIG. 1B device 12 includes a body portion 20 comprising or formed of a polymeric material comprising a first water soluble polymer and having a plurality of pores 30. In some embodiments, second water soluble polymer 40 is positioned within at least a portion (e.g., at least 10%, at least 20%, at least 30%, at least 40%, at least 50%, at least 60%, at least 70%, at least 80%, at least 90%, at least 95%, at least 98%, at least 99%, at least 99.99%) of the plurality of pores. In some embodiments, second water soluble polymer 40 is positioned within less than or equal to 100%, less than or equal to 90%, less than or equal to 80%, less than or equal to 70%, less than or equal to 60%, less than or equal to 50%, less than or equal to 40%, less than or equal to 30%, less than or equal to 20%, or less than or equal to 10% of the plurality of pores (e.g., at least 10% and less than or equal to 100% of the plurality of pores). Combinations of the above-referenced ranges are also possible.

In some embodiments, the second water soluble polymer is positioned within (e.g., dispersed within) the bulk of the first water soluble polymer (e.g., within the pores and/or interstices of the first water soluble polymer). In some embodiments, as illustrated in FIG. 1C, the second water soluble polymer 40 may be present as a coating 45 on at least a portion of a surface of body portion 20. Although FIG. 1C shows the second water soluble polymer as a coating on the first water soluble polymer and in the pores of the first water soluble polymer, it should be appreciated that in some embodiments, only a coating 45 is present and the pores 30 are not substantially filled with the second water soluble polymer 40. Other configurations are also possible.

In some embodiments, the devices and/or devices described herein may be hollow (e.g., have a hollow core). For example, device 10 and/or device 12 may be hollow (e.g., comprising a hollow core 25). However, while FIGS. 1A-1C are depicted having a hollow core, those of ordinary skill in the art would understand based upon the teachings of this specification that such a hollow core may not be present. That is to say, in some cases, the core 25 of the device (e.g., device 10 of FIG. 1A, device 12 of FIG. 1B, device 14 of FIG. 1C) may be a bulk material (e.g., a solid core) without a hollow core 25.

As described above, in some embodiments, one or more biologically active agents may be distributed within body portion 20 and/or plurality of pores 30 (FIGS. 1B-1C). In some embodiments, the biologically active agent is a therapeutic agent. As used herein, the term "therapeutic agent" or also referred to as a "drug" refers to an agent that is administered to a subject to treat, reduce, delay, ameliorate and/or prevent a disease, disorder, or other clinically recognized condition, or for prophylactic purposes, and, in some embodiments, has a clinically significant effect on the body of the subject to treat, reduce, delay, ameliorate and/or prevent the disease, disorder, or condition. Therapeutic agents include, without limitation, agents listed in the United States Pharmacopeia (USP), Goodman and Gilman's The Pharmacological Basis of Therapeutics, 10th Ed., McGraw Hill, 2001; Katzung, B. (ed.) Basic and Clinical Pharmacology, McGraw-Hill/Appleton & Lange; 8th edition (Sep. 21, 2000); Physician's Desk Reference (Thomson Publishing), and/or The Merck Manual of Diagnosis and Therapy, 17th ed. (1999), or the 18th ed (2006) following its publication, Mark H. Beers and Robert Berkow (eds.), Merck Publishing Group, or, in the case of animals, The Merck Veterinary Manual, 9th ed., Kahn, C. A. (ed.), Merck Publishing Group, 2005. In some embodiments, the therapeutic agent may be selected from "Approved Drug Products with Therapeutic Equivalence and Evaluations," published by the United States Food and Drug Administration (F.D.A.) (the "Orange Book"). In some cases, the therapeutic agent is one that has already been deemed safe and effective for use in humans or animals by the appropriate governmental agency or regulatory body. For example, drugs approved for human use are listed by the FDA under 21 C.F.R. §§ 330.5, 331 through 361, and 440 through 460, incorporated herein by reference; drugs for veterinary use are listed by the FDA under 21 C.F.R. §§ 500 through 589, incorporated herein by reference. All listed drugs are considered acceptable for use in accordance with the present invention. In some embodiments, the therapeutic agent is a small molecule. Exemplary classes of agents include, but are not limited to, analgesics, anti-analgesics, anti-inflammatory drugs, antipyretics, antidepressants, antiepileptics, antipsychotic agents, neuroprotective agents, anti-proliferatives, such as anti-cancer agents (e.g., taxanes, such as paclitaxel and docetaxel; cisplatin, doxorubicin, methotrexate, etc.), antihistamines, antimigraine drugs, hormones, prostaglandins, antimicrobials (including antibiotics, antifungals, antivirals, antiparasitics), antimuscarinics, anxiolytics, bacteriostatics, immunosuppressant agents, sedatives, hypnotics, antipsychotics, bronchodilators, anti-asthma drugs, cardiovascular drugs, anesthetics, anti-coagulants, inhibitors of an enzyme, steroidal agents, steroidal or non-steroidal anti-inflammatory agents, corticosteroids, dopaminergics, electrolytes, gastro-intestinal drugs, muscle relaxants, nutritional agents, vitamins, parasympathomimetics, stimulants, anorectics and anti-narcoleptics. Nutraceuticals can also be incorporated. These may be vitamins, supplements such as calcium or biotin, or natural ingredients such as plant extracts or phytohormones.

In some embodiments, the biologically active agent is an anti-inflammatory drug. Non-limiting examples of suitable anti-inflammatory drugs include betamethasone, beclomethasone, budesonide, ciclesonide, dexamethasone, desoxymethasone, fluocinolone acetonide, fluocinonide, flunisolide, fluticasone, icomethasone, rofleponide, triamcinolone acetonide, fluocortin butyl, hydrocortisone aceponate, hydrocortisone buteprate, hydroxycortisone 17-butyrate, prednicarbate, 6-methylprednisolone aceponate, mometasone furoate, elastane, prostaglandin, leukotriene, and bradykinin antagonists.

In some embodiments, the biologically active agent is an anesthetic agent. Non-limiting examples of suitable anesthetic agents include bupivacaine, lidocaine, procaine, and tetracaine.

In some embodiments, the biologically active agent is an antiplatelet agent. Non-limiting examples of suitable antiplatelet agents include clopidogrel, prasugrel, ticagrelor, ticlopidine, cilostazol, vorapaxar, abciximab, eptifibatide, tirofiban, dipyridamole, and terutroban.

In some embodiments, the biologically active agent is an analgesic agent. Non-limiting examples of suitable analgesic agents include paclitaxel, clopidogrel, prasugrel, ticagrelor, aspirin, ibuprofen, naproxen (and other NSAIDs), warfarin, heparin, apixaban, dabigatran, rivaroxaban, and statins.

In some embodiments, the biologically active agent is an antineoplastic agent. Non-limiting examples of suitable antineoplastic agents include paclitaxel, oxaliplatin, fluorouracil (5-FU), docetaxel, methotrexate, doxorubicin, mitoxantrone, teniposide, etoposide, novobiocin, merbarone, and aclarubicin.

In some embodiments, the biologically active agent is an antiseptic agent. Non-limiting examples of suitable antiseptic agents include chlorhexidine, alexidine, iodine, povidone, octenidine, poly biguanides, cetrimides, biphenylol, chlorophene, triclosan, copper, silver, nanosilver, gold, selenium, gallium, taurolidine, cyclotaurolidine, N-chlorotaurine, alcohol, lauroyl arginine ethyl, myristamidopropyl dimethylamine (MAPD), and oleamidopropyl dimethylamine (OAPD).

In some embodiments, the biologically active agent is an antimicrobial agent. Non-limiting examples of suitable antimicrobials include penicillins: benzylpenicillins (e.g., penicillin-G-sodium, clemizole penicillin, benzathine penicillin G); phenoxypenicillins (e.g., penicillin V, propicillin); aminobenzylpenicillins (e.g., ampicillin, amoxycillin, bacampicillin), acylaminopenicillins (e.g., azlocillin, mezlocillin, piperacillin, apalcillin), carboxypenicillins (e.g., carbenicillin, ticarcillin, temocillin), isoxazolyl penicillins (e.g., oxacillin, cloxacillin, dicloxacillin, flucloxacillin), amidine penicillin (e.g., mecillinam), cephalosporins, for example: cefazolins (e.g., cefazolin, cefazedone); cefuroximes (e.g., cerufoxime, cefamandole, cefotiam); cefoxitins (e.g., cefoxitin, cefotetan, latamoxef, flomoxef); cefotaximes (e.g., cefotaxime, ceftriaxone, ceftizoxime, cefmenoxime); ceftazidimes (e.g., ceftazidime, cefpirome, cefepime); cefalexins (e.g., cefalexin, cefaclor, cefadroxil, cefradine, loracarbef, cefprozil); cefiximes (e.g., cefixime, cefpodoxime proxetil, cefuroxime axetil, cefetamet pivoxil, cefotiam hexetil), carbapenems; imipenem; cilastatin; meropenem; biapenem monobactams; gyrase inhibitors: ciprofloxacin, gatifloxacin, norfloxacin, ofloxacin, levofloxacin, pefloxacin, lomefloxacin, fleroxacin, clinafloxacin, sitafloxacin, gemifloxacin, balofloxacin, trovafloxacin, moxifloxacin, rifampicin, minocycline, tetracycline, erythromycin, roxithromycin, azithromycin, clarithromycin, sulfonamides, and aminoglycosides; and combinations thereof.

In some embodiments, the biologically active agent is a coagulative agent. Non-limiting examples of suitable coagulative agents include cellulose, oxidized cellulose, tranexamic acid, aprotinin, epsilon-aminocaproic acid, aminomethylbenzoic acid, fibrinogen, and calcium salts.

In some embodiments, the biologically active agent is a biologic entity. Non-limiting examples of suitable biologic entities include peptides and peptide oligomers: insulin, adrenocorticotropic hormone, calcitonin, oxytocin, vasopressin, octreotide, leuprorelin, exenatide, carfilzomib, bortezomib, lixisenatide, voclosporin, daptomycin, glatiramer, rindopepimut, dulaglutide, trebananib, lutetium, romiplostim, liraglutide, peginesatide, zoptarelin, tesamorelin, lucinactant, pasireotide, linaclotide, teduglutide, albiglutide, dulaglutide, afamelanotide, etelcalcetide, plecanatide; checkpoint inhibitors: PD-1, CTLA-4, PD-L1; immune cell therapeutics: tumor-infiltrating lymphocytes (TILs), chimeric antigen receptor (CAR), tisagenlecleucel, axicabtagene ciloleucel; therapeutic antibodies: trastuzumab, rituximab, ofatumumab, alemtuzumab, ado-trastuzumab emtansine, brentuximab vedotin, blinatumomab; therapeutic vaccines: sipuleucel-T, talimogene laherpaepvec; and immune-modulating agents: cytokines, bacillus Calmette-Guèrin (BCG), thalidomide, lenalidomide, pomalidomide, imiquimod.

In some embodiments, the biologically active agent comprises a natural and/or synthetic cannabinoid or derivatives thereof.

It should be appreciated that where more than one biologically active agent is present (e.g., a first biologically active agent present in the polymeric material forming the bulk of the body portion, or a second biologically active agent in the pores of the body portion), each biologically active agent may independently be one of the active agents described above.

The biologically active agent (e.g., first, second biologically active agent) may be distributed within the body portion and/or the polymeric material and present in the device in any suitable amount. In some embodiments, the biologically active agent is present in the body portion or polymeric material of the device in an amount ranging between about 0.01 wt % and about 50 wt % versus the total device weight in a device in a first configuration (e.g., a water content less than the equilibrium water content state, such as the dehydrated state). In some embodiments, the biologically active agent is present in the body portion of the device in an amount of at least about 0.01 wt %, at least about 0.05 wt %, at least about 0.1 wt %, at least about 0.5 wt %, at least about 1 wt %, at least about 2 wt %, at least about 3 wt %, at least about 5 wt %, at least about 10 wt %, at least about 20 wt %, at least about 30 wt %, at least about 40 wt % versus the total device weight in a first configuration (e.g., a water content less than the equilibrium water content state, such as the dehydrated state). In some embodiments, the biologically active agent is present in the body portion or polymeric material of the device in an amount of less than or equal to about 50 wt %, less than or equal to about 40 wt %, less than or equal to about 30 wt %, less than or equal to about 20 wt %, less than or equal to about 10 wt %, less than or equal to about 5 wt %, less than or equal to about 3 wt %, less than or equal to about 2 wt %, less than or equal to about 1 wt %, less than or equal to about 0.5 wt %, less than or equal to about 0.1 wt %, or less than or equal to about 0.05 wt %. Combinations of the above-referenced ranges are also possible (e.g., between about 0.01 wt % and about 50 wt %). Other ranges are also possible. It should be appreciated that where more than one biologically active agent is present (e.g., a first biologically active agent present in the polymeric material forming the bulk of the body portion, or a second biologically active agent in the pores of the body portion), each biologically active agent may independently be present in amounts within one or more ranges described above.

The devices, catheters, kits, and methods described herein may be administered to any suitable subject. The term "subject", as used herein, refers to an individual organism such as a human or an animal. In some embodiments, the subject is a mammal (e.g., a human, a non-human primate, or a non-human mammal), a vertebrate, a laboratory animal, a domesticated animal, an agricultural animal, or a companion animal. Non-limiting examples of subjects include a human, a non-human primate, a cow, a horse, a pig, a sheep, a goat, a dog, a cat or a rodent such as a mouse, a rat, a hamster, a bird, a fish, or a guinea pig. Generally, the invention is directed toward use with humans. In some embodiments, a subject may demonstrate health benefits, e.g., upon administration of the device.

Advantageously, the devices described herein may permit higher concentrations (weight percent) of active agents such as biologically active agents to be incorporated into the devices as compared to certain other devices (e.g., certain devices including solely a coating of the biologically active agent). In some embodiments, the biologically active agent is associated with the first water soluble polymer and/or the second water soluble polymer. In some embodiments, the biologically active agent is dispersed within the first water soluble polymer and/or the second water soluble polymer. Additionally, or alternatively, the devices described herein may permit extended release of one or more biologically active agents compared to certain other devices (e.g., certain devices including solely a coating of the biologically active agent).

In some embodiments, the biologically active agent may be released from the body portion of the device by any suitable means. In some embodiments, the biologically active agent is released by diffusion out of the body portion (e.g., the polymeric material of the body portion). In some embodiments, the biologically active agent is released by degradation of at least a portion of the body portion (e.g., biodegradation, enzymatic degradation, hydrolysis of the polymeric material forming the body portion, or of the polymeric material in the pores of the body portion). In some embodiments, the active substance is released from the device at a particular rate. Those skilled in the art would understand that the rate of release may be dependent, in some embodiments, on the solubility of the biologically active agent in the medium in which the device is exposed, such as a physiological fluid such as blood. In some embodiments, the release rate may be dependent on the cross-link density, porosity, pore size distribution, pore interconnectivity (e.g., tortuosity), crystallinity, and/or number of biologically active agent containing layers, in the device (e.g., the body portion of the device).

In some embodiments, the device may be configured to release one or more biologically active agent(s) using a combination of burst release(s) and controlled release(s). In an illustrative example, a biologically active agent may be released by a first burst release followed by a controlled release in any of the amounts, average rates, and/or time periods described above. In another illustrative example, a first biologically active agent may be released by a burst release and a second biologically active agent may be released at a particular average rate as described above. In some embodiments, the first biologically active agent and the second biologically active agent may begin release at substantially the same time. In some embodiments, the first biologically active agent and the second biologically active agent may be released at different times.

The biologically active agent(s) may be released at a substantially constant average rate (e.g., a substantially zero-order average release rate) over a time period of at least about 24 hours. In some embodiments, the biologically active agent is released at a first-order release rate (e.g., the rate of release of the biologically active agent is generally proportional to the concentration of the biologically active agent) of a time period of at least about 24 hours.

In some embodiments, the method for forming the polymeric materials and/or devices described herein comprises providing a mixture comprising a first water soluble polymer and an osmotic agent (e.g., a salt) as described above. In some embodiments, the mixture is extruded. In some embodiments, the extruded mixture is extruded on a core material to form the polymeric material disposed on the core material. In some embodiments, the formed polymeric material is exposed to a non-solvent of the polymeric material. In some embodiments, a solution comprising a second water soluble polymer different that the first water soluble polymer and, optionally, an osmotic agent, is introduced to the polymeric material. In some embodiments, the polymeric material (e.g., after introducing the solution to the osmotic agent) is heated. In some embodiments, the solution is flowed against the polymeric material. In some embodiments, the polymeric material may be dried.

In an exemplary set of embodiments, the method for forming the polymeric materials and/or devices described herein comprises providing a mixture comprising a first water soluble polymer and an osmotic agent (e.g., a salt), wherein the first water soluble polymer is present in the mixture in an amount greater than or equal to 10 w/w % (e.g., greater than or equal to 13 w/w % or greater than or equal to 13 w/w % and less than or equal to 50 w/w %) versus the total weight of the mixture, performing the steps of: extruding the mixture at a temperature greater than or equal to 65° C. (e.g., greater than or equal to 65° C. and less than or equal to 100° C.) at atmospheric pressure, on a core material to form the polymeric material disposed on the core material (e.g., a solid rod or a gas), exposing the polymeric material to a non-solvent of the polymeric material at a temperature less than or equal to 28° C. (e.g., less than or equal to 28° C. and greater than or equal to −20° C.) for greater than or equal to 15 minutes (e.g., greater than or equal to 1 hour and less than or equal to 240 hours), introducing, to the polymeric material, a solution comprising a biologically active agent and/or a second water soluble polymer, different than the first water soluble polymer, and/or an osmotic agent (e.g., a salt), heating the polymeric material and the solution to a temperature of greater than or equal to 25° C. (e.g., greater than or equal to 30° C., or greater than or equal to 30° C. and less than or equal to 65° C.), flowing the solution adjacent the polymeric material, for example, for greater than or equal to 1 hour (e.g., greater than or equal to 1 hour and less than or equal to 48 hours or greater than or equal to 3 hours and less than or equal to 48 hours), and drying the polymeric material. In some embodiments, the biologically active agent is distributed within the polymeric material substantially homogeneously to within less than or equal to 50% of an average loading of the biologically active agent in the polymeric material. In some embodiments, the biologically active agent is distributed within the polymeric material non-homogeneously (i.e., on one or more surfaces of the polymeric material).

In some embodiments, the second water soluble polymer is positioned in at least one pore (or a plurality of pores) of the first water soluble polymer, as described herein.

In some embodiments, the non-solvent comprises alcohol. In some embodiments, the non-solvent is ethanol, methanol, propanol, butanol, pentanol, hexanol, heptanol, octanol, decanol, dodecanol, dimethyl sulfoxide, ethyl acetate, acetates, propionates, ethers, dimethyl formamide, dimethyl acetamide, acetone, acetonitrile, ethylene glycol, propylene glycol, glycerol air, vacuum or combinations thereof. Other non-solvents are also possible (e.g., a solvent having a high solubility to water but a lower solubility to the water-soluble polymer, as compared to the solubility in water).

In some embodiments, the core material may be air, water, a non-solvent liquid, a solid, or a gas. In some cases, the core material may be removed after formation of the polymeric material on the core material. The core material may be physically removed and/or dissolved, in some cases.

Figure 1G:
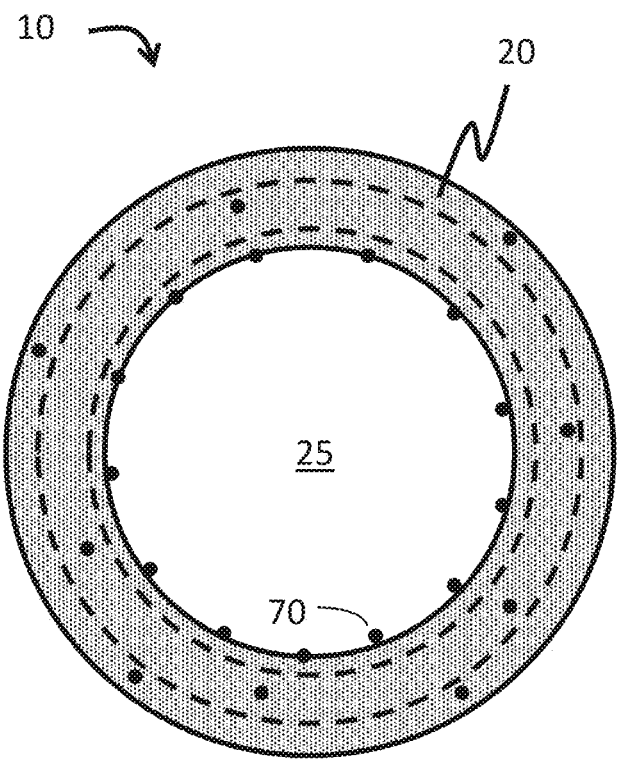
FIG. 1G is a cross-sectional schematic diagram of an exemplary device, according to one set of embodiments.

In some embodiments, the polymeric materials and/or devices described herein may be exposed to and/or comprise a humectant. For example, in some embodiments, device 10 comprises humectant 70, as shown illustratively in FIG. 1G. In some embodiments, at least a portion of the humectant is disposed on a surface (e.g., an inner lumen and/or an abluminal surface) of the polymeric material and/or device (e.g., the body portion). For example, in some embodiments, a portion of humectant 70 is disposed on a surface of device 10. In some embodiments, greater than or equal to 30%, greater than or equal to 40%, greater than or equal to 50%, greater than or equal to 60%, greater than or equal to 70%, greater than or equal to 80%, greater than or equal to 90%, or all of the humectant is disposed on a surface of the polymeric material and/or device (e.g., the body portion). In some embodiments, less than or equal to 100%, less than or equal to 90%, less than or equal to 80%, less than or equal to 70%, less than or equal to 60%, less than or equal to 50%, less than or equal to 40% of the humectant is disposed on a surface of the polymeric material and/or device (e.g., the body portion). Combinations of these ranges are also possible (e.g., 40-100%).

In some embodiments, at least a portion of the humectant is inside the polymeric material and/or device (e.g., the body portion). In some embodiments, at least a portion of the humectant is inside the polymeric material and/or device (e.g., the body portion). For example, in some embodiments, a portion of humectant 70 is inside device 10 (e.g., absorbed into the bulk of the device). In some embodiments, greater than or equal to 30%, greater than or equal to 40%, greater than or equal to 50%, greater than or equal to 60%, greater than or equal to 70%, greater than or equal to 80%, greater than or equal to 90%, or all of the humectant is inside the polymeric material and/or device (e.g., the body portion). In some embodiments, less than or equal to 100%, less than or equal to 90%, less than or equal to 80%, less than or equal to 70%, less than or equal to 60%, less than or equal to 50%, less than or equal to 40% of the humectant is inside the polymeric material and/or device (e.g., the body portion). Combinations of these ranges are also possible (e.g., 30-100%).

In some embodiments, the humectant is a non-ionic surfactant (i.e. a surfactant having an uncharged hydrophilic head and a hydrophobic tail) or a zwitterionic surfactant (i.e. a surfactant having a net uncharged hydrophilic head and a hydrophobic tail). In some embodiments, the humectant is a non-ionic surfactant selected from the group consisting of sugar alcohols, poloxamer, triacetin, α-hydroxy acids, polyethylene glycol, polypropylene glycol, ethylene glycol, propylene glycol, hexylene glycol, butylene glycol, glycerol, sorbitol, mannitol, xylitol, maltitol, erythritol, threitol, arabitol, ribitol, galactitol, fucitol, iditol, inositol, volemitol, malitol, lactitol, maltotriitol, maltotetraitol, polyglycitols, and combinations thereof. In some embodiments, the humectant comprises an oil such as vitamin E. In some embodiments, the humectant comprises a salt such as sodium chloride, potassium chloride, and/or phosphocholine.

Figure 3A:
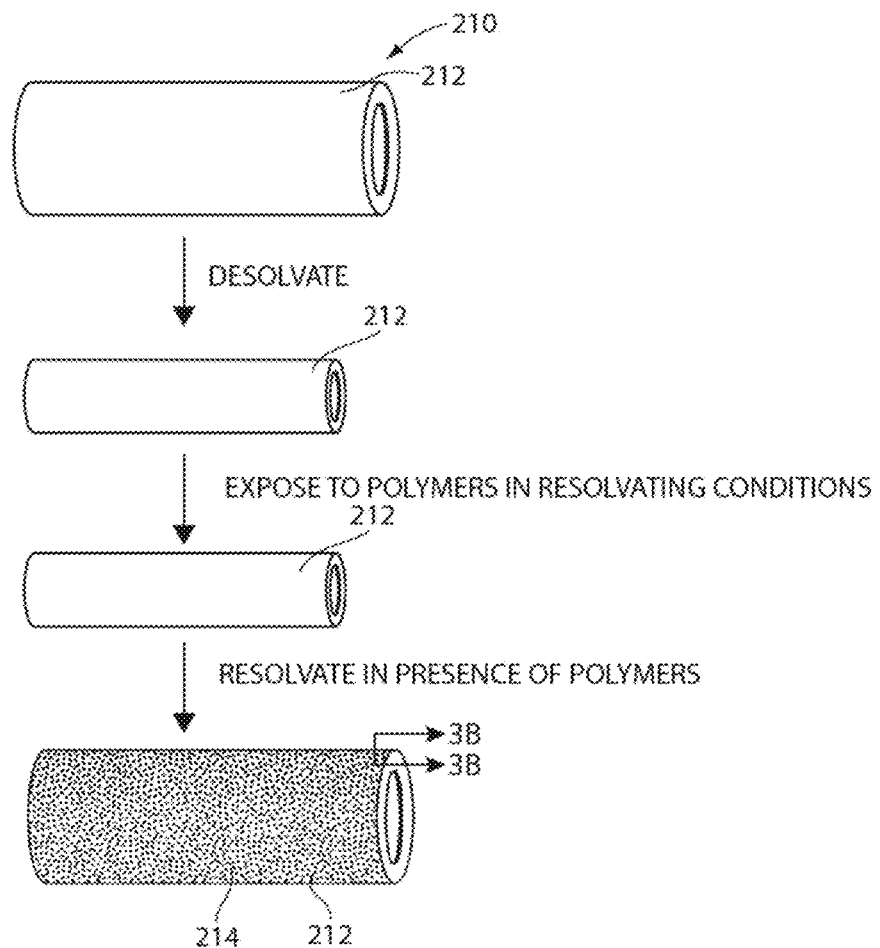
FIG. 3A is a schematic of a process of bulk incorporation of a polymer into a porous solid, according to one set of embodiments.
Figure 3B:
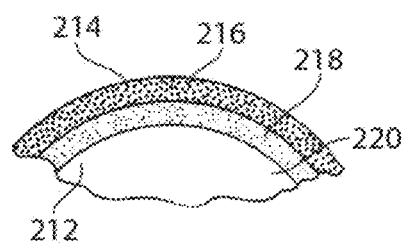
FIG. 3B is a cross-section of a portion of a tube taken along line 3B-3B of FIG. 3A, according to one set of embodiments.

In some embodiments, the polymeric materials and/or devices described herein are exposed to and/or comprise greater than or equal to 0.1 w/w % humectant, greater than or equal to 0.5 w/w % humectant, greater than or equal to 1 w/w % humectant, greater than or equal to 5 w/w % humectant, greater than or equal to 10 w/w % humectant, or greater than or equal to 20 w/w % humectant. In some embodiments, the polymeric materials and/or devices described herein are exposed to and/or comprise less than or equal to 30 w/w % humectant, less than or equal to 25 w/w % humectant, less than or equal to 20 w/w % humectant, less than or equal to 15 w/w % humectant, less than or equal to 10 w/w % humectant, less than or equal to 5 w/w % humectant, or less than or equal to 1 w/w % humectant. Combinations of these ranges are also possible (e.g., 0.1-30 w/w % humectant or 1-10 w/w % humectant). A porous solid (e.g., made by the apparatus of FIGS. 1D-1F) may be annealed. Further, a porous solid, with or without prior annealing, may be processed to further include bulk incorporated polymers. In FIG. 3A, material 210 comprising porous solid matrix 212 is desolvated, exposed to a mixture comprising polymers that are in a resolvating solvent, and resolvated in the mixture to form material 212 with bulk incorporated polymers 214. A cross section of matrix 212 (FIG. 3B) reveals an outermost zone 216 wherein pores of matrix 212 are filled, an intermediate zone 218 wherein there is a lesser density of polymers in the pores, with less filling and/or fewer of the pores being occupied, and an inner zone 220 wherein polymers have not penetrated. The matrix can be solvated and/or desolvated prior to exposure to the mixture, provided that it is desolvated when exposed to the mixture so that water soluble polymers can be moved into the matrix.

In some embodiments, a method for humectifying a device and/or polymeric material comprises placing an extruded segment into a solution comprising the humectant (e.g., glycerol or poloxamer). In some embodiments the solution comprises greater than or equal to 1 w/w %, greater than or equal to 5 w/w %, greater than or equal to 10 w/w %, greater than or equal to 15 w/w %, greater than or equal to 20 w/w %, or greater than or equal to 25 w/w % humectant. In some embodiments, the solution comprises less than or equal to 35 w/w %, less than or equal to 30 w/w %, less than or equal to 25 w/w %, less than or equal to 20 w/w %, less than or equal to 15 w/w %, less than or equal to 10 w/w %, or less than or equal to 5 w/w % humectant. Combinations of these ranges are also possible (e.g., 1-35 w/w %). In some embodiments, the solution comprises a surfactant. In some embodiments, the solution comprises PBS.

In some embodiments, the extruded segment is placed in the solution for a period of time. In some embodiments, the period of time is greater than or equal to 1 hour, greater than or equal to 2 hours, or greater than or equal to 3 hours. In some embodiments, the period of time is less than or equal to 4 hours, less than or equal to 3 hours, or less than or equal to 2 hours. Combinations of these ranges are also possible (e.g., 3 hours, or 1-4 hours).

In some embodiments, the solution is maintained at a temperature during exposure of the extruded segment to the solution. In some embodiments, the temperature is greater than or equal to 20° C., greater than or equal to 30° C., greater than or equal to 37° C., greater than or equal to 40° C., greater than or equal to 50° C., or greater than or equal to 60° C. In some embodiments, the temperature is less than or equal to 70° C., less than or equal to 60° C., less than or equal to 55° C., less than or equal to 50° C., less than or equal to 40° C., less than or equal to 37° C., or less than or equal to 30° C. Combinations of these ranges are also possible (e.g., 20-70° C., 37-55° C., or 45° C.).

In some embodiments, after the extruded segment is removed from the solution, the extruded segment can be dried (e.g., in a convection oven). In some embodiments, the extruded segment is dried at a certain temperature. In some embodiments, the temperature is greater than or equal to greater than or equal to 20° C., greater than or equal to 30° C., or greater than or equal to 40° C. In some embodiments, the temperature is less than or equal to 50° C., less than or equal to 40° C., or less than or equal to 30° C. Combinations of these ranges are also possible (e.g., 30° C., or 20-50° C.). In some embodiments, the extruded segment is dried for a period of time. In some embodiments, the period of time may be greater than or equal to 1 hour, greater than or equal to 2 hours, or greater than or equal to 3 hours. In some embodiments, the period of time may be less than or equal to 4 hours, less than or equal to 3 hours, or less than or equal to 2 hours. Combinations of these ranges are also possible (e.g., 3 hours, or 1-4 hours).

A biologically active agent may be incorporated into the devices and/or devices described herein using any suitable method. For example, in some embodiments, the first water soluble polymer may be mixed with water (e.g., via a solution compounding method at a mass ratio of from 0.1 to 99.9, 1 to 99, from 5 to 95, from 10 to 90, from 20 to 80, from 30 to 70, from 33 to 67, from 37 to 63, from 40 to 60, from 42 to 58, from 45 to 55, from 47 to 53, from 50 to 50 of the water soluble polymer to water). In some embodiments, the biologically active agent may be suspended or solubilized in water prior to solution compounding. The biologically active agent may be micronized, aggregated, and/or untreated, in some cases, when combined into the solution comprising the water-soluble polymer and water. In some embodiments, the biologically active agent may be mixed with the water-soluble polymer and water prior to heating the solution as described herein. In some embodiments, the biologically active agent may be added as the temperature is lowered upon cooling after bulk incorporation of polymers as described herein.

In some embodiments, cross-linking of the third water soluble polymer can be achieved by UV-crosslinking, chemical cross-linking (e.g., glutaraldehyde, bis(hydroxyethl) sulfone, maleic acid, etc.), and/or radiation cross-linking (e.g., gamma) prior to micronization. In some embodiments, traditional encapsulation methods may be used to micronize to less than 50 microns and/or extend a controlled release from a microparticle or nanoparticle e.g., through in situ oil in water emulsion or water in oil emulsion or cavity molding.

In some embodiments, the particles comprising the biologically active agent may be produced in situ with fully polymerized polymer, prepolymer with a crosslinker or initiator, monomer and initiator, or two or more monomers that self-polymerize, or combinations thereof.

As described herein, in some embodiments, the biologically active agent may be present within the plurality of pores of the body portion of the device (e.g., FIGS. 1B-1C). In some such embodiments, the biologically active agent may be released upon e.g., hydration and/or expansion/elongation of the device. Incorporation of the biologically active agent into the plurality of pores may use any suitable method. For example, in some embodiments, the biologically active agent may be mixed with a second water soluble polymer as described herein, such that the second water soluble polymer and biologically active agent are disposed within the plurality of pores. In some embodiments, the biologically active agent may be adsorbed/absorbed into the plurality of pores.

In some embodiments, the biologically active agent may be solubilized and infused into the body portion via a channel of the device (e.g., hollow core 25 of FIGS. 1A-1C).

Such devices may be useful as delayed release (e.g., long-term release) and/or reloadable devices.

In some embodiments, a biologically active agent with a water-soluble polymer is co-extruded as a center layer between an outer and inner layer containing a non-agent bulk polymer (e.g., PVA). In an exemplary embodiment, the biologically active agent is compatible with the bulk polymer (with and will adhere well, without delamination. In some embodiments, the biologically active agent layer is distant from the surface allowing for a bindable polymer to be adsorbed and absorbed into those surface layers.

Figure 4A:
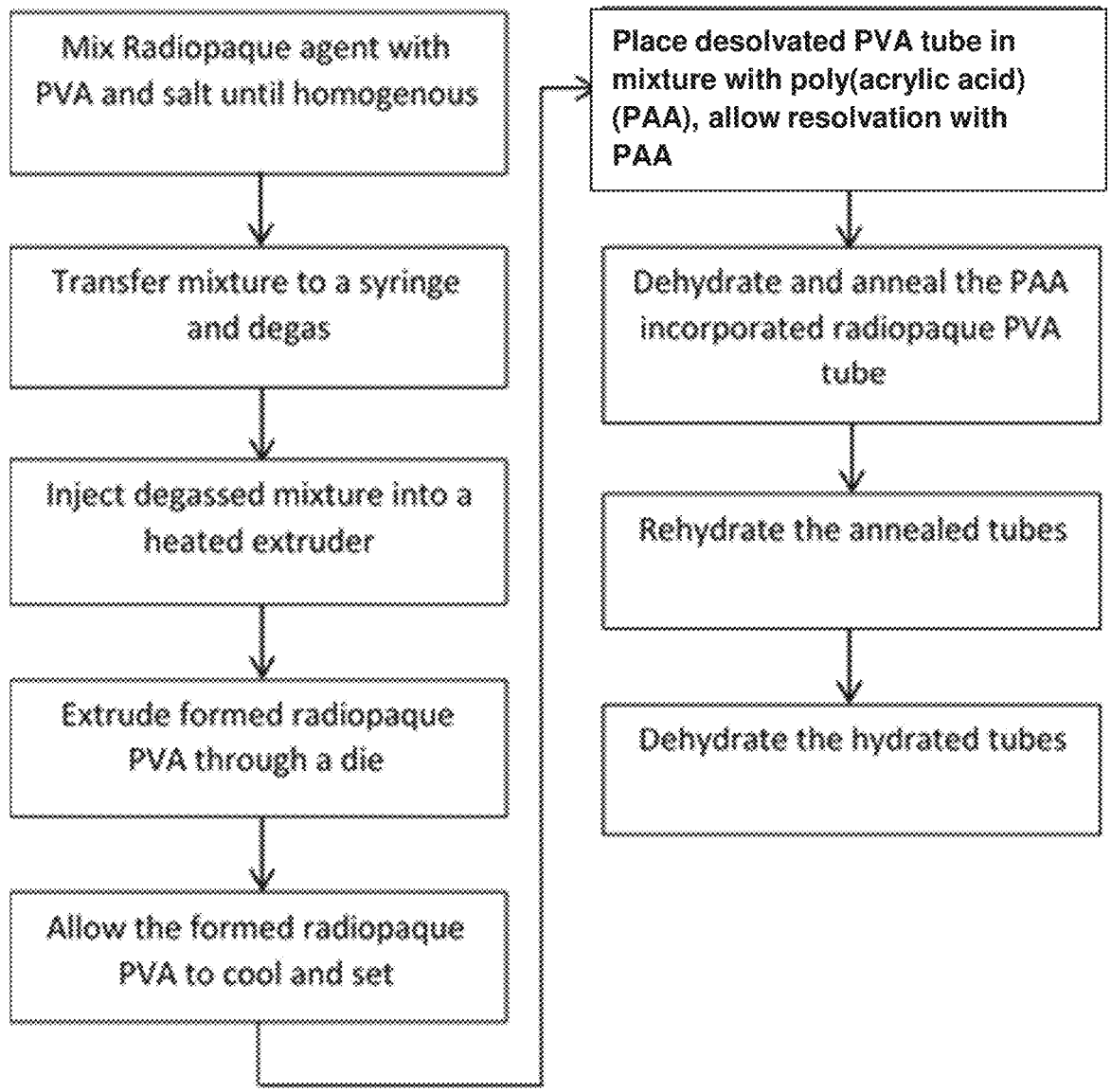
FIG. 4A is a process flow chart for an embodiment of bulk incorporating a surface polymer into a porous solid and includes an extrusion process for making the porous solid, according to one set of embodiments.

An exemplary flow chart for a process for making a porous solid including bulk incorporated polymers is presented in FIG. 4A. In this process, a radiopaque (RO) agent is included in an extrusion process. The heated hydrophilic polymer solution refers to the polymers that are bulk incorporated into pores of the extruded porous solid.

Figure 4B:
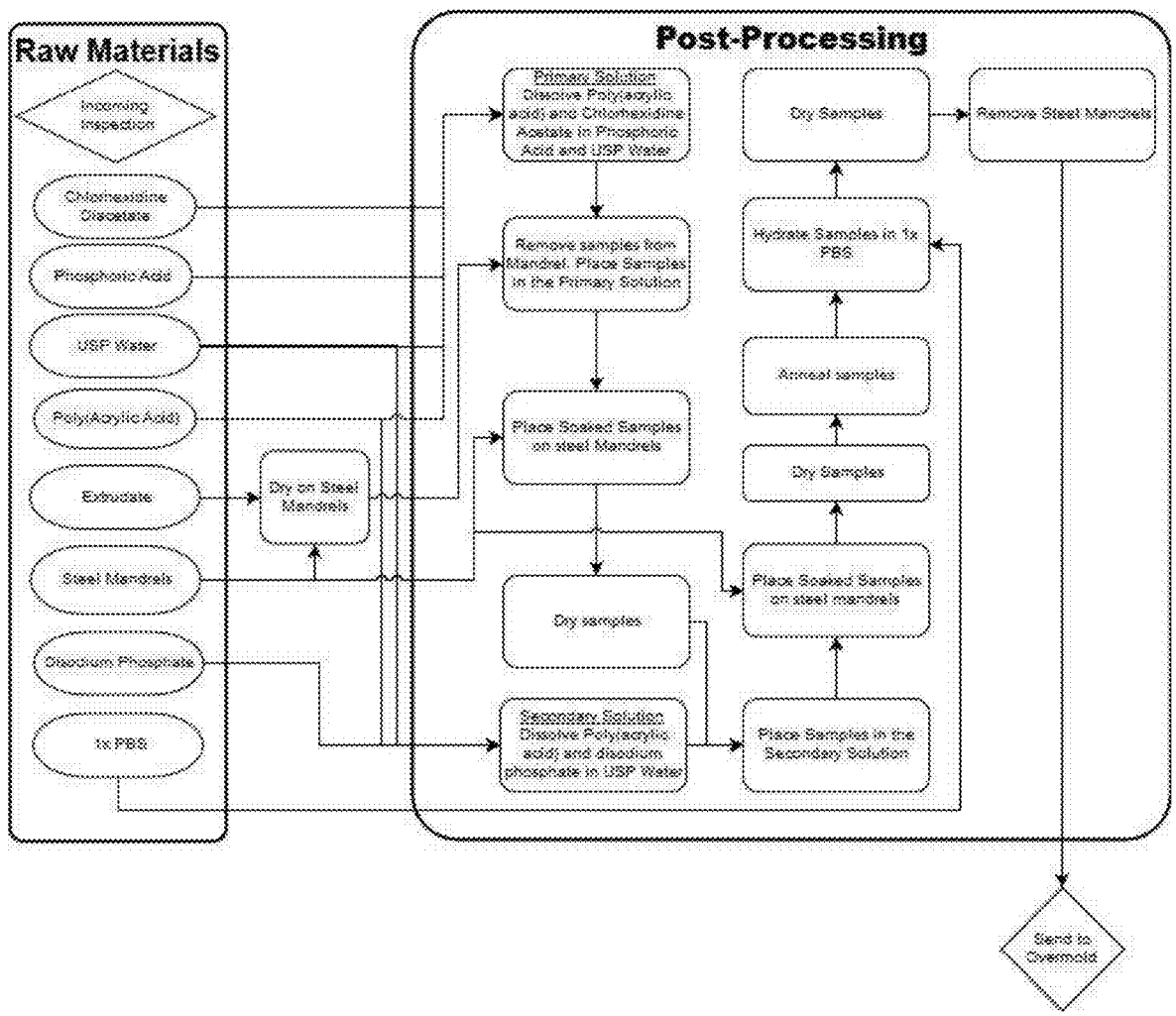
FIG. 4B is a process flow chart for an embodiment of incorporating a biologically active agent and a polymer into a porous solid, according to one set of embodiments.

Another exemplary flow chart for a process for making a porous solid including bulk incorporated polymers and a biologically active agent is shown in FIG. 4B. In this process, post-processing is included in an extrusion process after drying the extrudate on steel mandrels.

Artisans reading this disclosure will be able to adapt its principles in light of what is known about extrusion or other forming arts to make alternative processes and devices that achieve the same end products as described herein. A scaled-up embodiment of this process may be adapted for use with, for example, a multi-zone screw extruder, with the solvent mixture provided via a suitable injector or a hopper and the zones controlled to provide a cold extrusion. Features such as the syringe pump can be replaced by a suitably metered and controlled liquid or solid polymer feed system.

Fukumori et al. (2013), *Open J. Organic Polymer Materials* 3:110-116 reported a freeze-thaw process of making poly(vinyl alcohol) (PVA) materials with a Young's modulus of 181 MPa with a Young's modulus of about 5 MP or more requiring at least about 3 cycles in the samples they tested. The process of making these gels required multiple freeze-thaw cycles. The resultant materials were tested in a dry condition and are not comparable to strengths measured at EWC. Fukumori et al. reported that the crystalline content of the materials increased with the number of freeze-thaw cycles and attributed the strength of the materials to large crystals being formed as the freeze-thaw cycles progressed, with the larger crystals forming superior crosslinks that increased the Tg of the materials. The nature of these processes produces a dried material. Moreover, as discussed below, a freeze-thaw process produces macropores.

In some embodiments, processes herein are free of freeze-thaw processes and/or free of a freezing process and/or free of a thawing process. Further the processes can be used to make solid porous materials that have little or no swelling, e.g., 0%-100% w/w swelling at EWC, even in an absence of covalent crosslinking agents Artisans will immediately appreciate that all ranges and values between the explicitly stated bounds are contemplated, with, e.g., any of the following being available as an upper or lower limit: 0, 5, 10, 15, 20, 25, 30, 40, 50, 60, 70, 80, 90, 95, 100% w/w, with swelling measured as % swelling=100×(Total weight at EWC-dry weight)/dry weight, with the dry weight being the weight of the material without water.

In some embodiments, the extruded samples have a horizontal chain orientation and alignment along the length of samples (in direction of extrusion). A polymeric chain orientation produced by the extrusion process. Without wishing to be bound by theory, it is believed that this horizontal chain orientation and alignment along the length of the samples contributes to the inner diameter and/or outer diameter increasing by a larger percentage than the percentage increase in length when the samples swell, in some embodiments.

Various types of dies may be used, e.g., longitudinal, angular, transverse and spiral extrusion heads, as well as single-polymer extrusion heads used for extruding a single polymer and multi layers extrusion heads used for simultaneous extrusion of a plurality of polymer layers or other layers. Continuous operation heads may be used, as well as cyclical. Various materials may be incorporated into, or as, a layer: for example, a reinforcing material, a fiber, a wire, a braided material, braided wire, braided plastic fibers, and so forth. Similarly, such materials may be excluded. Moreover, the porous solid may be made with a certain property, e.g., Young's modulus, tensile strength, solids content, polymer composition, porous structure, or solvent content that is known and thus measurable exclusive of various other materials. Accordingly, embodiments include materials disclosed herein that are described in terms of the materials' properties without regard to various other incorporated materials. For instance, a nanoporous solid has a certain Young's modulus that is known even if the material has a reinforcing wire that contributes further strength.

A core may be used with an extrusion die. The core may be air, water, a liquid, a solid, a non-solvent or a gas. Artisans reading this disclosure will appreciate that various extrusion processes using these various kinds of cores may be used. Cores made of polytetrafluoroethylene tubing (PTFE) are useful. In some embodiments, a core is a wire.

Multi lumen tubing has multiple channels running through its profile. These extrusions can be custom engineered to meet device designs. Multi Lumen tubing has a variable Outer Diameter (OD), numerous custom Inner Diameters (ID's), and various wall thicknesses. This tubing is available in a number of shapes; circular, oval, triangular, square, semi-circular, and crescent. These lumens can be used for guidewires, fluids, gases, wires, and various other needs. The number of lumens in multi lumen tubing is only limited by the size of the OD. In some embodiments, OD's are as large as 0.5 in., ID's can be as small as 0.002 in., and web and wall thicknesses can be as thin as 0.002 in. Tight tolerances can be maintained to +/−0.0005 in. Artisans will immediately appreciate that all ranges and values between the explicitly stated bounds are contemplated, with, e.g., any of the following being available as an upper or lower limit for an OD and/or ID: 0.002, 0.003, 0.004, 0.007, 0.01, 0.02, 0.03, 0.04, 0.05, 0.1, 0.2, 0.3, 0.4, and 0.5 in. Tolerances may be, e.g., from 0.0005 to 0.1 in.; Artisans will immediately appreciate that all ranges and values between the explicitly stated bounds are contemplated, with, e.g., any of the following being available as an upper or lower limit: 0.0005, 0.001, 0.002, 0.003, 0.006, 0.01, 0.02, 0.03, 0.06, 0.8, 0.9, 1 in.

Braid reinforced tubing can be made in various configurations. For instance, it is possible to braid using round or flat, single or double ended wires as small as 0.001 in. Various materials can be used to make the braided reinforced tubing including stainless steel, beryllium copper, and silver, as well as monofilament polymers. The braid can be wound with various pics per inch over many thermoplastic substrates such as nylons or polyurethanes. The benefits of braided catheter shaft are its high torque-ability and kink resistance. By changing several factors during the braiding process, the characteristics of the tube can be altered to fit performance requirements. After braiding is complete, a second extrusion may be applied on top of the braided tube to encapsulate the braid and provide a smooth finish. Walls as thin as 0.007 in. can be achieved when a braid reinforced tube is required.

Porous, Microporous, and Nanoporous Materials

Porous solid is a term used broadly herein to refer to materials having a solid phase containing open spaces and is used to describe true porous materials and also hydrogels having an open matrix structure. Some terms related to porosity are used somewhat loosely in scientific literature such that it is helpful to provide certain definitions herein. The term nanoporous material or nanoporous solid is used herein to specifically refer to a solid made with interconnected pores having a pore size of up to about 100 nm diameter. The term diameter is broad and encompasses pores of any shape, as is customary in these arts. The term microporous solid or microporous material is similarly used herein to specifically refer to a solid made with interconnected pores having a pore size of up to about 10 µm diameter. These nano- or microporous materials are characterized by an interconnected porous structure.

Some hydrogels, which artisans sometimes refer to as hydrogel sponges, are also true porous materials that have a continuous and solid network material filled through voids, with the voids being the pores. However, an open matrix structure found in many hydrogels is not a true porous structure and, in general, while it is convenient to refer to them as porous materials, or to use analogies to pores when characterizing diffusive or other properties, such hydrogels are not nanoporous or microporous solids as those terms are used herein. The spaces between strands of an open matrix hydrogel, and the strands of the matrix are not interconnected pores. Hydrogels are crosslinked gels that have solid-like properties without being a true solid although it is convenient herein and generally in these arts to refer to them as a solid because they are crosslinked, insoluble in solvent, and have significant mechanical strength. Hydrogels may have a high-water content, e.g., 25% w/w at EWC or more. Artisans in the hydrogel arts sometimes use the term porous, to characterize a net molecular weight cut off or to refer to spacing between strands of an open hydrogel matrix, in which case the hydrogel does not have a true porous structure and is not a nanoporous or a microporous material as those terms are used herein. The definitions of nanoporous material and microporous material as used herein also contrast with a convention that is sometimes followed wherein microporous substances are described as having pore diameters of less than 2 nm, macroporous substances have pore diameters of greater than 50 nm, and a mesoporous category lies in the middle.

The extrusion process for making the inventive materials has some advantages. The extrusion has been observed to align the polymers to a parallel orientation that contributes to high tensile strength. Having been extruded and stretched, the polymer molecules become aligned in the direction of the tube or fiber. Any tendency to return to a random orientation is prevented by the strong intermolecular forces between the molecules. Further, extrusion provides for creation of materials or devices with a high aspect ratio as compared to injection molding or other molding processes. Moreover, extrusion provides good control of dimensions such that wall thickness, placement of the lumen or lumens can be controlled. The use of high concentrations of polymers, above their melt point, in a solvent was useful for enabling extrusion. It is significant that attempts by others to use similar polymers to make high strength materials used other techniques that do not allow for extrusion, that are less efficient, and often unsuited for making actual end-user products.

For example, poly(vinyl alcohol) (PVA) was used herein to make nanoporous materials with excellent properties, especially as compared to conventionally used PVA medical materials. In fact, PVA has been used extensively throughout the medical device industry with a well-established track record of biocompatibility. PVA is a linear molecule with an extensive history as a biocompatible biomaterial. PVA hydrogels and membranes have been developed for biomedical applications such as contact lenses, artificial pancreases, hemodialysis, and synthetic vitreous humor, as well as for implantable medical materials to replace cartilage and meniscus tissues. It is an attractive material for these applications because of its biocompatibility and low protein adsorption properties resulting in low cell adhesion compared with other hydrogels.

Others have tried to improve the properties of PVA for biomedical purposes. For instance, others have experimented with a freeze/thaw process. And techniques for formation of hydrogels from PVA such as "salting out" gelation have been shown to form useful polymer hydrogels using different molecular weights and concentrations. Manipulation of Flory interactions has also been studied in the formation of PVA gels through the combination of two solutions (see U.S. Pat. Nos. 7,845,670, 8,637,063, 7,619,009) for the use of PVA as an injectable in situ forming gel for repairing intervertebral disks. In general, prior processes for fabricating tough PVA materials were studied in U.S. Pat. No. 8,541,484. Methods for doing so without the use of radiation or chemical crosslinkers have also been previously studied, as shown in U.S. Pat. No. 6,231,605. None of this PVA-related work by others has resulted in the inventions that are set forth herein. Some of these other materials were useful in regards to tensile strength but were nonetheless macroporous in nature.

In contrast, processes herein provide high strength materials with a true porous structure and other useful characteristics such as an unexpectedly good combination of biocompatibility and mechanical properties. Embodiments of porous solid materials are provided that have a combination of structural features independently chosen from pore sizes, tensile strength, Young's modulus, solids concentration, crosslinking type and degree, internal alignment, hydrophilicity, and composition for the materials and further, optionally, independently selecting end-user devices or intermediate materials having a desired aspect ratio for molded shapes, a lumen, a plurality of lumens, tubes with concentrically placed lumens or a range of tolerance of thickness, or a particular medical device: each of these are further detailed herein.

Embodiments include nanoporous materials with pore diameters of 100 nm or less, or within a range of 10-100 nm; Artisans will immediately appreciate that all ranges and values between the explicitly stated bounds are contemplated, with, e.g., any of the following being available as an upper or lower limit: 1, 2, 3, 4, 5, 10, 20, 50, 60, 70 80, 90, 100 nm.

Embodiments include nanoporous materials or microporous materials with a tensile strength at break of at least about 50 MPa or from 1-300 MPa measured at EWC. Artisans will immediately appreciate that all ranges and values between the explicitly stated bounds are contemplated, with, e.g., any of the following being available as an upper or lower limit: 10, 20, 30, 40, 50, 60, 70, 100, 200, 300 MPa.

Embodiments include nanoporous materials or microporous materials with a Young's modulus strength of at least about 1 MPa or from 1-200 MPa measured at EWC. Artisans will immediately appreciate that all ranges and values between the explicitly stated bounds are contemplated, with, e.g., any of the following being available as an upper or lower limit: 5, 10, 15, 20, 25, 30, 35, 40, 50, 60, 70, 80, 90, 100, 120, 140, 160, 180, 200 MPa.

Embodiments include nanoporous materials or microporous materials or hydrogels with an elongation at break of at least about 100% or from 50-1500% measured at EWC. Artisans will immediately appreciate that all ranges and values between the explicitly stated bounds are contemplated, with, e.g., any of the following being available as an upper or lower limit: 50, 60, 70, 80, 90, 100, 200, 300, 400, 450, or 500% (e.g., greater than or equal to 50%).

Embodiments include nanoporous materials or microporous materials or hydrogels with a solids content of at least 20% or solids from 20-90% w/w measured at EWC; Artisans will immediately appreciate that all ranges and values between the explicitly stated bounds are contemplated, with, e.g., any of the following being available as an upper or lower limit: 5, 10, 25, 30, 35, 40, 45, 50, 55, 60, 65, 70, 80, 90% w/w percent solids. Percent solids are measured by comparing a total weight at EWC to dry weight.

The tensile strength, modulus, and elongation values may be mixed-and-matched in combinations within the ranges as guided by this disclosure.

Embodiments include nanoporous materials or microporous materials or hydrogels with physical crosslinks or covalent crosslinks or a combination thereof. Physical crosslinks are noncovalent, e.g., physical crosslinks are ionic bonds, hydrogen bonds, electrostatic bonds, Van Der Waals forces, or hydrophobic packing. The materials may be made free of covalent crosslinks, covalent crosslinkers and chemical products thereof. Chemicals can be added during processing to create covalent crosslinks, as is known in the arts of polymerization. Alternatively, the processes and materials may be free of the same.

Embodiments include nanoporous materials or microporous materials or hydrogels with an internal alignment of the polymeric structure. Alignment may be visualized using SEM images in sections taken along the direction of extrusion, i.e., longitudinally for a tube. Alignment refers to a majority horizontal chain orientation and along the length of samples (in direction of extrusion).

Embodiments include nanoporous materials or microporous materials or hydrogels with a hydrophilic surface and/or material. Materials made from polymers that are water soluble are hydrophilic. A water-soluble polymer is a polymer that is soluble in water at a concentration of at least 1 g/100 ml at 20° C. Water soluble polymers are hydrophilic. A surface is hydrophilic if a contact angle for a water droplet on the surface is less than 90 degrees (the contact angle is defined as the angle passing through the drop interior). Embodiments include hydrophilic surfaces with a contact angle from 90 to 0 degrees; Artisans will immediately appreciate that all ranges and values between the explicitly stated bounds are contemplated, with, e.g., any of the following being available as an upper or lower limit: 90, 80, 70, 60, 50, 40, 30, 20, 10, 5, 2, 0 degrees. A matrix of a material is hydrophilic relative to a solvent when the matrix is hydrophilic and a droplet of the solvent on the surface is less than 90 degrees.

Materials for use in the process and/or biomaterials may include polymers. Hydrophilic polymers are useful, e.g., one or more polymers may be selected from polyvinyl alcohol (PVA), polyvinylpyrrolidone (PVP), polyethylene glycol (PEG), polyacrylic acid (PAA), polyacrylamide, hydroxypropyl methacrylamide, polyoxazolines, polyphosphates, polyphosphazenes, poly(vinyl acetate), polypropylene glycol, Poly(N-isopropylacrylamide) (PNIPAM), polysaccharides, sulfonated hydrophilic polymers (e.g., sulfonated polyphenylene oxide, Nafion®, sulfobetaine methacrylate) and variations of the same with an added iodine (e.g., PVA-I, PVP-I), or variations with further pendent groups, copolymers of the same, and combinations of the same. Two or more hydrophilic polymers may be intermixed together to form a nanoporous material. The molecular weight of the polymer can affect the properties of the biomaterial. A higher molecular weight tends to increase strength, decrease pore size, and decrease protein adsorption. Accordingly, embodiments include a polymer or a hydrophilic polymer having a molecular weight of 40 kDa to 5000 kDa; Artisans will immediately appreciate that all ranges and values between the explicitly stated bounds are contemplated, with, e.g., any of the following being available as an upper or lower limit: 40 k, 50 k, 100 k, 125 k, 150 k, 250 k, 400 k, 500 k, 600 k, 750 k, 800, 900 k, 1 million, 1.5 million, 2 million, 2.5 million, 3 million molecular weight.

The term PEG refers to all polyethylene oxides regardless of molecular weight or whether or not the polymers are terminated with a hydroxyl. Similarly, the terms PVA, PVP, and PAA are used without limitation as to terminal chemical moieties or MW ranges. References to polymers described herein include all forms of the polymers including linear polymers, branched polymers, underivatized polymers, and derivatized polymers. A branched polymer has a linear backbone and at least one branch and is thus a term that encompasses star, brush, comb, and combinations thereof. A derivatized polymer has a backbone that comprises the indicated repeating unit and one or more substitutions or pendant groups collectively referred to as derivatizing moieties. A substitution refers to a replacement of one atom with another. A pendant group is a chemical moiety attached to the polymer and may be the same or a different moiety as the polymer repeating unit. Accordingly, a reference to a polymer encompasses highly derivatized polymers and also polymers no more than 0.01-20% w/w derivatizing moieties, calculated as the total MW of such moieties compared to the total weight of the polymer. Artisans will immediately appreciate that all ranges and values between the explicitly stated bounds are contemplated, with, e.g., any of the following being available as an upper or lower limit: 0.01, 0.05, 0.1, 0.2, 0.3, 0.5, 1, 2, 3, 4, 5, 6, 7, 8, 9, 10, 15, 20% w/w.

A porous solid may be formed as a monolithic material, as a layer on another material, device, or surface, as a plurality of layers, or as one or more layers of a nanoporous material or a material that comprises a nanoporous material. Thus, for example, a plurality of layers may be extruded, with the layers being independently chosen to form one or more of: a nanoporous material, a microporous material, a hydrogel, a single-polymer material, a material having two or more polymers, and a non-nanoporous material.

The process of making the material can also affect the material properties, including the concentration of polymer in the polymeric mixture passed through a die. Starting PVA or other hydrophilic polymer concentrations may range from, e.g., 5 to 70% weight-volume (w/w) in water; generally, about 10-30% (w/w) is preferable; Artisans will immediately appreciate that all ranges and values between the explicitly stated bounds are contemplated, with, e.g., any of the following being available as an upper or lower limit: 5, 10, 15, 20, 25, 30, 35, 40, 45, 50, 55, 60, 65, 70 percent.

Processes set forth herein may be truncated at a point before polymers crosslink and are processed to become a true nanoporous material, or otherwise adapted to avoid a nanoporous structure. In general, such materials have a lesser strength and toughness and lower solids content. Such materials are generally hydrogels when hydrophilic polymers are used at relatively low solids content. Accordingly, such materials, and even hydrogels, are contemplated herein, and materials may be made that are of somewhat lesser characteristics as compared to the nanoporous materials but, nonetheless, are superior to conventional processes and materials that use the same polymers. Similarly, and as a generalization, a microporous solid would have properties that approach those of the nanoporous materials and would have a strength better than those of a hydrogel.

Artisans are accustomed to quantifying pore size distributions in materials. Nanoporous, microporous, and microporous materials are disclosed herein and control of the pore sizes of such material is demonstrated. Embodiments thus include materials that have a particular quantity or distribution of pore sizes. These can be measured at a surface, in a depth from the surface in a cross-sectional sample, or for the bulk of the material. For instance, the material pore sizes on a surface, at a depth from a surface, or in a bulk may have a percentage from 50-100% of pore diameters that fall within a range, or above or below a certain value, from 1 nm to 20 μm; Artisans will immediately appreciate that all ranges and values between the explicitly stated bounds are contemplated, e.g., 10, 20, 30, 40, 50, 60, 65, 70, 75, 80, 90, 95, 98, 99, 99.9 or 100% and 1, 10, 20, 30, 40, 50, 100, 200, 400, 500, 1000, 2000, 3000, 5000, 10000, 15000, or 20000 nm. Examples of quantitation relative to a depth are at a depth of e.g., at least, or in a range of, 1-5000 μm; Artisans will immediately appreciate that all ranges and values between the explicitly stated bounds are contemplated: 1, 2, 3, 4, 5, 10, 20, 50, 100, 250, 500, 750, 1000, 2000, 3000, 4000, or 5000 μm. For example, a surface may have a certain percentage of pores that are no more than a certain diameter or a depth or depth range may have a certain percentage of pores that are no more than a certain diameter.

Embodiments include a process for making a polymeric material comprising heating a mixture that comprises a water-soluble polymer and a solvent to a temperature above the melting point of the polymer, extruding the mixture, and cooling the mixture while removing the solvent and/or cooling the mixture while it crosslinks. When a plurality of polymers is present in a solvent, either with or without other additives, a melting point of the combined polymers in the solvent can be readily determined by the artisan, for instance by observing the mixture as it is heated and it passes from a cloudy to a markedly more translucent appearance. Further, after, or as part of, a formation process that uses the mixture, some or all of the solvent may be removed from the mixture while the cooling takes place. Embodiments include removing at least 50% w/w of the solvent in less than 60 minutes (or less than 1, 2, 5, or 10 minutes). Embodiments include removing at least 90% w/w (or at least 70% w/w or at least 80% w/w) of the solvent in less than 60 minutes (or less than 1, 2, 5, 10, or 30 minutes).

Bulk Incorporation of Polymers into a Porous Solid

A porous material may be exposed to a mixture comprising solvated polymers (for bulk incorporated polymers) to draw them into the pores when the porous matrix is desolvated. The solvent of the mixture has an affinity for the matrix and is drawn in as the matrix imbibes the solvent. The solvent in the mixture with the bulk incorporated polymers can be chosen to have an affinity for the matrix so that it is imbibed into the desolvated matrix but does not have to be the same as the solvent in the matrix. In general, a hydrophilic solvent in the mixture will be imbibed into a hydrophilic porous matrix that is at least partially desolvated and contains a hydrophilic solvent, and an artisan can adjust the various solvents as needed to create suitable conditions when the goal of bulk incorporation is intended.

A hydrophilic solvent is a solvent that is freely miscible with water or is present at a concentration in the mixture wherein it is freely miscible with water, at 20° C.

Desolvated means that the matrix is free of solvents, e.g., completely dry, or is below an EWC of the matrix relative to the solvent it contains. If the solvent in the matrix is not water, the EWC can be calculated for the material based on measurements in the solvent, i.e., the term EWC can be used for solvents that are not water in the appropriate context. For instance, a hydrophilic matrix might be solvated in an aqueous solution of an alcohol and would have an EWC for that solvent. Embodiments include an amount of desolvation of a porous solid from 1-100, Artisans will immediately appreciate that all ranges and values between the explicitly stated bounds are contemplated: 1, 5, 10, 15, 20, 33, 40, 50, 60, 70, 80, 90, 95, 99, 100% w/w referring to the total weight of solvent that can be removed.

Without being bound to a particular theory, it is believed that porous materials can be desolvated (dehydrated in the case of water being the solvent in the porous material) and exposed to polymers in a solution that resolvates the porous material so that the polymers are drawn into the pores. The polymers then form physical bonds with the matrix material that defines the pores and are, for practical purposes, permanently incorporated into the bulk of the materials, both by at least partially filling the pores and by physical bonding with the matrix. Alternatively, or additionally, the polymers have a hydrodynamic radius that causes the polymer to present a diameter that exceeds the pores' opening diameter so that the polymer is permanently incorporated into the pores of the material, especially when the material is to be used in water or physiological solution. In general, if the bulk-incorporated polymer is solvated in a polymer that wets the pores of the porous solid, the polymer can be drawn into pores of the matrix as it is resolvated. When a hydrophilic porous matrix is below an EWC of the matrix, the mixture that contains the polymers for bulk incorporation is drawn in because the solvent for the polymers is matched to the matrix material, e.g., wets the pores of the material. For instance, a hydrophilic solvent will normally wet the pores of a hydrophilic matrix.

A material that comprises a porous matrix of polymers joined by noncovalent bonds is a preferred embodiment, since these materials can be made with a high degree of control over pore sizes and material properties, including a choice of nanoporous, microporous, or other characteristic pore sizes. The matrix may comprise physically crosslinked water-soluble polymers that define the pores. A solids concentration of these water-soluble polymers may be at least 33% w/w of the matrix at an equilibrium water content (EWC) of the matrix, although other concentrations may also be used.

Accordingly, an embodiment of a process of incorporating polymers in a porous material comprises providing a material comprising a porous, hydrophilic matrix that comprises one or more water soluble polymers (also referred to herein as matrix polymers) crosslinked with each other to form the matrix. The material with the matrix is exposed to a mixture comprising one or more polymers (also referred to as bulk incorporated polymers, preferably with the polymers being water soluble, with the mixture also being referred to as a conditioning mixture or bulk incorporating mixture) solvated in a solvent, wherein the matrix is below the EWC before being exposed to the mixture and is hydrophilic relative to the solvent. The material, before exposure to the mixture with the bulk incorporated polymers, is desolvated.

In some embodiments, bulk incorporation processes create an outer zone wherein the pores are filled, an intermediate zone where most of the pores are filled or are mostly filled, and an inner zone where there is little or no penetration of the polymers. Bulk incorporation not only modifies pores at a surface but also below the surface, e.g., at least, or in a range of, 1-5000 µm; Artisans will immediately appreciate that all ranges and values between the explicitly stated bounds are contemplated, e.g., 1, 2, 3, 4, 5, 10, 20, 30, 40, 50, 75, 100, 250, 500, 750, 1000, 2000, 3000, 4000, or 5000 µm. The percentage of pores that have polymer may be assayed as already described and penetration graded by a cut-off of a percentage, e.g., a first zone having 100% filling of pores, a second zone with 50% pores filled, a third zone with 0% pores filled.

Bulk incorporation processes are preferably made with porous matrices that are made of water soluble polymers and may be made without hydrophobic domains in the polymers, e.g., a matrix made only of PVA. The polymers may form the matrix with physical crosslinks. Accordingly, embodiments include materials comprising matrices that are free of hydrophobic domains or that are made with water soluble polymers that are free of hydrophobic domains or that are free of any polymer that is not water soluble. Some hydrophobic domains can be tolerated, however, when making a hydrophilic matrix with water soluble polymers having physical crosslinks without disrupting the matrix formed thereby. Embodiments of the invention include a hydrophobic content of polymers that form a porous matrix of 0, 1, 2, 3, 4, 5, 7, 8, 9, 10, 11, 12, or 15% w/w.

A porous matrix consisting essentially of water soluble polymers refers to a content of up to 3% w/w of the polymers that crosslink to form the matrix. RO agents such as salts are not polymers that crosslink to form the matrix. A porous matrix consisting essentially of physically crosslinked polymers refers to a matrix that is free of agents that make covalent bonds between the polymers, or has a small amount of such agents so that no more than about 6% of the polymers (referring to polymer number) are crosslinked to each other with such agents, e.g., wherein a stoichiometric ratio of polymer number to a bifunctional crosslinker is at least 100:3. A matrix that is essentially free of covalent bonds similarly is made with polymers crosslinked with no more than about 6% of the polymers (by number) are not covalently crosslinked. The number of covalent bonds in a matrix may similarly be limited to a stoichiometric ratio of 100:3 to 100:100, e.g., 100 to any of 3, 5, 10, 15, 20, 25, 30, 40, 50, 60, 70, 80, 90, or 100 by number. For instance, hydrogels made by free radical polymerization typically have 100% of the polymers attached to each other by covalent bonds, which is a 100:100 stoichiometric ratio of polymers:covalent bonds.

As stated elsewhere, a porous solid can be made with a controlled pore diameter range and may be made to provide a matrix that has no pores larger than a particular diameter. Diameters may be measured in an appropriate context, e.g., at EWC in distilled water. Embodiments thus include polymers entrapped in a porous matrix that is free of pores that are larger than 1-5000 µm; Artisans will immediately appreciate that all ranges and values between the explicitly stated bounds are contemplated, e.g., 1, 2, 3, 4, 5, 10, 15, 20, 25, 30, 50, 100, 200, 250, 300, 400, 500, 750, 1000, 2000, 3000, 4000, or 5000 µm.

A porous solid can have other materials present as described elsewhere herein, e.g., radiopaque (RO) agents that are additional to the matrix but are not part of the matrix. RO agents typically contribute little to the crosslinking that provides the strength of the matrix. Similarly, other materials can be present in the matrix without being part of the matrix, e.g., wires and reinforcing materials. It can be appreciated that a matrix made with physical crosslinks is one type of matrix that can be made with materials that define pores that have diameters and is in contrast to hydrogels having polymer strands that are generally separated from each other and are connected in a mesh network structure, e.g., as typically formed using free radical polymerization or by reaction of monomers/polymers that are in solution. Such mesh networks would generally not be expected to stably incorporate polymers in their pores without covalent bonding using a polymer-imbibing process. Porous materials are described in detail herein and these may be freely chosen, as guided by the disclosure herein, for use with bulk incorporated polymers. The porous material may be chosen with bulk properties as described herein.

The bulk incorporated polymers may be polymers described elsewhere herein for porous solids. Examples are water-soluble polymers. The water soluble polymers may be, for example, polyvinyl alcohol (PVA), polyvinylpyrrolidone (PVP), polyethylene glycol (PEG), polyacrylic acid (PAA), polyacrylamide, hydroxypropyl methacrylamide, polyoxazolines, polyphosphates, polyphosphazenes, poly (vinyl acetate), polypropylene glycol, Poly(N-isopropylacrylamide) (PNIPAM), polysaccharides, sulfonated hydrophilic polymers (e.g., sulfonated polyphenylene oxide, Nafion®, sulfobetaine methacrylate) and variations of the same with an added iodine (e.g., PVA-I, PVP-I), or variations with further pendent groups, copolymers of the same, and combinations of the same. The mixture may comprise one or more polymers, meaning polymers of different chemical compositions, such as PVA and PEG. The term "a polymer" refers to one or more polymers.

The solubility of a water-soluble polymer for a porous matrix or for bulk incorporation may be chosen as, e.g., at least 1, 2, 5, or 10 g/100 ml in water at 20° C. Polymers may be chosen to be linear or branched. Embodiments include a polymer or a hydrophilic polymer having a molecular weight of, e.g., 40 k to 5000 k Daltons; Artisans will immediately appreciate that all ranges and values between the explicitly stated bounds are contemplated, with, e.g., any of the following being available as an upper or lower limit: 40 k, 50 k, 100 k, 125 k, 150 k, 250 k, 400 k, 500 k, 600 k 750 k, 800, 900 k, 1 million, 1.5 million, 2 million, 2.5 million, 3 million molecular weight. The molecular weight of the polymer can be chosen in light of the pore sizes available in the porous solid. Nanoporous or microporous materials are preferred.

The bulk incorporated polymers may be chosen to be the same as polymers that form the porous matrix, to be the same as at least one of the polymers that make up the matrix, or to be different.

The bulk incorporated polymer concentrations in the mixture may be, referring to the mixture at the start of the process, any concentration wherein the polymers go into solution, bearing in mind that polymer that is not in solution, or other non-solvated materials, are not destined to enter pores. In some embodiments, concentrations are 1-50% w/w; Artisans will immediately appreciate that all ranges and values between the explicitly stated bounds are contemplated, e.g., 1, 2, 3, 4, 5, 10, 15, 20, 25, 30, 33, 35, 40, 50% w/w.

Solvent for the mixture is chosen as appropriate to solvate the polymer and to provide a solvent that will be imbibed by the porous solid. Hydrophilic solvents are generally preferable for a hydrophilic matrix. Solvents may be water, organic, or aqueous, or free of the same, e.g., free of organic solvent. In some embodiments, concentrations of water are 0-99, e.g., 0, 5, 10, 15, 20, 25, 30, 40, 50, 60, 70, 80, 90, 95, or 99 w/w %.

A temperature of the conditioning mixture is not to exceed a melting temperature of the porous solid matrix. Temperatures ranges may be, for example, from 10-100° C., e.g., 10, 20, 30, 37, 40, 50, 60, 70, 80, or 90° C.

Exposure times are preferably for a duration of time required for a porous solid to reach EWC in the mixture. Duration of time may comprise, in some embodiments, 2, 4, 6, 8, 10, 12, 16, 20, 24, and 48 hours. Agitation and temperature may be manipulated to affect a time of exposure, e.g., to accelerate achieving EWC or to control viscosity of the mixture. Salt and/or osmotic content may be adjusted as helpful, e.g., for solubility, viscosity, and/or EWC.

The Examples provide guidance in regards to salt concentration for a conditioning mixture. Examples of salt concentration are from 0.1 to 2% w/w. In general, a single charge cation with a smaller atomic radius has a greater penetration into a depth of a porous solid, whereas a larger cation reduces penetration. Examples of salts are those with a single cation, divalent cation, or other cation, e.g., a salt of sodium, potassium, lithium, copper, quaternary ammonium ($NR_4^+$, where R is a hydrogen, alkyl, or aryl group), magnesium, calcium, copper, iron, or zinc. In general, a physiological pH using a buffer was useful for the mixture. A pH may be adjusted to increase or decrease penetration into a matrix, and the solvent may include or omit buffering salts. Examples of pH are from 4-10, e.g., 4, 5, 6, 7, 8, 9, or 10.

A viscosity of a conditioning mixture, referring to a water-soluble polymer and solvent, is affected by: pH (higher pH, higher viscosity), polymer concentration and/or molecular weight, and polymer branching, with increases in any of these generally leading to a higher viscosity. In general, a higher viscosity reduces penetration of the bulk incorporating polymers into a porous solid. An embodiment is a porous material comprising water soluble polymers entrapped in pores of a porous matrix. The matrix may comprise physically crosslinked water-soluble polymers that are crosslinked with each other to form the matrix and define the pores. The matrix may have features as disclosed herein, e.g., polymer content, weight percentage of polymers, strength, Young's modulus, degree of coverage, pore sizes, and so forth.

Surface coverage of the water-soluble polymers in a porous matrix may be complete. Complete coverage under SEM conditions wherein no pores of the underlying surface are visible indicates coverage at EWC. A degree of coverage may be less than 100%, e.g., from 50-100%; Artisans will immediately appreciate that all ranges and values between the explicitly stated bounds are contemplated, e.g., 50, 60, 70, 80, 90, 95, 98, 99, 99.9, or 100%.

Bulk incorporation can decrease physical properties of a porous solid. Embodiments thus include a porous solid, e.g., one as disclosed herein, with a Young's modulus and/or tensile strength that is from 1-20% less as a result of being conditioned with a water-soluble polymer as compared to the same material that has not been conditioned with a water-soluble polymer; Artisans will immediately appreciate that all ranges and values between the explicitly stated bounds are contemplated, e.g., 1, 2, 3, 4, 5, 7, 9, 10, 12, 15, or 20%. A test for incorporation of water soluble polymers to be stable is: Immersion of the test device in physiologically representative fluid (i.e. PBS) at body temp conditions in a circulating peristaltic loop with the test device placed directly in the head of the pump at a flow rate of 10-12 mL/s for 24 hrs at 150 rpm, approximating 500,000 mechanical sample compressions with a volume flux rate of 0.1225 $cm^3 \cdot s^{-1} \cdot cm^{-2}$. While testing revealed as much as a 25% loss, other test criteria may be used, e.g., a loss of 0-50% w/w, e.g., 1, 5, 10, 15, 20, 25, 30, 40, 50% w/w. Or other tests may be posed, e.g., a loss of 0-5% w/w e.g., 1, 2, 3, 4, or 5% w/w at 1-52 weeks of static exposure to an excess of PBS, e.g., 1, 2, 3, 4, 5, 10, 20, 30, 40, 50, or 52 weeks.

Products

Products, including end-user or intermediate products, or materials, may be made that have an aspect ratio as desired, e.g., at least 3:1, referring to materials set forth herein including nanoporous materials, microporous materials, and hydrogels. The aspect ratio increases as the device increases in length and decreases in width. Artisans will immediately appreciate that all ranges and values between the explicitly stated bounds are contemplated, with, e.g., any of the following being available as an upper or lower limit: 3:1, 4:1, 5:1, 6:1, 7:1, 8:1, 9:1, 10:1, 50:1, 100:1, 1000:1. A high aspect ratio is highly advantageous for certain devices, e.g., many types of catheters. In principle, a thin tube could be continuously extruded without limitation as to length. Such devices include, e.g., tubes, rods, cylinders, and cross-sections with square, polygonal, or round profiles. One or more lumens may be provided in any of the same. The devices may be made of a single material, essentially a single material, or with a plurality of materials including the various layers already discussed, or a reinforcing material, a fiber, a wire, a braided material, braided wire, braided plastic fibers.

The extrusion process, in particular, provides for concentric placement of a lumen; concentric is in contrast to eccentric meaning the lumen is off-center. In the case of a plurality of lumens, the lumens may be placed so that the lumens are symmetrically placed: the symmetry is in contrast to an eccentric placement of the lumens that is a result of a poorly controlled process. Embodiments include the aforementioned devices with an aspect ratio of at least 3:1 with lumens that are positioned without eccentricity or one lumen that is concentric with the longitudinal axis of the device.

The porous solids such as the nanoporous materials, microporous materials, and strong hydrogels may be used to make catheters or medical fibers. These may be made with bulk incorporated polymers and may have the various features described for the same. Examples of catheters are central venous, peripherally inserted central, midline, peripheral, tunneled, dialysis access, hemodialysis, vascular access port, peritoneal dialysis, urinary, neurological, peritoneal, intra-aortic balloon pump, diagnostic, interventional, drug delivery, etc.), shunts, wound drains (external including ventricular, ventriculoperitoneal, and lumboperitoneal), and infusion ports. The porous solids may be used to make implantable devices, including fully implantable and percutaneously implanted, either permanent or temporary. The porous solid materials may be used to make blood-contacting devices or devices that contact bodily fluids, including ex vivo and/or in vivo devices, and including blood contacting implants. Examples of such devices include drug delivery devices (e.g., insulin pump), tubing, contraceptive devices, feminine hygiene, endoscopes, grafts (including small diameter <6 mm), pacemakers, implantable cardioverter-defibrillators, cardiac resynchronization devices, cardiovascular device leads, ventricular assist devices, catheters (including cochlear implants, endotracheal tubes, tracheostomy tubes, drug delivery ports and tubing, implantable sensors (intravascular, transdermal, intracranial), ventilator pumps, and ophthalmic devices including drug delivery systems. Catheters can comprise a tubular nanoporous material with a fastener to cooperate with other devices, e.g., luer fasteners or fittings. Radiopaque agents may be added to the materials, fibers, or devices. The term radiopaque agent refers to agents commonly used in the medical device industry to add radiopacity to materials, e.g., barium sulfate, bismuth, or tungsten. RO agents may be incorporated at, e.g., from 5-50% w/w pf the total solids weight, e.g., 5, 10, 20, 30, 40, or 50%.

Medical fibers made with porous solid materials include applications such as sutures, yarns, medical textiles, braids, mesh, knitted or woven mesh, nonwoven fabrics, and devices based on the same. The fibers are strong and pliable. Materials may be made with these fibers so that they are resistant to fatigue and abrasion.

In an exemplary embodiment, the method comprises administering, into an external orifice of a subject, a device comprising a body portion wherein the body portion comprises a polymeric material comprising a water-soluble polymer and a biologically active agent associated with the polymeric material. In some embodiments, the device has an aspect ratio of greater than or equal to 3:1. In some embodiments, the biologically active agent is distributed within the polymeric material substantially homogeneously. In some embodiments, the biologically active agent is distributed within the polymeric material non-homogeneously (i.e., on one or more surfaces of the polymeric material). In some embodiments, administration of the device (e.g., device 10 of FIG. 1A, device 12 of FIG. 1B, device 14 of FIG. 1C) does not comprise the use of a sheath introducer. The polymeric material is substantially non-thrombogenic, the polymeric material has a water content of less than 5 w/w % and greater than or equal to 0.1 w/w % in the first configuration (e.g., a water content less than the equilibrium water content state, such as the dehydrated state), and the polymeric material is configured to swell in an amount greater than or equal to 5 w/w % and less than or equal to 50 w/w % from a first configuration (e.g., a water content less than the equilibrium water content state, such as the dehydrated state) to a second configuration (e.g., an equilibrium water content state) in less than or equal to 60 minutes (e.g., less than or equal to 10 minutes, less than or equal to 5 minutes, less than or equal to 1 minute, or less than or equal to 10 seconds).

Methods of Treatment

In some aspects, methods of treating a subject are described. In some embodiments, the method comprises administering, into an orifice of a subject, a device described herein (e.g., any embodiment of a device described herein or combinations thereof).

In some embodiments, the method comprises swelling the polymeric material as described herein. For example, in some embodiments, the method comprises swelling the device and/or polymeric material in an amount greater than or equal to 2 w/w %, greater than or equal to 3 w/w %, greater than or equal to 4 w/w %, greater than or equal to 5 w/w %, greater than or equal to 10 w/w %, greater than or equal to 15 w/w %, greater than or equal to 20 w/w %, greater than or equal to 25 w/w %, greater than or equal to 30 w/w %, greater than or equal to 35 w/w %, greater than or equal to 40 w/w %, or greater than or equal to 45 w/w %, for example, from a first configuration (e.g., a water content less than the equilibrium water content state, such as the dehydrated state) to a second configuration (e.g., the equilibrium water content state). In some embodiments, the method comprises swelling the device and/or polymeric material in an amount less than or equal to 50 w/w %, less than or equal to 45 w/w %, less than or equal to 40 w/w %, less than or equal to 35 w/w %, less than or equal to 30 w/w %, less than or equal to 25 w/w %, less than or equal to 20 w/w %, less than or equal to 15 w/w %, or less than or equal to 10 w/w %, for example, from a first configuration (e.g., a water content less than the equilibrium water content state, such as the dehydrated state) to a second configuration (e.g., the equilibrium water content state). Combinations of these ranges are also possible (e.g., greater than or equal to 5 w/w % and less than or equal to 40 w/w %).

In some embodiments, the method comprises swelling the polymeric material to the equilibrium water content state. In some embodiments, the method comprises swelling the polymeric material to the equilibrium water content state over a duration of time. In some embodiments the duration of time is less than or equal to 60 minutes (e.g., less than or equal to 10 minutes, less than or equal to 5 minutes, less than or equal to 1 minute, less than or equal to 30 seconds, or less than or equal to 10 seconds).

In some embodiments, the method comprises swelling the polymeric material at a given temperature. In some embodiments, the temperature is greater than or equal to 4° C., greater than or equal to 10° C., greater than or equal to 16° C., greater than or equal to 20° C., greater than or equal to 25° C., or greater than or equal to 30° C. In some embodiments, the temperature is less than or equal to 40° C. less than or equal to 30° C., less than or equal to 25° C., less than or equal to 20° C., less than or equal to 16° C., or less than or equal to 10° C. Combinations of these ranges are also possible (e.g., 20° C.-40° C.).

In some embodiments, the method comprises swelling the polymeric material such that the inner diameter and/or outer diameter increase by a larger percentage than the percentage increase in length (as described herein). For example, in some embodiments, the method comprises swelling the polymeric material such that the inner diameter and/or outer diameter increases by 1-20% while the length increases by 0.1-19%.

In some embodiments, the swelling occurs after administration. In some embodiments, the swelling of the polymeric material after administration into an orifice of a subject closes an opening of that orifice. For example, in some embodiments, the swelling of the polymeric material results in an increase in size to a dimension greater than or equal to the size of the orifice to which it is inserted. In some embodiments, the orifice is a wound. In some embodiments, the swelling of the polymeric material causes hemostasis. For example, in some embodiments, a subject (e.g., a human) may have an orifice (e.g., a wound) that has a maximum cross-sectional diameter of A and that is bleeding, and a device described herein with a maximum outer cross-sectional diameter smaller than A may be administered into the orifice. In some embodiments, the maximum outer cross-sectional diameter of the device may then swell to a dimension greater than or equal to A, such that the orifice is closed. In some embodiments, this may result in hemostasis.

In some embodiments, the swelling occurs before administration. In some embodiments, the swelling comprises rehydrating the device for a duration of time. In some embodiments, the duration of time is less than or equal to 60 minutes (e.g., less than or equal to 10 minutes, less than or equal to 5 minutes, less than or equal to 1 minute, or less than or equal to 10 seconds). In some embodiments, rehydrating the device comprises use of rehydration media. In some embodiments, the rehydration media comprises water, lactated Ringer's solution (LRS), dextrose (D5W), phosphate buffered saline (PBS), Hanks' Balanced Salt Solution (HBSS), and/or isotonic salt solutions.

Further Definitions

The term medically acceptable refers to a material that is highly purified to be free of contaminants and is nontoxic. The term consists essentially of, as used in the context of a biomaterial or medical device, refers to a material or device that has no more than 3% w/w of other materials or components and said 3% does not make the device unsuited to intended medical uses. Equilibrium water content (EWC) is a term that refers to the water content of a material when the wet weight of the material has become constant, and before the material degrades. In general, materials with a high solids content have been observed to be at equilibrium water content at 24-48 hours. For purposes of measuring EWC, distilled water is used unless otherwise specified.

The term w/v refers to weight per volume e.g., g/L or mg/mL. The terms biomaterial and biomedical material are used interchangeably herein and encompass biomedically acceptable materials directed to a use in the biomedical arts, for example, as implants, catheters, blood-contacting materials, tissue-contacting materials, diagnostic assays, medical kits, tissue sample processing, or other medical purposes. Moreover, while the materials are suited for biomedical uses, they are not limited to the same and may be created as general-purpose materials. A physiological saline refers to a phosphate buffered solution with a pH of 7-7.4 and a human physiological osmolarity at 37° C.

The term molecular weight (MW) is measured in g/mol. The MW of a polymer refers to a weight average MW unless otherwise stated. When the polymer is part of a porous solid, the term MW refers to the polymer before it is crosslinked. When a distance between crosslinks is specified, it is the weight average MW between crosslinks unless otherwise indicated. The abbreviation k stands for thousand, M stands for million, and G stands for billion such that 50 k MW refers to 50,000 MW. Daltons is also a unit of MW and likewise refers to a weight average when used for a polymer.

Publications, journal devices, patents and patent applications referenced herein are hereby incorporated herein for all purposes, with the instant specification controlling in case of conflict. Features of embodiments set forth herein may be mixed and matched as guided by the need to make an operable process or product.

As used herein, the term "therapeutic agent" or also referred to as a "drug" refers to an agent that is administered to a subject to treat a disease, disorder, or other clinically recognized condition, or for prophylactic purposes, and has a clinically significant effect on the body of the subject to treat and/or prevent the disease, disorder, or condition.

As used herein, when a component is referred to as being "adjacent" another component, it can be directly adjacent to (e.g., in contact with) the component, or one or more intervening components also may be present. A component that is "directly adjacent" another component means that no intervening component(s) is present.

A "subject" refers to any animal such as a mammal (e.g., a human). Non-limiting examples of subjects include a human, a non-human primate, a cow, a horse, a pig, a sheep, a goat, a dog, a cat or a rodent such as a mouse, a rat, a hamster, a bird, a fish, or a guinea pig. Generally, the invention is directed toward use with humans. In some embodiments, a subject may demonstrate health benefits, e.g., upon administration of the self-righting device.

As used herein, a "fluid" is given its ordinary meaning, i.e., a liquid or a gas. A fluid cannot maintain a defined shape and will flow during an observable time frame to fill the container in which it is put. Thus, the fluid may have any suitable viscosity that permits flow. If two or more fluids are present, each fluid may be independently selected among essentially any fluids (liquids, gases, and the like) by those of ordinary skill in the art.

EXAMPLES

The following examples are intended to illustrate some embodiments described herein, including some aspects of the present invention, but do not exemplify the full scope of the invention.

Example 1: Packaged Article Containing a Catheter

The following describes an exemplary packaged article, according to some embodiments described herein.

The first configuration incorporates glycerol as a humectant (hydration aid) and a foil pouch (13"×19" foil pouch, Stephen Gould Associates, Manufactured by Shannon Packaging Inc., PFP400) outside a Tyvek catheter kit. The foil pouch creates an environment with a minimum relative humidity for the catheter throughout its shelf life. The foil, in some cases, minimizes moisture transport from the catheter to the variable outside environment, which facilities the hydration of the catheter, thus generally ensuring the catheter may hydrate to its intended dimensions within a specified amount of time.

In one sample, packaging included a humidity chip (HUMIDIChip, Anderson Product, AN-1071) inside the foil pouch to further aid in achieving an adequate relative humidity. It was determined through functional testing that the hydration requirements may be achieved by reconditioning the catheter in its Tyvek pouch for, for example, 24-hours post-sterilization. The reconditioning step is performed by placing the catheter with Tyvek pouch inside the foil packaging along with the humidity chip. The humidity chip is then discarded following the recondition period, and then the catheter is re-sealed in foil in preparation for final packaging delivered to the end user. Removing the chip from the final packaging eliminates a potential risk of the chip falling out of the package into a sterile field. Therefore, the recondition step can be incorporated, in some cases, as part of the manufacturing process and not part of the final product.

Figure 6:
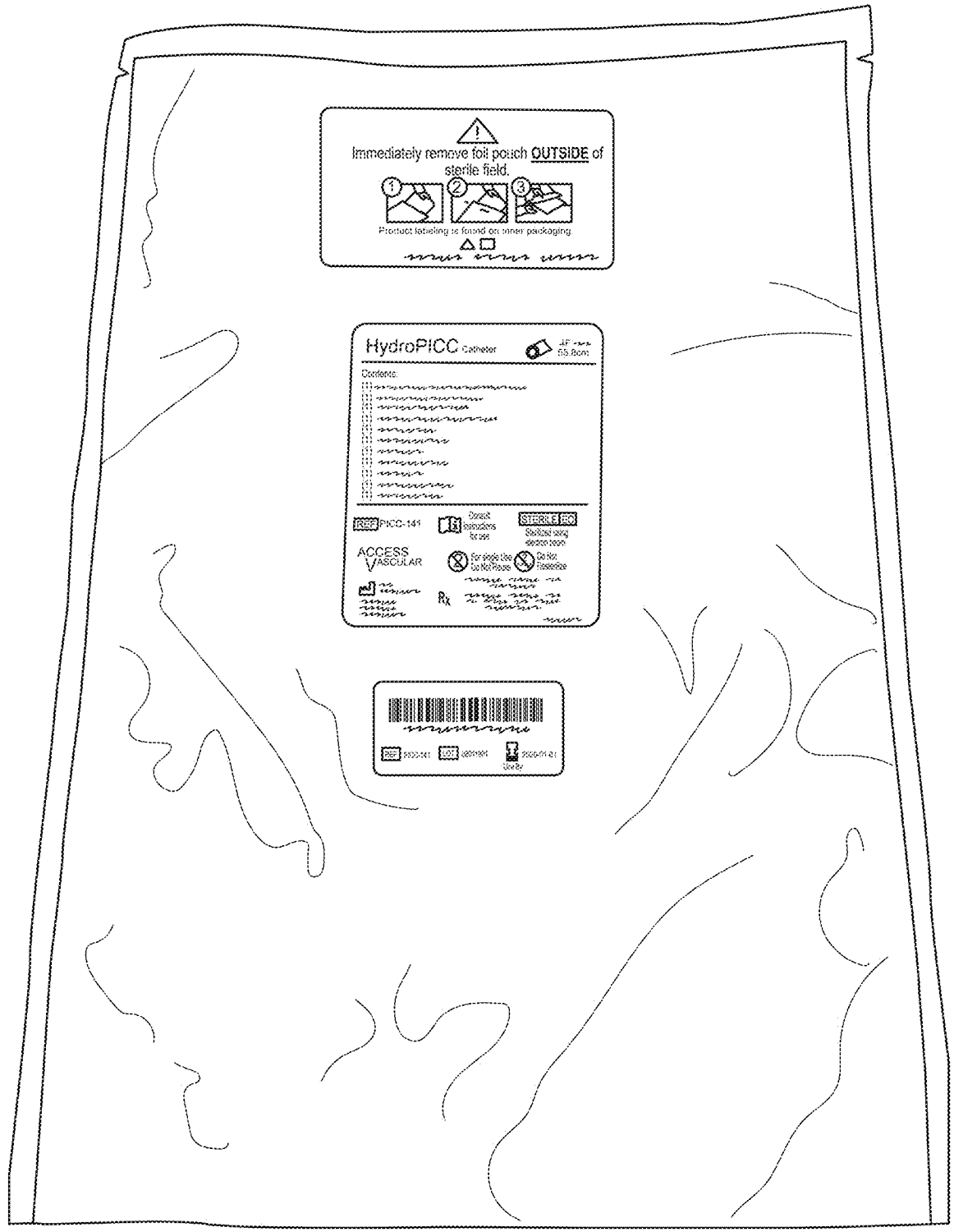
FIG. 6 is a photograph of an exemplary container, according to one set of embodiments.
Figure 7:
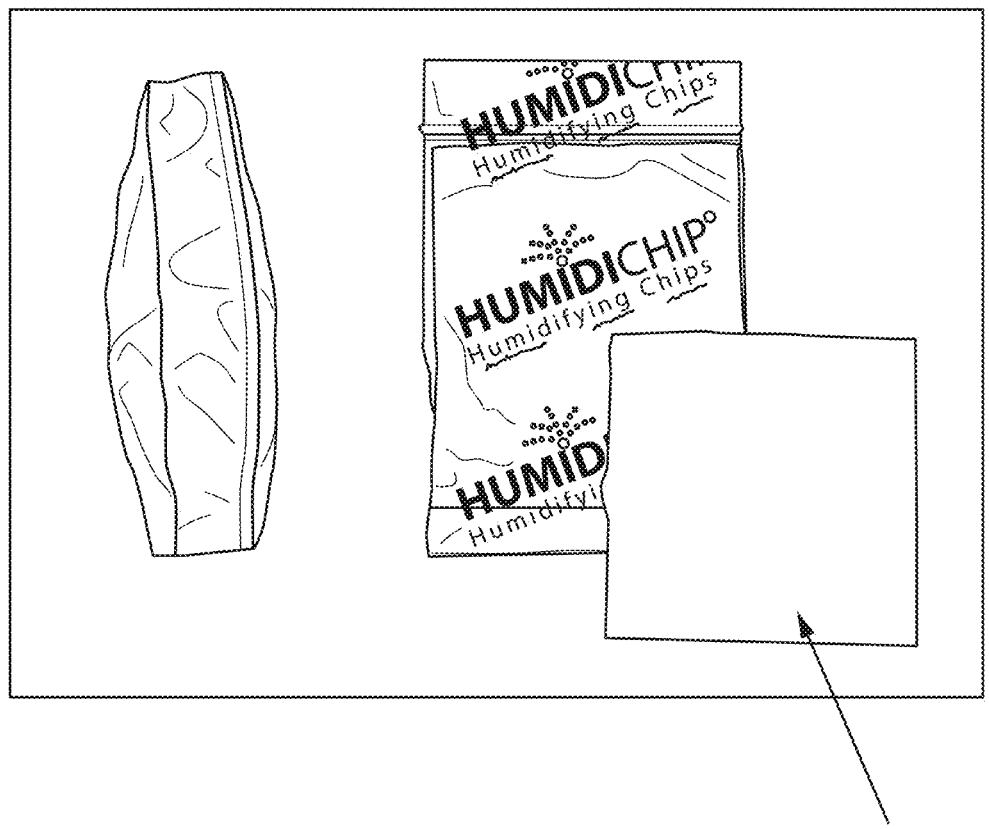
FIG. 7 is a photograph of an exemplary humidity control component, according to one set of embodiments.

An exemplary foil pouch and humidity chip are show in FIG. 6 and FIG. 7, respectively.

Example 2: Water Content

The following examples demonstrates the water content of exemplary articles under various packaged conditions.

Figure 8:
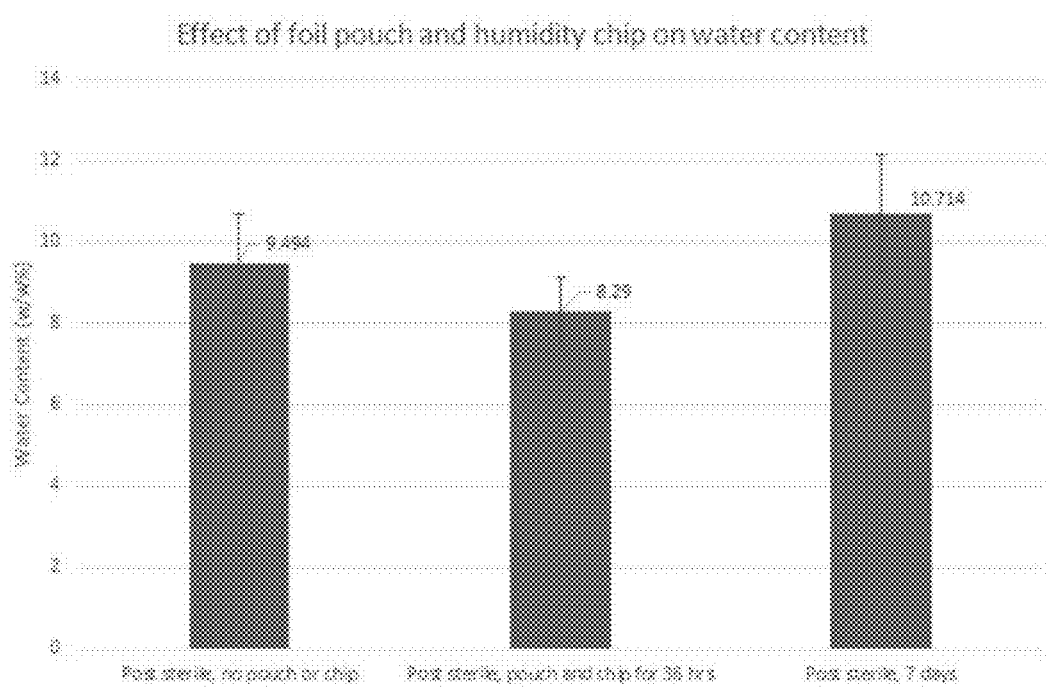
FIG. 8 is a plot of water content of an exemplary article under various conditions, according to one set of embodiments.

FIG. 8 shows a plot demonstrating water content as a function of pouch/humidity control (e.g., chip). The water content test method used an automated moisture analyzer with a halogen lamp heat source to measure the water content of samples gravimetrically. Data shows that reconditioning the product maintains the moisture content within the catheter over time. The data also shows that prolonged exposure to humidity chip in a sealed environment results in an increased water content.

Example 3: Packaged Article Configurations

The following example demonstrates exemplary configurations for packaged articles described herein.

1) Sterilizing the product in a foil pouch with Tyvek header portion, which generally allows ethylene oxide (EtO) sterilant to enter/exit the pouch (through the Tyvek) followed by subsequent sealing of the foil and detachment of the Tyvek section. Presents a single outer package for the customer instead of Tyvek pouch inside foil pouch.

2) Sterilize the product in a foil pouch in a hydrated state, which eliminates preparation time and thus permits the catheter to be placed immediately. Can use sterilization method such as EO or radiation method (e.g. E-beam or Gamma).

Example 4: Packaging of Polymeric Material to Maintain Water Content

The following example demonstrates an exemplary method of packaging a polymeric material and/or device, according to some embodiments described herein.

Packaging of the device in a porous Tyvek pouch may be useful for sterilization by ethylene oxide (EtO) gas. The EtO sterilization process generally uses humidity and pressurization/vacuum cycles to function properly. It was found during testing that the hydration level of the device may be affected by the sterilization cycle, thus impacting the device hydration time. Additionally, additional testing found that storage temperature and humidity cycles could also have an impact on the hydration level that could impact the device hydration time. A method to maintain consistent hydration levels in the packaging is desirable.

Figure 9:
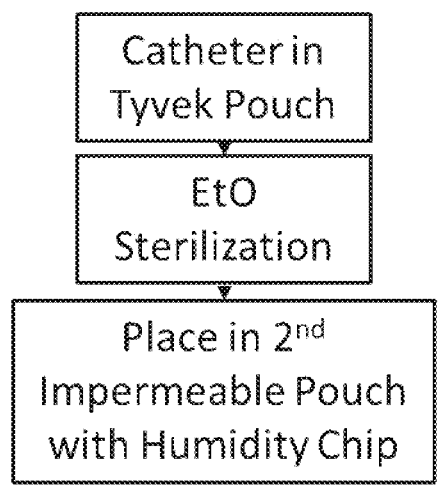
FIG. 9 is a flow diagram of an exemplary method of preparing a packaged article, according to one set of embodiments.

In this example, the catheter device is packaged in a Tyvek pouch and sterilized by EtO. After sterilization, the Tyvek pouch is packaged into a second non-sterile water impermeable pouch containing a humidity chip. The humidity chip will release water into the pouch to re-humidify the catheter. Humidity chip can be an off-the-shelf product (e.g., AnPro Humidichip) or a custom device comprising cellulose or sponge-like material absorbed with: sterile water, normal saline, or other aqueous media. The humidity control component (i.e. chip) may also contain an anti-growth or bacteriostatic agent such as alcohol, sodium hypochlorite, iodine, peroxide, or phenolic. A schematic flow diagram of this exemplary method is shown in FIG. 9.

Example 5: Packaging of Catheter and Related Components into a Tray and Kit Assembly The following example demonstrates an exemplary method of packaging a catheter device into a tray and kit assembly, according to some embodiments described herein.

Figure 10:
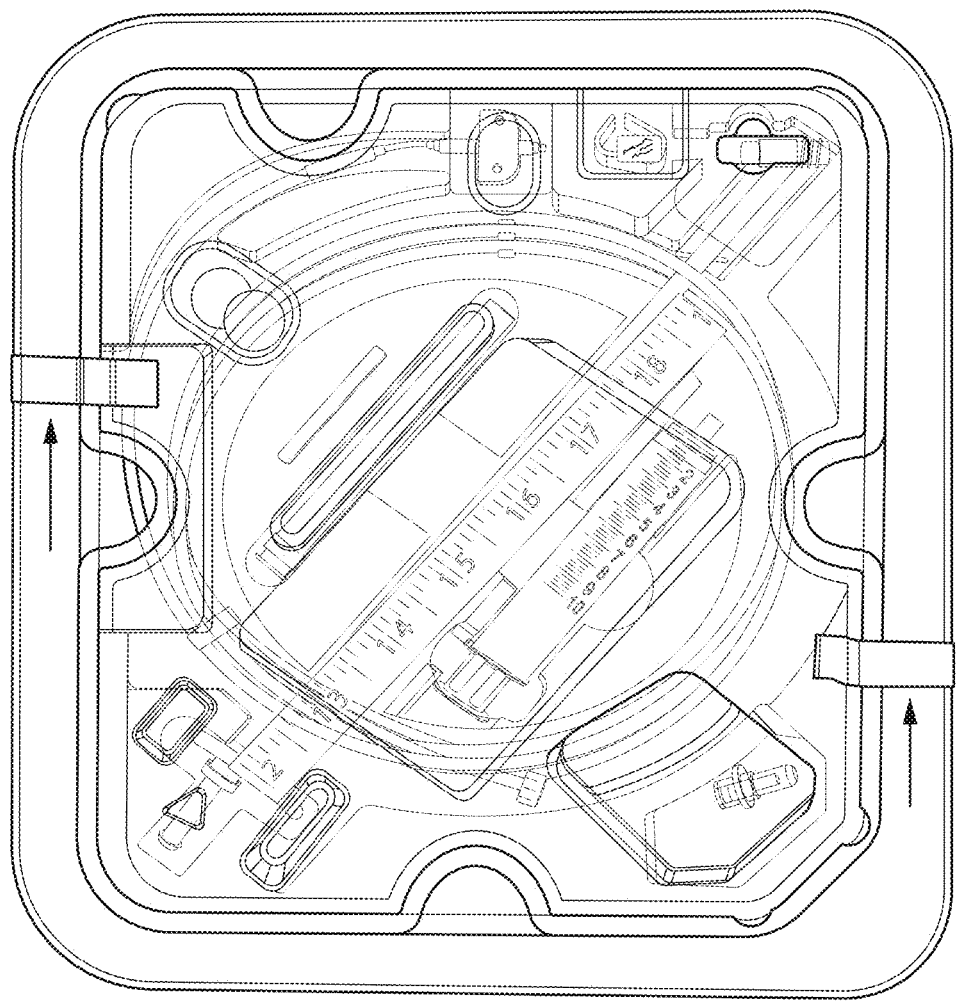
FIG. 10 is a photograph of a tray and kit assembly that is used to house a catheter device, according to one set of embodiments.

In this example, a catheter device was packaged into a tray (10.75"×8.90"×1.38") comprising a white HIPS material (as shown in FIG. 10). The catheter was first inserted into catheter hoop, after which the catheter and the peripheral components were placed into the tray. The tray had a clear lid (9.42"×7.57"×0.93") comprising PET. The catheter hoop (0.150" OD×0.100" ID×30.0") included polyethylene or a blend of low-density polyethylene (LDPE) and high-density polyethylene (HDPE). 2-channel catheter clip(s) having 0.145" ID channels comprising polypropylene was also used during the process of packaging the catheter device into the tray.

Example 6: Packaging of Tray and Kit into a Tyvek Pouch

The following example demonstrates an exemplary method of packaging a tray and kit assembly (as shown in FIG. 10) into a container (Tyvek pouch), according to some embodiments described herein.

In this example, a tray and kit (e.g., tray and kit from FIG. 10) was further packaged into a container such as a Tyvek pouch and properly sealed. The sealed Tyvek pouch was then packed in a shipper such as a corrugated cardboard. The packed shipper was subsequently sterilized at PCS using a validated cycle. FIG. 10 is a photograph of a tray and kit packed in a sealed Tyvek pouch (18.0"×12.0") comprising clear Poly/Tyvek and 3-sided Chevron seal. It should be noted that the container (e.g., Tyvek pouch) may have any of a variety of dimensions described elsewhere herein.

Example 7: Packaging of Sterilized Products into a Foil Pouch

The following example demonstrates an exemplary method of packaging a sterilized product into a container such as a foil pouch, according to some embodiments described herein.

Figure 11:
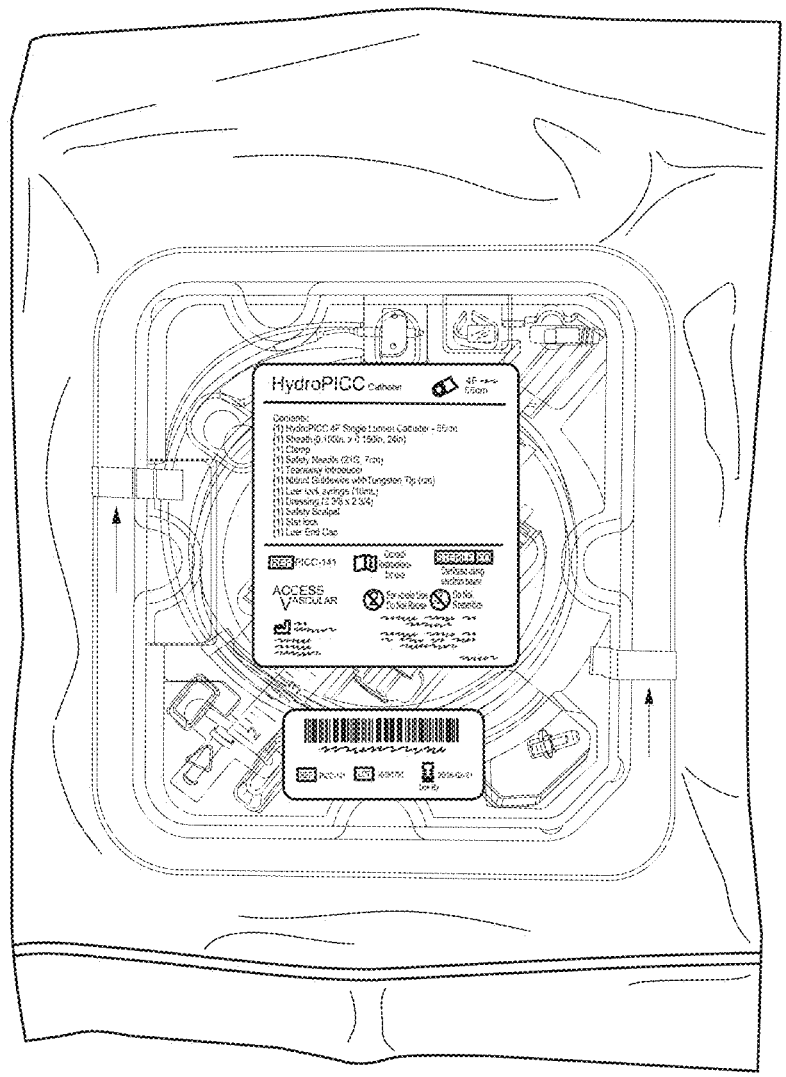
FIG. 11 is a photograph of a Tyvek® pouch that is used to package a tray and kit assembly, according to one set of embodiments.
Figure 12:
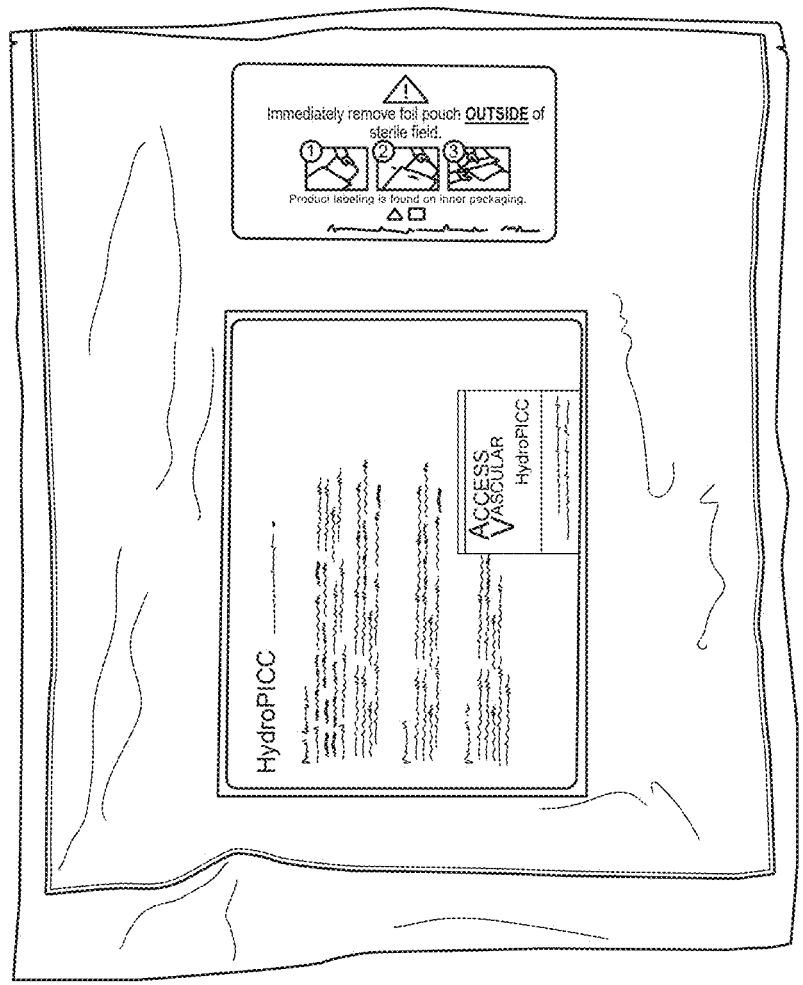
FIG. 12 is a photograph of a foil pouch containing a sterilized product and a humidity chip, according to one set of embodiments.

A sterilized product was received at AVI, after which the sterilized product was inserted into a container such as a foil pouch (as shown in FIG. 12) along with a humidity chip. The sterilized product was conditioned for 24 hours, after which the foil pouch was opened and the humidity chip was discarded. The conditioned sterilized product was then inserted into a new foil pouch and properly sealed. An example of the sterilized product is shown in FIG. 11, which shows a photograph of a Tyvek pouch containing a tray and kit assembly comprising a catheter device. The foil pouch may have any of a variety of appropriate dimensions. For example, as shown in FIG. 12, the foil pouch had a dimension of 19.0"×13.0", a thickness of 4 mil, and included PET/Foil/Poly barrier film. The humidity chip had a dimension of 2"×2" and included a Humidichip RH Stabilizer.

Example 8: Container with Tyvek Header

The following example demonstrates an exemplary packaging container comprising a header portion, according to some embodiments.

Figure 13A:
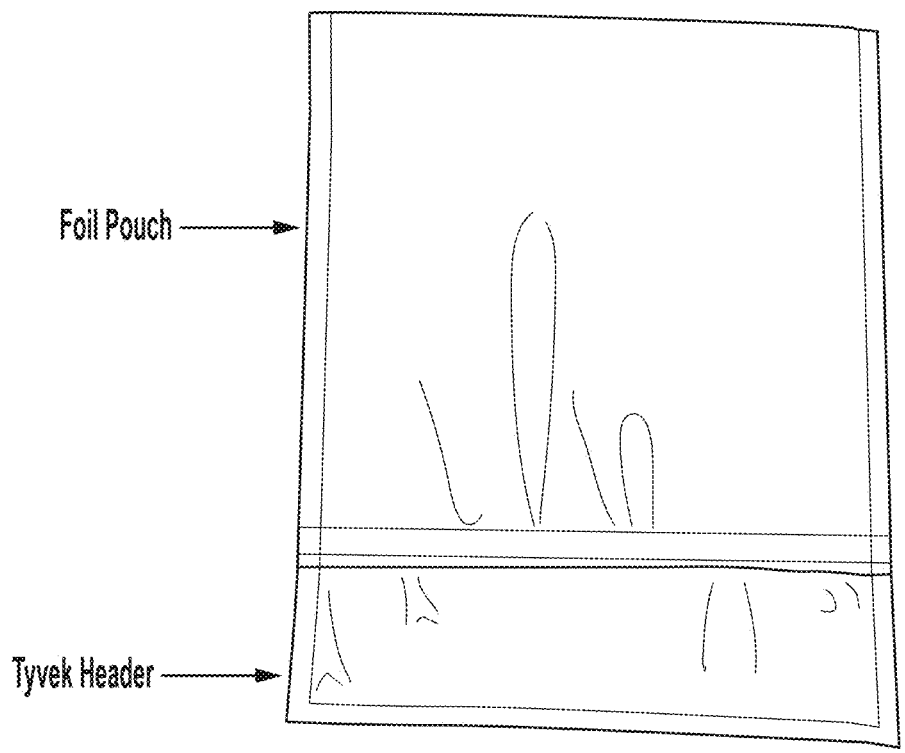
FIG. 13A is a photograph of a sealed foil pouch with a Tyvek® header, according to one set of embodiments.
Figure 13B:
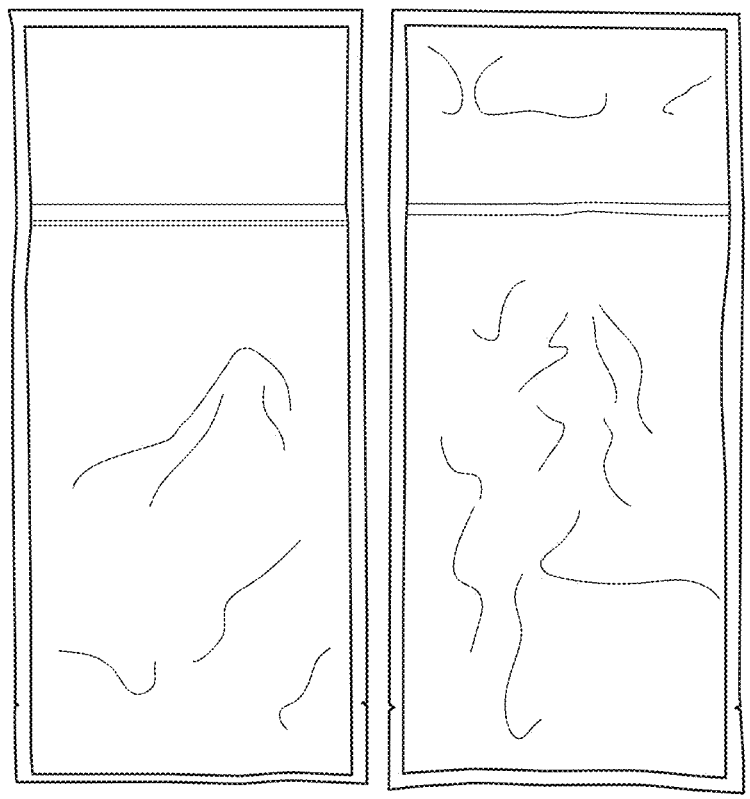
FIG. 13B is a photograph of a sealed foil pouch with a Tyvek® header, according to one set of embodiments.

A catheter device may be sealed in a container comprising foil material (e.g., foil pouch) having a header portion (e.g., a Tyvek header). The pouch may be then sterilized and sealed at a location just above the header portion. The header portion may be then cut from the container and the sealed container may be inserted into a finished goods box. For example, as shown in FIG. 13A, the container included foil pouch with a Tyvek/Poly header and had a dimension of 9.5"×9.0". It should be noted that the container may have any appropriate dimensions and is not so limited. For example, FIG. 13B shows a photograph of two containers, where each of the containers has a dimension of 18"×8.125" and included a Tyvek header (5.125"×8.125") and a foil pouch (13.375"×8.125"). Any appropriate finished goods box may be used, such as a 20 Pt C1S SBS White Paperboard.

Example 9: Containers for Use in IR Kits

The following example demonstrates exemplary designs of containers for use in IR kits, according to some embodiments.

Figure 14A:
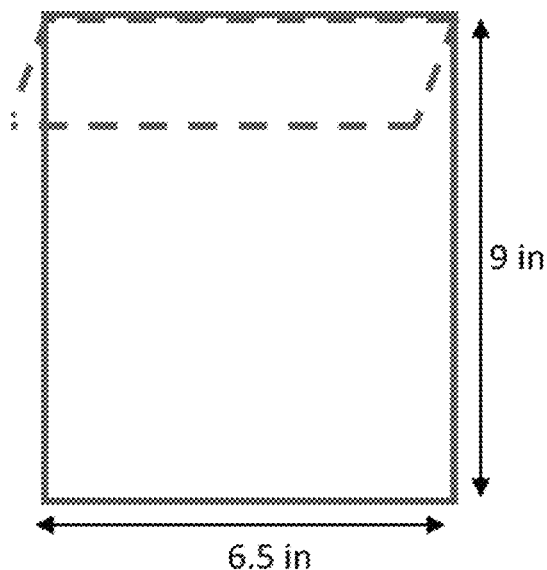
FIG. 14A is a schematic of a Tyvek® pouch for use in an IR (interventional radiology) kit, according to one set of embodiments.
Figure 14B:
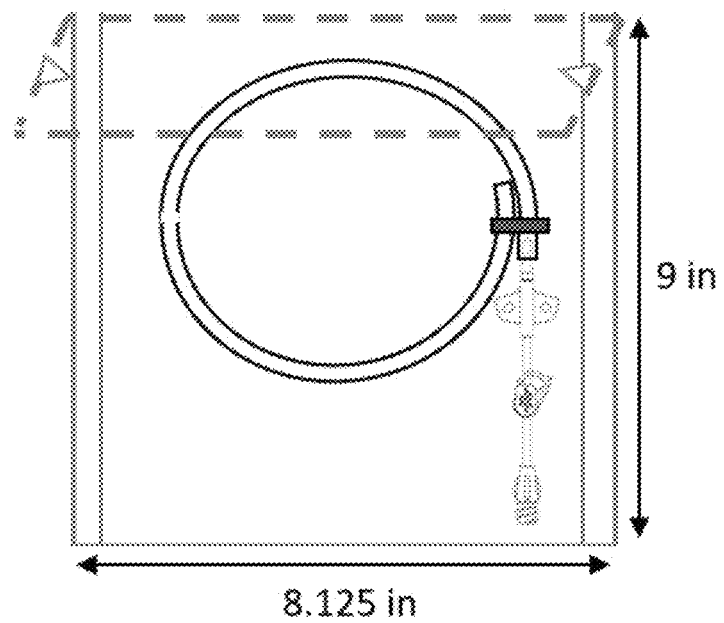
FIG. 14B is a schematic of a foil pouch for use in an IR kit, according to one set of embodiments.

An IR kit could be assembled by first placing a Tyvek pouch containing accessories (FIG. 14A) on top of a foil pouch containing a catheter device (FIG. 14B), after which the two pouches could be folded and placed into a carton. The pouches may have any dimensions suitable for IR use. For example, FIG. 14A shows a Tyvek pouch (6.5"×9") and a foil pouch (8.125"×9") used in an IR kit. The carton may have any appropriate size. For instance, the pouches shown in FIG. 14A may be placed in a carton having a dimension of 8.25"×9.25"×1.25". Each carton (with enclosed pouches) may have any appropriate weight (e.g., such as about 121 g for an IR kit). The cartons may be subsequently placed in an overshipper having any appropriate dimensions. For example, an overshipper having a dimension of 8.25"× 9.25"×6.25" may be used to fit five identical cartons having dimensions of 8.25"×9.25"×1.25".

Example 10: Containers for Use in Nursing Kits

The following example demonstrates an exemplary design of a container for use in nursing kits, according to some embodiments.

Figure 15A:
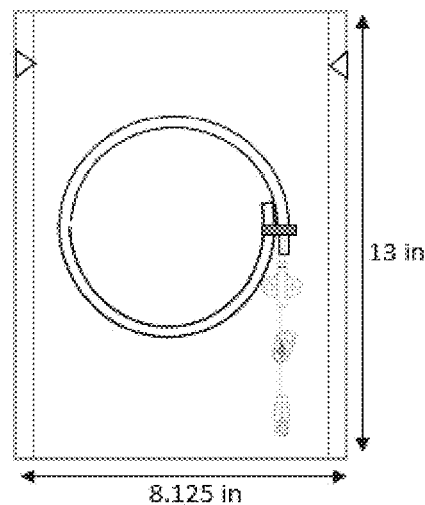
FIG. 15A is a schematic of a foil pouch for use in a nursing kit and/or max barrier kit, according to one set of embodiments.
Figure 15B:
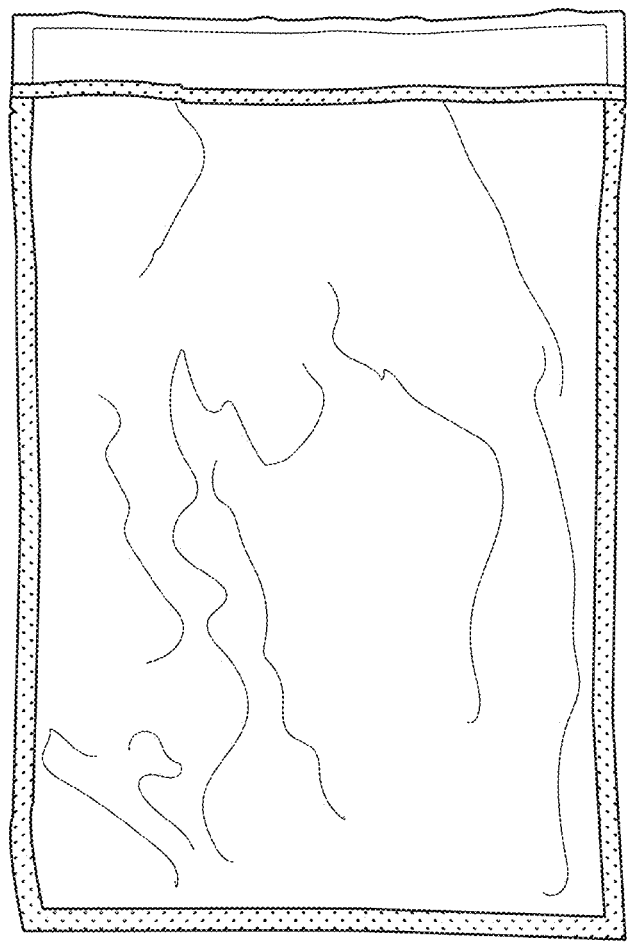
FIG. 15B is a photograph of a foil pouch for use in a nursing kit and/or max barrier kit, according to one set of embodiments.

A container comprising a foil material (e.g., a foil pouch) comprising a catheter device disposed therein may be used in a nursing kit. For example, in FIGS. 15A-15B, a foil pouch having any appropriate dimensions (e.g., 8.125"×13") suitable for use in a nursing kit may be used to house a catheter device. The foil pouch may be placed into a nursing tray (3"×7"×13") that could be subsequently placed into an overshipper. Each nursing tray and the contents enclosed therein may have any appropriate weight (e.g., about 456 g) suitable for use. Any appropriate number of nursing trays (e.g., about 5 trays) may be packed into an overshipper.

Example 11: Containers for Use in Max Barrier Kits

The following example demonstrates an exemplary design of a container for use in max barrier kits, according to some embodiments.

A container comprising a foil material (e.g., a foil pouch) comprising a catheter device disposed therein may be used in a max barrier kit. For example, in FIGS. 15A-15B, a foil pouch may have a suitable dimension (e.g., 8.125"×13") suitable for use in a max barrier kit may be used to house a catheter device. The foil pouch may be placed into a nursing tray (3"×7"×13") and subsequently placed into an overshipper. Each max barrier tray and the enclosed contents may have any appropriate weight (e.g., about 1031 g) suitable for use. Any appropriate number of max barrier trays (e.g., about 5 trays) may be packed into an overshipper.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, device, material, kit, and/or method described herein. In addition, any combination of two or more such features, systems, devices, materials, kits, and/or methods, if such features, systems, devices, materials, kits, and/or methods are not mutually inconsistent, is included within the scope of the present invention.

The indefinite devices "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/ or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Any terms as used herein related to shape, orientation, alignment, and/or geometric relationship of or between, for example, one or more devices, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, gomboc, circular/circle, rectangular/rectangle, triangular/triangle, cylindrical/cylinder, elliptical/ellipse, (n)polygonal/(n)polygon, etc.; angular orientation-such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated device that would described herein as being "square" would not require such device to have faces or sides that are perfectly planar or linear and that intersect at angles of exactly 90 degrees (indeed, such A device can only exist as a mathematical abstraction), but rather, the shape of such device should be interpreted as approximating a "square," as defined mathematically, to an extent typically achievable and achieved for the recited fabrication technique as would be understood by those skilled in the art or as specifically described. As another example, two or more fabricated devices that would described herein as being "aligned" would not require such devices to have faces or sides that are perfectly aligned (indeed, such A device can only exist as a mathematical abstraction), but rather, the arrangement of such devices should be interpreted as approximating "aligned," as defined mathematically, to an extent typically achievable and achieved for the recited fabrication technique as would be understood by those skilled in the art or as specifically described.

What is claimed is:

1. A packaged article, comprising:
   a container comprising a foil material;
   a catheter comprising a polymeric material, the polymeric material having a water content of greater than or equal to 2 w/w % and less than or equal to 40 w/w %; and
   a humidity control component comprising a humidity control sponge;
   wherein the water content is less than an equilibrium water content of the polymeric material; and
   wherein the polymeric material is configured to swell in an amount greater than or equal to 5 w/w % to an equilibrium water content state.

2. A packaged article as in claim 1, wherein the foil material is substantially impermeable to water.

3. A packaged particle as in as in claim 1, wherein the container is a pouch.

4. A packaged article as in claim 1, wherein the container further comprises a vapor permeable polymer.

5. A packaged article as in claim 1, wherein the polymeric material comprises poly(vinyl alcohol), poly(acrylic acid), polyethylene glycol, poly(vinyl pyrrolidone), poly(methacrylic sulfobetaine), poly(acrylic sulfobetaine), poly(methacrylic carboxybetaine), poly(acrylic carboxybetaine), povidone, polyacrylamide, poly(N-(2-hydroxypropyl) methacrylamide), polyoxazolines, polyphosphates, polyphosphazenes, polyvinyl acetate, polypropylene glycol, poly(N-isopropylacrylamide), poly(2-hydroxymethylmethacrylate), and combinations thereof.

6. The packaged article of claim 1, wherein the polymeric material is configured to swell to the equilibrium water content state in a time period of less than or equal to 60 minutes at 25° C.

7. The packaged article of claim 1, wherein the catheter has an inner diameter, an outer diameter, and a length; and wherein the polymeric material is configured to swell such that the inner diameter and/or outer diameter increase by a larger percentage than percentage increase in length.

8. The packaged article of claim 1, further comprising a biologically active agent present in the catheter in an amount of greater than or equal to 0.01 w/w % versus a total weight of the catheter.

9. The packaged article of claim 1, wherein the polymeric material has a water content of less than 5 w/w % and greater than or equal to 0.1 w/w % in a dehydrated state, and wherein the polymeric material is configured to swell in an amount greater than or equal to 5 w/w % and less than or equal to 50 w/w % from the dehydrated state to the equilibrium water content state in less than or equal to 60 minutes.

10. The packaged article of claim 1, wherein the polymeric material has a Young's elastic modulus of greater than or equal to 500 MPa in a dehydrated state and a Young's elastic modulus of less than or equal to 300 MPa and greater than or equal to 5 MPa at an equilibrium water content state.

11. The packaged article of claim 1, wherein the catheter has a coefficient of friction of less than or equal to 0.10 at the equilibrium water content state.

12. The packaged article of claim 1, wherein the catheter comprises an osmotic agent present in the polymeric material in an amount greater than or equal to 0.05 w/w % and less than or equal to 2 w/w % versus a total catheter weight.

13. The packaged article of claim 1, wherein the polymeric material is substantially non-thrombogenic.

14. The packaged article of claim 1, wherein the humidity control component further comprises an antiseptic or anti-infective agent.

15. The packaged article of claim 1, wherein the humidity control component is configured to be removed from the container.

16. The packaged article claim 1, wherein the packaged article comprises a humectant.

17. The packaged article of claim 16, wherein the humectant comprises poloxamer, polyethylene glycol, glycerol, propylene glycol, ethylene glycol, butylene glycol, erythritol, threitol, arabitol, xylitol, ribitol, mannitol, sorbitol, galactitol, fucitol, iditol, inositol, volemitol, malitol, lactitol, maltotriitol, maltotetraitol, and/or polyglycitols.

18. The packaged article of claim 1, wherein the catheter has a plurality of pores.

19. The packaged article of claim 18, wherein the polymeric material comprises a first water soluble polymer and wherein the catheter further comprises a second water soluble polymer that is the same or different than the first water soluble polymer and positioned within at least a portion of the plurality of pores.

20. The packaged article of claim 19, wherein the first water soluble polymer does not comprise covalent cross-linking agents.

21. The packaged article of claim 1, further comprising hydration media.

22. The packaged article of claim 21, wherein the hydration media comprises water, lactated Ringer's solution (LRS), dextrose (D5W), phosphate buffered saline (PBS), and/or Hanks' Balanced Salt Solution (HBSS).

23. A packaged article, comprising:
a container comprising a foil material;
a polymeric material comprising poly(vinyl) alcohol, the polymeric material having a water content of greater than or equal to 2 w/w % and less than or equal to 40 w/w %; and
a humidity control component comprising a humidity control sponge;
wherein the water content is less than an equilibrium water content of the polymeric material; and
wherein the polymeric material is configured to swell in an amount greater than or equal to 5 w/w % to an equilibrium water content state.

24. The packaged article of claim 23, wherein the humidity control component further comprises an antiseptic or anti-infective agent.

25. A packaged article as in as in claim 1, comprising a header portion.

26. A method, comprising:
removing, from the packaged article of claim 1, the catheter; and
rehydrating the catheter to equilibrium water content.

* * * * *